(12) United States Patent
Shenderov et al.

(10) Patent No.: US 12,434,242 B2
(45) Date of Patent: Oct. 7, 2025

(54) RAPID INDIVIDUALIZED WHOLE BLOOD CHIP FOR ANTIBIOTIC, DRUG, AND FOOD ALLERGIES

(71) Applicant: LifeImmune, Inc., Baltimore, MD (US)

(72) Inventors: Eugene Shenderov, Baltimore, MD (US); Dongshin Kim, Lexington, MA (US)

(73) Assignee: LifeImmune, Inc., Baltimore, MD (US)

( * ) Notice: Subject to any disclaimer, the term of this patent is extended or adjusted under 35 U.S.C. 154(b) by 1074 days.

(21) Appl. No.: 17/047,177

(22) PCT Filed: Apr. 15, 2019

(86) PCT No.: PCT/US2019/027545
§ 371 (c)(1),
(2) Date: Oct. 13, 2020

(87) PCT Pub. No.: WO2019/200401
PCT Pub. Date: Oct. 17, 2019

(65) Prior Publication Data
US 2021/0162415 A1  Jun. 3, 2021

Related U.S. Application Data

(60) Provisional application No. 62/657,737, filed on Apr. 14, 2018.

(51) Int. Cl.
*B01L 3/00* (2006.01)
*G01N 33/543* (2006.01)

(52) U.S. Cl.
CPC ..... *B01L 3/502761* (2013.01); *B01L 3/50255* (2013.01); *B01L 3/5027* (2013.01);
(Continued)

(58) Field of Classification Search
None
See application file for complete search history.

(56) References Cited

U.S. PATENT DOCUMENTS

| 4,600,507 A | 7/1986 | Shimizu et al. |
| 5,525,475 A | 6/1996 | Ladouceur |

(Continued)

FOREIGN PATENT DOCUMENTS

WO  9806496 A1  2/1998

OTHER PUBLICATIONS

International Preliminary Report on Patentability dated Oct. 29, 2020 and received in PCT/US19/27545.
(Continued)

*Primary Examiner* — P. Kathryn Wright
(74) *Attorney, Agent, or Firm* — Michele Wales; InHouse Patent Counsel

(57) ABSTRACT

The present invention describes a whole blood assay chip that enables separation of the cellular compartment from surrounding plasma, facilitating multiplexed measurement of otherwise difficult to detect soluble factors produced upon cellular stimulation. The invention is a microfluidic chip with an incubation chamber comprising an inlet, an outlet, and a fluidic barrier. Using this platform, the cellular compartment can be stimulated with various substances and levels of immunologic biomarkers could be measured. Through a proprietary immunologic algorithm described herein, this would allow for the diagnosis of an allergic response to foods, antibiotics, and/or other drugs. Additional applications of the invention besides allergy testing could include pregnancy testing, blood type, and medical applications requiring whole blood cellular stimulation readouts.

22 Claims, 16 Drawing Sheets

(52) U.S. Cl.
CPC ......... *B01L 3/502753* (2013.01); *B01L 3/567* (2013.01); *G01N 33/54313* (2013.01); *B01L 2200/0668* (2013.01); *B01L 2300/0618* (2013.01); *B01L 2300/0681* (2013.01); *B01L 2300/0816* (2013.01); *B01L 2300/0829* (2013.01); *B01L 2300/0864* (2013.01); *B01L 2300/0867* (2013.01); *B01L 2300/0874* (2013.01); *B01L 2300/0883* (2013.01); *B01L 2400/0622* (2013.01); *G01N 2800/24* (2013.01)

(56) References Cited

U.S. PATENT DOCUMENTS

| | | |
|---|---|---|
| 8,658,418 B2 | 2/2014 | Daridon |
| 9,174,216 B2 | 11/2015 | Handique et al. |
| 9,610,581 B2 | 4/2017 | Handique et al. |
| 9,707,562 B2 | 7/2017 | Handique et al. |
| 9,821,311 B2 | 11/2017 | Handique et al. |
| 10,350,601 B2 | 7/2019 | Handique et al. |
| 10,416,070 B1 | 9/2019 | Handique |
| 2005/0142624 A1 | 6/2005 | Kitamori et al. |
| 2009/0325276 A1* | 12/2009 | Battrell .............. G01N 33/5302 435/287.2 |
| 2013/0190212 A1 | 7/2013 | Handique et al. |
| 2016/0199838 A1 | 7/2016 | Tandique et al. |
| 2020/0238288 A1* | 7/2020 | Lee .................... C12N 15/1003 |

OTHER PUBLICATIONS

Citation: Gogoi P, Sepehri S, Zhou Y, Gorin MA, Paolillo C, Capoluongo E, et al. (2016) Development of an Automated and Sensitive Microfluidic Device for Capturing and Characterizing Circulating Tumor Cells (CTCs) from Clinical Blood Samples. PLoS One 11(1): e0147400. doi:10.1371/journal.pone.0147400.
International Search Report, Written Opinion and Search Strategy dated Sep. 23, 2019 and received in PCT/US2019/027545.
Provisional Opinion Accompanying the Partial Search Result.

* cited by examiner

Shortest path to the outlet (a)

(b)

(c)

RAPID INDIVIDUALIZED WHOLE BLOOD CHIP FOR ANTIBIOTIC, DRUG, AND FOOD ALLERGIES

CROSS-REFERENCE TO RELATED APPLICATIONS

This application is a § 371 National Stage Application of PCT/US19/27545 filed on Apr. 15, 2019, which claims priority to U.S. 62/657,737 filed on Apr. 14, 2018, both of which are hereby incorporated by reference in their entirety.

FIELD OF THE INVENTION

The present invention relates to ex vivo diagnostics of allergies to, for example, foods and drugs.

BACKGROUND OF THE INVENTION

Antibiotic allergies make up 19-30% of all adverse drug reactions and are common among adults and children. In clinical practice, when antibiotic allergies are not identified, patients may suffer from severe and potentially life-threatening reactions to the antibiotic. Conversely, many patients are labeled with antibiotic allergies in their medical records that are found to be clinically insignificant upon further testing. For example, penicillin allergies are reported in 8% of patient records in the U.S. However, some of these individuals are not truly allergic and can receive penicillin safely. Patients who are misdiagnosed with an antibiotic allergy are frequently treated with alternate antibiotics that are more toxic, less effective, susceptible to resistance, and more expensive.

Unverifiable antibiotic allergy is a growing problem in healthcare and the cost associated with antibiotic-related adverse events in the clinic is an estimated $40 billion annually. Diagnostic tools for rapid and accurate screening of patient antibiotic sensitivity are critical for clinical practice. However, the current diagnostic methods for the evaluation of allergies are severely limited in their use. The sensitivities and specificities of the available tests are variable and many methods are cumbersome due to the need for expensive equipment and long result times.

Presently, in vivo methods such as scratch, puncture, and prick tests (epicutaneous), intradermal testing (intracutaneous), and patch testing require patient exposure to the allergen and could potentially cause morbidity or mortality due to reactions such as anaphylaxis (Ariza, Fernandez, Mayorga, Blanca, & Torres, 2013; Boyce et al., 2010). In vitro tests include techniques for testing blood for the presence of specific IgE antibodies to particular antigens, the Basophil Activation test (BAT), and the Antigen Leukocyte Cellular Antibody (ALCAT) automated food allergy test ("BlueCross BlueShield of North Carolina Corporate Medical Policy: Allergy Testing," 2015; P J Fell P J, 1988; "PRE-PEN (benzylpenicilloyl plylysine injection USP) Skin Test Antigen," 2015; Solensky & Khan, 2014; Song et al). However, these tests often lack sufficient sensitivity and specificity for reliable clinical utilization for ex vivo allergen diagnosis or allergy severity prognosis. For food allergies, the double-blind, placebo-controlled food challenge (DBPCFC) is the gold standard but is must be performed by an allergist, can only be utilized for food allergies, and has the potential to cause a life-threatening anaphylactic reaction.

PRE-PEN® (benzylpenicilloyl polylysine injection USP), the major penicillin allergen determinant, is the only FDA-approved skin test for the diagnosis of penicillin allergy. PRE-PEN® is administered through both scratch and intradermal testing. Unfortunately, the test has significant limitations including subjective readout and the requirement of a trained physician or immunologist to interpret the results. Testing with PRE-PEN alone reportedly identifies up to 90% of patients likely to have immunoglobulin E (IgE)-mediated reactions to penicillin and potentially misses at least 10% that would be caused by the minor determinants penicillin G (benzylpenicillin), penicilloate, and penilloate. No other clinically used drug or antibiotic allergy diagnostic tests are available ("PRE-PEN (benzylpenicilloyl plylysine injection USP) Skin Test Antigen," 2015; Selimović, Jia, & Fraden, 2009; Solensky, 2003). In addition, there is wide acceptance that IgE is necessary but not sufficient for acute allergic reactions. Some co-factors are known, but many have yet to be tested.

Thus, there is clearly a strong need to develop a novel diagnostic tool for reliable and timely diagnosis of allergies to substances such as antibiotics, drugs, and foods.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject.

The present invention relates to a microfluidic chip and proprietary cellular-based immunological algorithm capable of detecting an immunological response to foods, antibiotics, and/or other drugs simultaneously via several biomarkers, and in a single analysis step. This new diagnostic method will detect the presence of an allergic response and predict the severity of the allergy in individuals of any background. The method relies on biomarkers produced by cellular components of whole blood ex vivo, utilizing microfluidic technology described herein after exposure of an individual's blood to allergens (food, antibiotics, and/or other drugs).

In a preferred embodiment, the present invention further comprises a novel combination of whole blood and serum biochemical markers that—when combined together in a weighted mathematical prospective algorithm—will be suited for highly sensitive and specific diagnosis of antigen allergy ex vivo. The algorithm markers include interleukin (IL)-2, IL-4, IL-13, tryptase, histamine, and leukotriene C4 (LTC4), as well as allergen-specific IgEs and IgGs when appropriate. The readout will be generated from these markers weighted with appropriate coefficients or via deep learning algorithms.

The invention described herein enables an allergy test to be fully conducted ex vivo, only requires a blood draw, finger prick, or collection of other biological samples, and has the benefit of not requiring oral or dermal administration of the allergen to a test subject/patient.

Additionally, the invention is capable of simultaneously testing a patient's response to one or multiple allergens. Examples include multiple antibiotics, one or several other drugs, and/or one or multiple food allergens and at a single concentration or at multiple concentrations. Preferably, each test can be conducted in triplicate on the same chip and at the same time to improve the accuracy of the read-out. Accuracy could be further improved by including positive and/or negative controls at the same time.

In a preferred embodiment, the test analyzes the presence and quantity of several biomarkers as a result of the patient's blood sample mixing with an antibiotic, thereby creating a clear profile of the allergic response. For example, the detection of the increased presence of only one biomarker may not be sufficient to indicate hypersensitivity to a drug, but the detection of increased levels of multiple biomarkers may be sufficient. The chip provides a clear readout of the various biomarkers within 4 to 6 hours (for the type I hypersensitivity test); alternatively, a modified version of the chip will provide a readout of the biomarkers within about 96 hours (for the type IV hypersensitivity test).

The chip of the present invention also has the benefit of not requiring an allergist or trained physician for operation or readout. Only standard laboratory staff or medical personnel at a doctor's office or in a hospital will be necessary. Additional benefits of using the described microfluidic device include low reagent volumes (which in this case refers to enzyme-based assay reagents, food and/or drug samples, and the blood sample), the ability to detect minute amounts of biomarkers that could not be adequately quantified utilizing prior technology, and fast processing due to the relatively short diffusion times of reagents on-chip. The present invention relates to an incubation chamber comprising an inlet, an outlet, and a vertical fluidic barrier, wherein said fluidic barrier blocks the diffusion of particles in a solution of 0.1-20 microns in size.

In preferred embodiments, the solution can be a biological solution, a wash solution, a nutrient solution, and/or a solution of beads. Examples of such biological solutions include, but are not limited to, a blood sample, a serum sample, a plasma sample, a urine sample, a fecal sample, a saliva sample, a cerebrospinal fluid (CSF) sample, a bone marrow aspirate sample, and/or a vitreous sample.

Particles in the solution that can be processed and detected include, but are not limited to an antigen, an antibody, capture DNA, capture RNA, capture any protein of interest, and/or capture any particles of interest in the target solution The fluidic barrier that is used in the incubation chamber includes a micro-pillar, a porous wall, a porous membrane, a hydrogel, micro/nano-grid, or a PVDF-PZT composite. Moreover, the fluidic barrier blocks the diffusion of particles of a size selected from: 0.1-20, 0.5 to 20 microns; 0.5 to 10 microns; 0.5 to 5 microns; 5 to 10 microns; 10 to 15 microns; 15 to 20 microns, or 0.1 to 6 microns.

In further preferred embodiments, the incubation chamber further comprises a channel. In preferred embodiments, the channel (a) comprises an outer channel separated from a center channel by the fluidic barrier and/or (b) is a concentric channel. The center channel can be; (a) positioned in between at least two outer channels; and/or (b) surrounded by outer channels.

In further preferred embodiments, the incubation chamber comprises multiple channels. Representative examples of the number of channels in the incubation chamber, include but are not limited to at least 2, 3, 4, 5, 6, 7, 8, 9, 10, 15, 20, 25, 30 or 35 channels. In some preferred embodiments, some and/or even all of the multiple channels are (a) connected to one another; (b) positioned radially, semi-radially, or parallel to one another; and/or (c) at least two channels comprise fluidic barriers that block the diffusion of different sized particles.

The incubation chamber can also comprise multiple inlets and/or outlets, allowing for the addition and/or processing of multiple solutions, including multiple different solutions.

In further preferred embodiments, the channel width is between 1-500 microns in size, and even more preferably, between 50-500 microns in size. In other embodiments, the channel height is between 1-500 microns in size, and even more preferably, between 10-500 microns in size.

In additional preferred embodiments, the incubation chamber of can be created by placing a bi-well insert into a microwell, wherein the fluidic barrier is a porous membrane, porous wall, hydrogel, micro/nano-grid, or PVDF-PZT composite, and wherein the inlet and the outlet are the same. In preferred embodiments, this fluidic barrier of the microwell blocks the diffusion of particles of or 0.1 to 6 microns in size.

In further preferred embodiments, a biological sample can flow into at least 2, 3, 4, 5, 6, 7, 8, 9, 10, 15, 20, 25, 30 or 35 chambers from each channel. In a further embodiment, each chamber comprises a different allergen. In further preferred embodiments, the allergen is selected from Table 1, and in even further preferred embodiments, at least 2, 3, 4, 5, 6, 7, 8, 9, 10, 11, 12, 13, 14, 15, 16, 17, 18, 19, 20, 25, 30, 35, 40, 45, 50, 55, 60 or 65 different allergens are selected from Table 1. In some embodiments, the same allergen is included in three or four different chambers on the chip. As described herein, at least one chamber can comprise a marker used to detect pregnancy, to type blood, or to measure blood counts.

The microfluidic chip can comprise at least one channel and at least one chamber, wherein said chamber is connected to the channel so that a biological sample can flow from the channel to the chamber.

In other embodiments, the incubation chamber described above is integrated with a read-out chamber. Such readout chamber can comprise an inlet and an outlet connected to a channel, wherein said channel comprises a series of sequentially ordered seats having a concave shape with an opening and a separation between the base of the seats, wherein a fluid flowing through said channel exhibits a hydrodynamic resistance, wherein a hydrodynamic resistance ratio between the hydrodynamic resistance of the flow through the first empty seat (R1) and the hydrodynamic resistance of the flow through the next empty seat (R2) is from 1 to 3, wherein R1 is smaller than R2. In some embodiments, the seats of the readout chamber (a) are evenly distributed; (b) comprises multiple rows of sequentially ordered seats. Such multiple rows can be separated by a flow guide structure.

The flow direction of the sample in the readout chamber can be (a) fixed; (b) dynamically changed; and/or (c) controlled by a valve. Such valve can be (a) intermittently switched to change the direction of R2; (b) switched when the sample reaches a row's last sequentially ordered seat; (c) switched when the sample reaches the chamber's last sequentially ordered seat of all odd or even rows.

In other preferred embodiments, the readout chamber comprises (a) between 2-400 seats; (b) between 50-100 seats; (c) between 50-150 seats; (d) between 100-200 seats; (e) between 100-300 seats; (f) between 100-400 seats; or (g) more than 50, 100, 150, 200, 300, 400, 500, 600, 700, 800, 900 or 1000 seats.

Thus, incubation chamber as described above can be incorporated into a microfluidic chip and can also include the readout chamber as described herein.

The microfluidic chip can further comprise at least one antigen, and when multiple antigens are used, the antigens can be different. In preferred embodiments, the antigens are selected from Table 1, and can include at least 2, 3, 4, 5, 6, 7, 8, 9, 10, 11, 12, 13, 14, 15, 16, 17, 18, 19, 20, 25, 30, 35, 40, 45, 50, 55, 60 or 65 different antigens are selected from Table 1. These antigens can be included in three or four different incubation chambers and can be the same or different. Moreover, the antigen can be bound to a microbead. The incubation chambers can also include markers, such as for example, a marker to detect/measure pregnancy, CBC measurements (such as for example white blood cell fractions (such as neutrophils, basophils, eosinophils); hemoglobin levels; platelet levels; human chorionic gonadotropin (hCG); blood serum or plasma viscosity; blood typing; serologic cross-matching; yeast; a primary cell; a cancer cell; stem cell; a differentiation factor; an antibody; an allergen; a drug; a substance used to monitor the change of signal, morphology, cytotoxicity or collecting secreting substance; static droplet arrays; and/or cell free tumor or viral DNA.

In further preferred embodiments, the microfluidic chip of the present invention can have a passive gradient generator so that the concentration gradient of a reagent can be established without a dilution process. In further preferred embodiments, the microfluidic chip of the present invention can generate a concentration gradient profile spanning several orders of magnitude. The concentration gradient profile can be adjusted by the geometrical design of the channels of the microfluidic chip based on hydraulic series resistance analysis.

In preferred embodiments, the microfluidic chip of present invention can comprise a polymer, glass, silicon, metal or combination thereof. Examples of such polymers include, but are not limited to (poly) dimethylsiloxane (PDMS), cyclic olefin copolymer (COC), polyethylene or Teflon™ (PET), Mylar®, or another polymer, hydrogel, glass, or metal. Additionally, the channel can comprise an empty structure with walls made of one of the above materials.

In a preferred embodiment, a kit can comprise the incubation chamber and/or a microfluidic chip comprising an incubation chamber of the present invention, and in further preferred embodiments, the kit can comprise a solution comprising an antibody capable of detecting an immune response. In further preferred embodiments, the antibody is capable of binding to a protein selected from: IgGs, IgEs, histamine, IL-2, IL-4, IL-13, tryptase, or LTC4.

The microfluidic chip or the kit can be used for the diagnosis of an allergic response and/or detect a biological substance in the biological sample. Examples of such substances that can be detected include, but are not limited to: (a) a cell, such as a WBC, (such as a neutrophil, a basophil, or an eosinophil); a platelet; a primary cell; a cancer cell; a stem cell; (b) a molecule, such as Hgb, a differentiation factor, an antibody, an allergen, a drug, human chorionic gonadotropin (hCG), IgGs, IgEs, histamine, IL-2, IL-4, IL-13, tryptase, or LTC4, or a substance used to monitor the change of signal, morphology, cytotoxicity, or levels of a secreted substance; (c) a microorganism, such as yeast; and/or (d) a droplet containing various physio-chemical and/or biological substances. By detecting these substances, one can for example, (a) diagnose an allergic response; (b) detect the substance; and/or (c) analyze or measure the reaction within or between droplets.

The present invention also relates to a method of diagnosing the potential for an allergic response in a patient that involves placing a biological sample obtained from the patient on the microfluidic chip, where it will come in contact with the antigen. The presence or absence of an immune response will then be measured.

In a preferred embodiment, the biological sample is selected from blood, saliva, or urine. In a further preferred embodiment, the method comprises adding a solution containing an antibody capable of detecting an immune response by binding proteins such as IgGs, IgEs, histamine, IL-2, IL-4, IL-13, tryptase, or LTC4. The immune response can be measured by detection of fluorescence microscope, surface plasmon resonance, bead-based solid phase detection methodologies, or colorimetric absorbance methodologies.

In a preferred embodiment, the method of diagnosing the potential for an allergic response in a patient by using the test described herein has greater than 95%, 96%, 97% or 98% (preferably greater than 99%) sensitivity and/or specificity.

The details of one or more embodiments of the invention are set forth in the accompanying drawings and the description below. Other features, objects, and advantages of the invention will be apparent from the description and drawings, and from the claims.

DETAILED DESCRIPTION

The details of one or more embodiments of the invention are set forth in the accompanying drawings and the description below. Other features, objects, and advantages of the invention will be apparent from the description and drawings, and from the claims.

Before describing the present invention in detail, it is to be understood that this invention is not limited to particularly exemplified materials or process parameters as such may, of course, vary. It is also to be understood that the terminology used herein is for the purpose of describing particular embodiments of the invention only, and is not intended to be limiting of the use of alternative terminology to describe the present invention.

Definitions

Unless defined otherwise, all technical and scientific terms used herein have the same meaning as commonly understood by those of ordinary skill in the art, such as in the arts of peptide chemistry, cell culture and phage display, nucleic acid chemistry, and biochemistry. Standard techniques are used for molecular biology, genetic, and biochemical methods (see Sambrook et al., Molecular Cloning: A Laboratory Manual, 3rd ed., 2001, Cold Spring Harbor Laboratory Press, Cold Spring Harbor, NY; Ausubel et al., Short Protocols in Molecular Biology (1999) $4^{th}$ ed., John Wiley & Sons, Inc.), which are incorporated herein by reference.

As used herein, "microfluidic chip" or "chip" is defined as a lab-on-a-chip that comprises at least one channel with an input and an output and at least one chamber that allows the loading of small volumes of biological samples or fluids. The chamber of the chip can be preloaded with any antigens, allergens, and biomarkers. Examples of microchips are described herein.

As used herein, a "microwell" is a chamber in a microtiter plate that is designed to hold liquid volumes between 10 microliters and 10 milliliters. A plate may contain 6, 12, 24, 48, 96, or 384 microwells.

Figure 13:
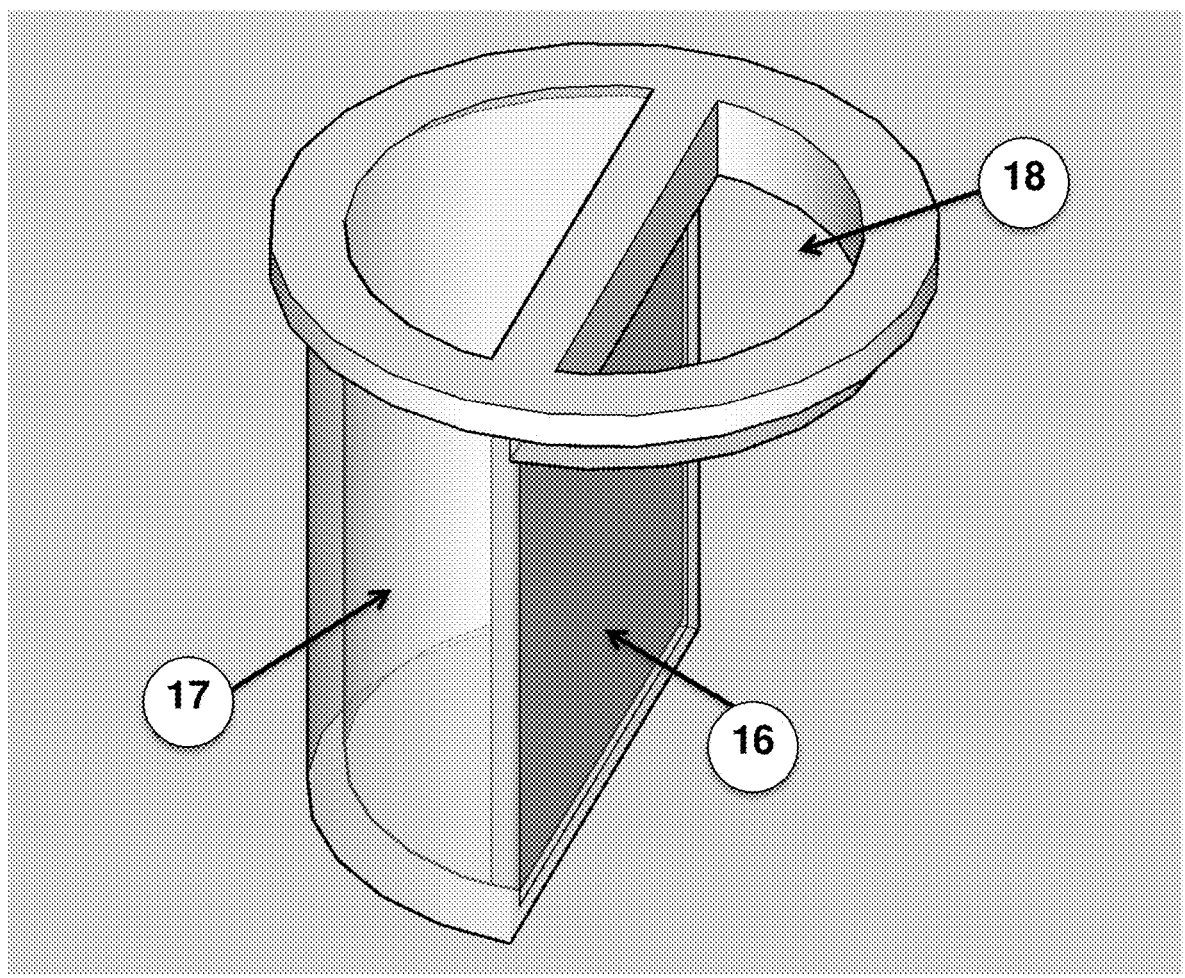
FIG. 13 depicts an example of an individual microwell bi-well insert, which is comprised of a porous vertical fluidic barrier 16, cellular incubation chamber 17, and well access for the washing chamber 18.
Figure 14:
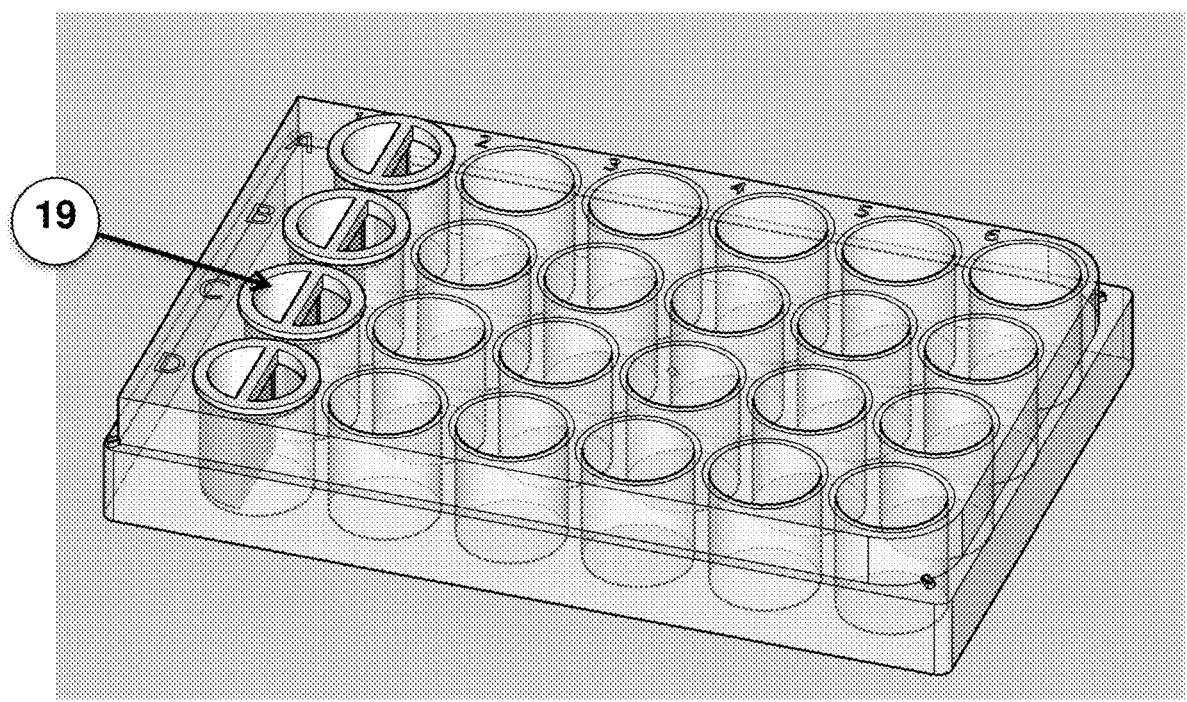
FIG. 14 indicates bi-well insert placed into microplate 19.
Figure 15:
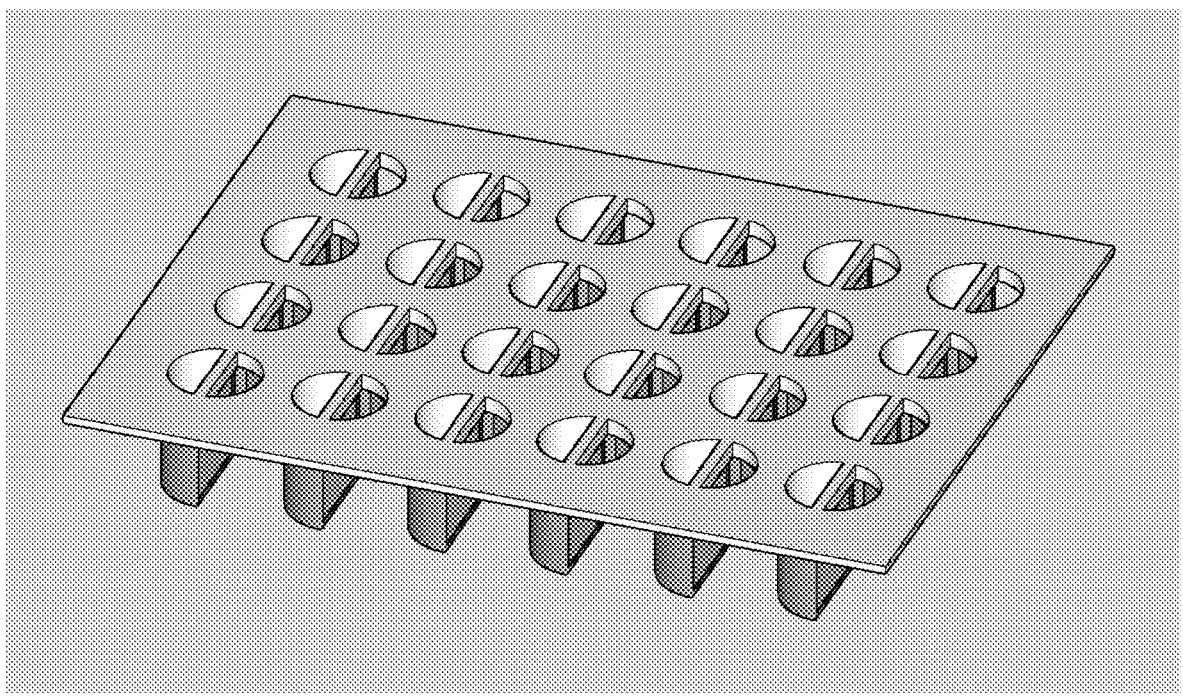
FIG. 15 shows a whole microplate bi-well insert.
Figure 16:
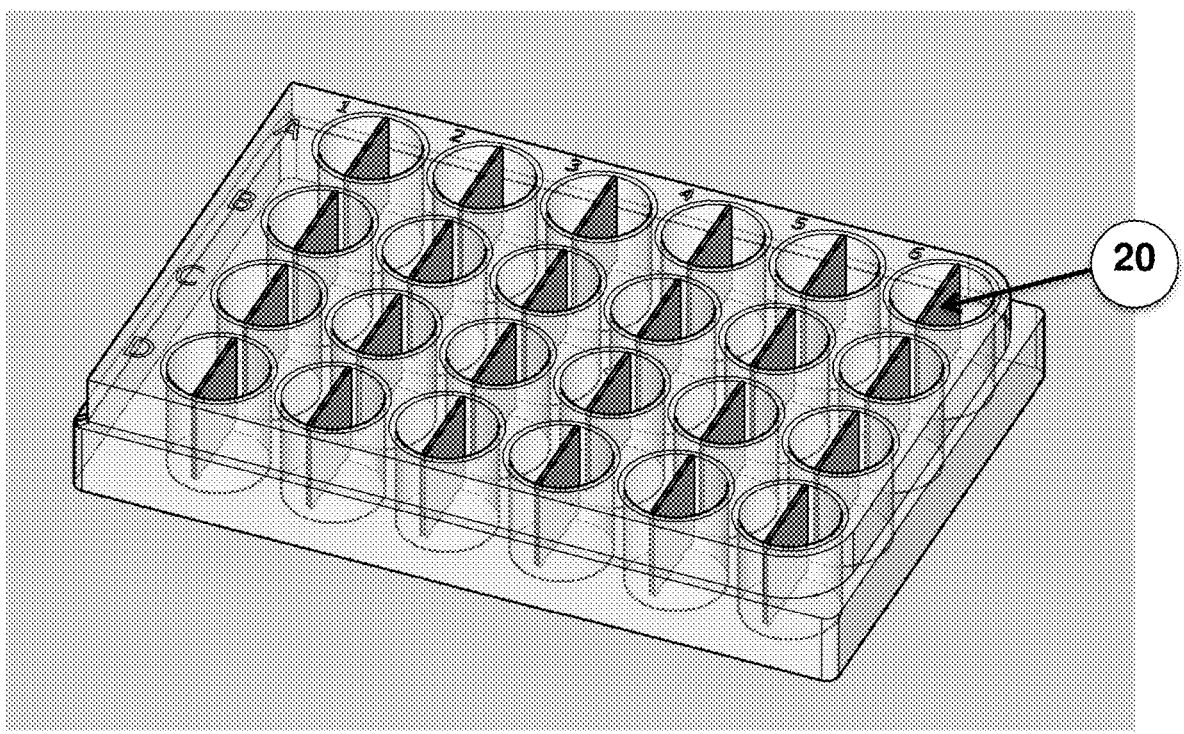
FIG. 16 depicts a microwell plate with built-in bi-well fluidic barrier 20.

As used herein, a "bi-well insert" is a structure comprising a porous vertical fluidic barrier that divides a microwell into two compartments that remain in contact through the aqueous phase, allowing diffusion of soluble molecules. As shown in FIG. 13, a bi-well insert comprises a vertical porous fluidic barrier 16, a cellular incubation chamber 17 containing an inlet, and a washing/capture chamber 18 also containing an inlet, wherein the inlet of the incubation chamber 17 and the washing/capture chamber 18 also functions as an outlet. In preferred embodiments, a bi-well insert can be individually made and "plugged" into a microwell (see, e.g., FIG. 14). In further preferred embodiments, multiple bi-well inserts integrate to form a whole plate insert which conveniently provides bi-wells for the entire plate (see, e.g. FIG. 15-16).

As used herein, a "fluidic barrier" is defined as a structure that blocks particles (e.g., such as microbeads and red blood cells) of a desired size while allowing for the diffusion of smaller molecules. In preferred embodiments, a fluidic barrier comprises micro-pillars. The distance between the "micro-pillars" will determine the size cut-off for particles that can diffuse between the channels. Thus, the fluidic barrier provides fluidic resistance as well as a means of preventing the direct mixing of the sample and a target. Due to the fluidic resistance provided by the micro-pillar, the majority of fluid moves independently. Other similar structures such as porous membranes, porous walls, hydrogels, micro/nano-grids, or PVDF-PZT composite can substitute for the micro-pillar as long as they can provide similar functions.

Figure 4:
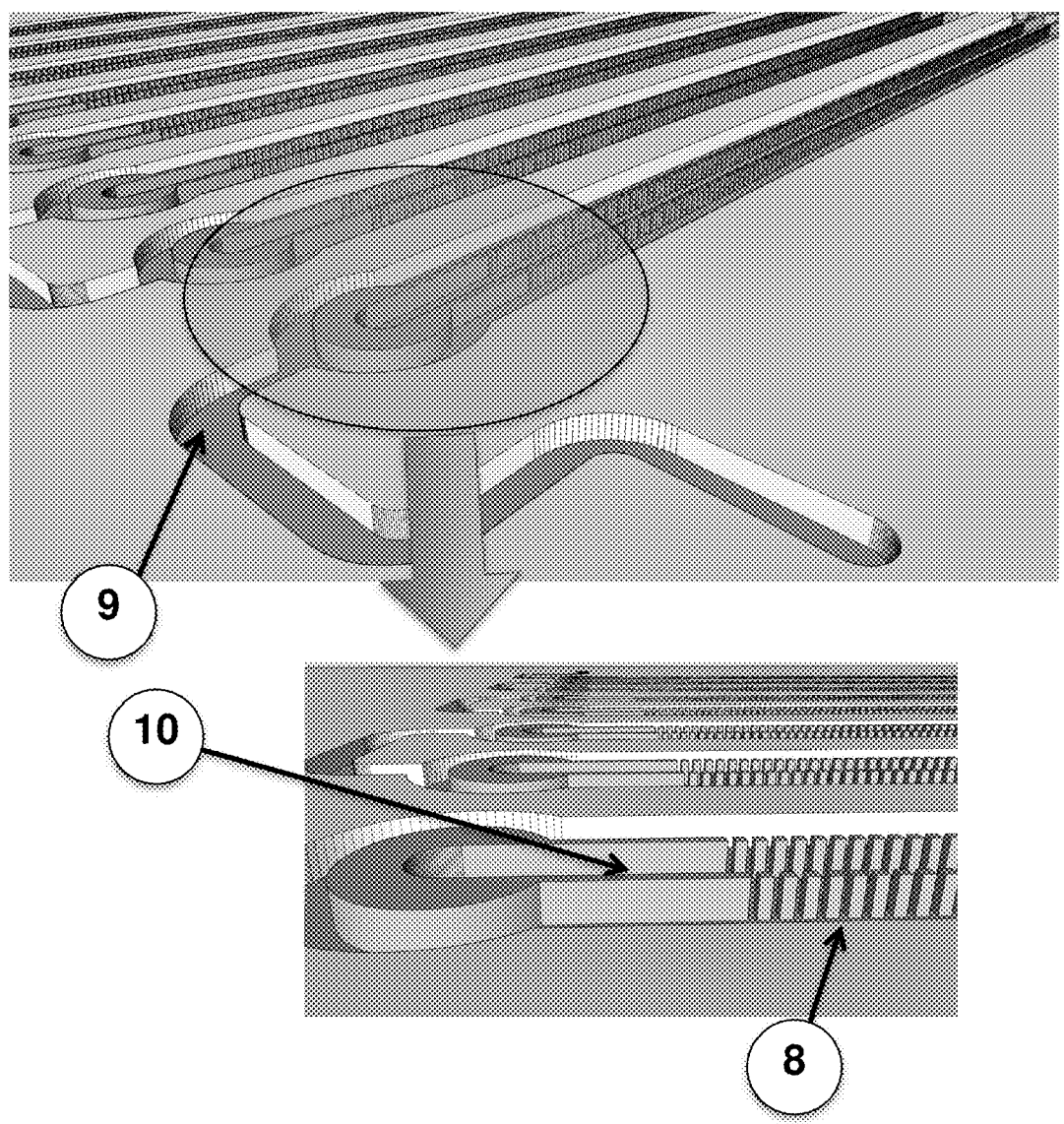
FIG. 4 shows the bottom layer at higher magnification for further detail.

As used herein, a "channel" is defined as a rectangular, circular, or tubular enclosed passage or conduit that allows fluidic substances to pass. As used herein, an "outer channel" is a channel that transports fluidic substances around another channel from which it is separated by pillars 8 or other fluidic barriers as shown in FIG. 4. As used herein, a "center channel" 10 is a channel that is surrounded by the outer channels 9 as shown in FIG. 4. As shown in FIG. 4, the channels may be arranged as concentric channels.

As used herein, an "inlet" and/or an "outlet" refers to a structure allowing the entrance and/or exit of fluidic substances. In some embodiments, the inlet and the outlet are the same.

As used herein, "chamber" is defined as an artificial reservoir or cavity where fluids are collected and stored for use. Assays are conducted in these chambers to determine the presence and amount of one or more biomarkers, e.g., biomarkers associated with an allergic response. As shown in the figures, an "incubation chamber" A is where physical and/or chemical reactions between substances occur and real-time analyte capture takes place. A "washing chamber" B is where microbeads are exposed to a fresh solution to remove unnecessary or unwanted materials from/around the microbeads. A "read-out" chamber C is where samples are arranged and organized to be investigated under an imaging setup.

As used herein, "bridge" refers to a channel, which connects the outlet of a chamber to the inlet of another chamber.

Figure 6:
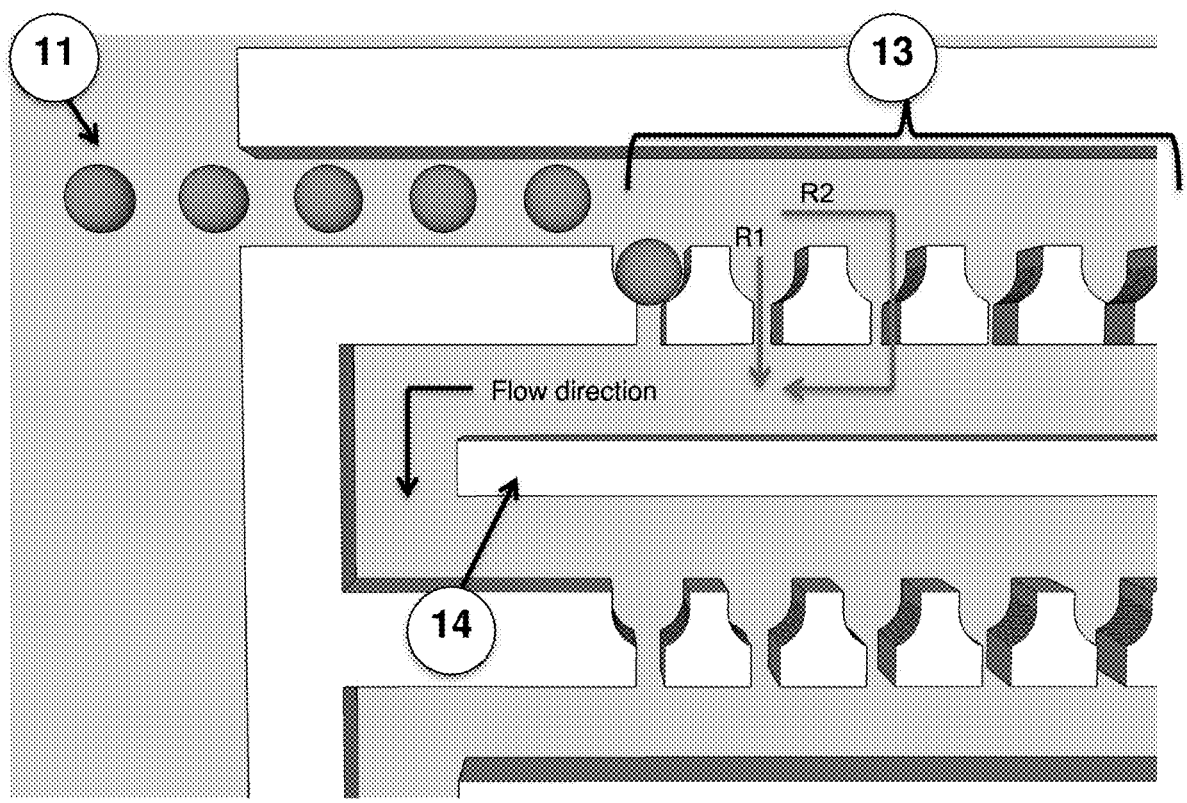
FIG. 6 shows the principle of the one-way readout chamber.

As used herein, a "seat" 13 is defined as a structure that can immobilize or trap an object as shown in FIG. 6.

As used herein, a "flow guide structure" 14 refers to an impenetrable barrier that determines the direction of flow as shown in FIG. 6.

As used herein, "(Poly) dimethylsiloxane", abbreviated as PDMS, is defined as a group of polymeric organosilicon compounds that are commonly referred to as silicones. PDMS is the most widely used silicon-based organic polymer, and is particularly known for its unusual rheological (or flow) properties. PDMS is optically clear, and, in general, inert, non-toxic, and non-flammable. It is also called dimethicone and is one of several types of silicone oil (polymerized siloxane). The chemical formula for PDMS is $CH_3[Si(CH_3)_2O]_nSi(CH_3)_3$, where n is the number of repeating monomer $[SiO(CH_3)_2]$ units.

As used herein, "Polyethylene" (abbreviated PE) or polythene (IUPAC name polyethene or poly(methylene)) is defined as the most common plastic. Many kinds of polyethylene are known, with most having the chemical formula $(C_2H_4)_n$. Thus PE is usually a mixture of similar organic compounds that differ in terms of the value of n.

As used herein, "Teflon™", also called Polytetrafluoroethylene (PTFE), is defined as a synthetic fluoropolymer of tetrafluoroethylene that has numerous applications. The best known brand name of PTFE-based formulas is Teflon™ by DuPont Co.

As used herein, "Cyclo olefin copolymer" (abbreviated COC), also called Cyclo olefin polymer (abbreviated COP), is defined as a polymer or mixture of polymers produced from a cyclic monomer or monomers. The best known brand name of COC is TOPAS Advanced Polymer's TOPAS®.

As used herein, "Polyvinylidene fluoride-lead zirconate titanate composite" (abbreviated PVDF-PZT composite), is defined as a composite material that combines the excellent piezoelectric properties of ceramics with the flexibility and strength of polymers resulting in relatively high dielectric permittivity and breakdown strength.

As used herein, "Mylar®", also called BoPET (Biaxially-oriented polyethylene terephthalate), is defined as a polyester film made from stretched polyethylene terephthalate (PET) and is used for its high tensile strength, chemical and dimensional stability, transparency, reflectivity, gas and aroma barrier properties, and electrical insulation. A variety of companies manufacture boPET and other polyester films under different brand names. In the UK and US, the most well-known trade names are Mylar®, Melinex®, and Hostaphan®.

As used herein, "hydrodynamic resistance" is resistance against fluid flow. We use the analytical solution of Poiseuille flow in a rectangular channel to calculate the hydrodynamic resistance as shown below, where w is the width of the channel, h is the height of the channel, L is the length of the channel and u is the fluid viscosity, $$R_f = \frac{12\mu L}{wh^3}\left[1 - \frac{h}{w}\left(\frac{192}{\pi^5}\sum_{n=1,3,5}^{\infty}\frac{1}{n^5}\tanh\left(\frac{n\pi w}{2h}\right)\right)\right]^{-1}$$

As used herein, "static droplet arrays" are evenly spaced aqueous or oil droplets (Mashaghi et al. "*Droplet microfluidics: A tool for biology, chemistry and nanotechnology*, TrAC Trends in Analytical Chemistry", Volume 82, 2016, Pages 118-125; Clausell-Tormos et al. "*Droplet-Based Microfluidic Platforms for the Encapsulation and Screening of Mammalian Cells and Multicellular Organisms*", Chemistry & Biology, Volume 15, Issue 5, 2008, Pages 427-437.

As used herein, "Deep learning" is one of machine learning methods based on information processing and communication patterns in a biological nervous system. The data representations needed for feature classification are discovered via training from structured, semi-structured or unstructured raw data.

As used herein "Image recognition" means to identify objects, features, or patterns from an image.

As used herein, "biological sample" refers to any specimen taken from a patient. The biological sample can include, for example, peripheral blood, stool, saliva, urine, bone marrow, and/or tissue from a surgical resection. In a preferred embodiment, the biological sample is a peripheral blood sample. It is understood that the biological sample reflects the immunological state of the patient, including various biomarkers for allergic, immunological, and other physiological states.

As used herein, "antigen" refers to any structural substance that, under appropriate conditions, induces a specific immune response and causes the immune system to produce antibodies. The antigen may originate from within the body or from the external environment such as chemicals, bacteria, viruses, and pollen. Antigen is recognized by highly variable antigen receptors such as B cell receptors or T cell receptors of the adaptive immune system.

As used herein, "allergen" is defined as a type of antigen, most often eaten or inhaled, that generates a hypersensitive immune response and causes an allergic reaction. An allergen is capable of stimulating a type-I hypersensitivity reaction through immunoglobulin E (IgE), a type of antibody normally used as a defense against parasitic infections. Allergens can be found in a wide range of environmental sources. Table 1 provides a non-exhaustive list of potential allergens that can be placed in a chamber of the present invention.

As used herein, "parallel", in geometry, means two lines in a plane that do not intersect or touch each other at any point.

As used herein, "radially" refers to a series of lines that meet at a central point in a circle, cylinder, or sphere.

As used herein, "marker", also used interchangeably with biomarker or biological marker, is defined as a measurable indicator of biological processes and biological states or conditions.

As used herein, "target," is defined as a substance or cell of interest that can be detected and quantified.

As used herein, "blood typing" is defined as a method to classify the specific type of blood based on the presence or absence of inherited antigenic substances on the surface of red blood cells. The two most important human blood group systems are ABO (blood type A, B, O, or AB) and RhD antigen (positive, negative, or null).

As used herein, the term "serological cross-matching" refers to a method involving mixing of donor blood, serum, or plasma against recipient blood, serum, or plasma to evaluate for transfusion compatibility.

As used herein, the term "complete blood count" or "CBC" for short refers to a measure of the numbers of different types of blood cells in an individual's body. The measurement includes white blood cell count (WBC, leukocyte), white blood cell types (WBC differential), red blood cell count, hematocrit (HCT, packed cell volume, PCV), hemoglobin, red blood cell indices, platelet count, and mean platelet volume.

As used herein, "polymer" is defined as a macromolecule consisting of a large number of similar subunits bonded together.

As used herein, "hydrogel" is defined as a gel in which water is the dispersion medium. It is a network of hydrophilic polymer chains and is highly absorbent.

As used herein, "kit" refers to any collection of items or components needed for the use of the microfluidic chip.

As used herein, "solution" is defined as a homogeneous liquid mixture that contains two or more substances.

As used herein, "antibody" refers to immunoglobulin molecules and immunologically active portions of immunoglobulin molecules, i.e., molecules that contain an antigen binding site that immunospecifically binds peptide or protein. As such, the term antibody encompasses not only whole antibody molecules, but also antibody fragments as well as variants (including derivatives) of antibodies and antibody fragments. Examples of molecules that are described by the term "antibody" in this application include, but are not limited to: single chain Fvs (scFvs), Fab fragments, Fab' fragments, F(ab')2, disulfide linked Fvs (sdFvs), Fvs, and fragments comprising or alternatively consisting of, either a VL or a VH domain. The term "single chain Fv" or "scFv" as used herein refers to a polypeptide comprising a VL domain of an antibody linked to a VH domain of an antibody.

Additionally, antibodies of the invention include, but are not limited to, monoclonal, multi-specific, bi-specific, human, humanized, mouse, or chimeric antibodies, single chain antibodies, Fab fragments, F(ab') fragments, anti-idiotypic (anti-Id) antibodies (including, e.g., anti-Id antibodies to antibodies of the invention), domain antibodies, and epitope-binding fragments of any of the above. The immunoglobulin molecules of the invention can be of any class (e.g., IgG, IgE, IgM, IgD, IgA and IgY) or subclass (e.g., IgG1, IgG2, IgG3, IgG4, IgA1 and IgA2) of immunoglobulin molecule.

As used herein, "immune response" is defined as the humoral immune response and/or the cell-mediated immune response to an antigen. In the humoral immune response, B lymphocytes produce antibodies that react with processed antigens. In the cell-mediated immune response, T lymphocytes activate macrophages and other immune cells in the presence of processed antigens.

As used herein, "allergic response" is defined as a hypersensitivity immune reaction triggered by substances (allergens) that are normally harmless or would only cause an immune response in certain individuals. Immunoglobulin E is produced in response to the presence of each allergen and causes cells to generate histamines and other substances that produce symptoms of allergic reactions.

As used herein, "fluorescent" refers to a substance that absorbs light and then re-emits it at the same or longer wavelength. Fluorescent substances can be conjugated to antibodies in order to enable detection of antibody binding.

As used herein, "surface plasmon resonance" refers to the resonant oscillation of conduction electrons at the interface between a negative and positive permittivity material stimulated by incidence light. A surface plasmon is an electromagnetic wave propagating along the surface of a thin metal layer and the resonance conditions are influenced by the material adsorbed onto the thin metal film. The surface plasmon resonance is expressed in resonance units and is therefore a measure of mass concentration at the sensor chip surface.

As used herein, "colorimetric" refers to an assay in which a reagent undergoes a color change that indicates the presence of a substance of interest. As an example, an enzymatic colorimetric assay may involve an antibody linked to an enzyme that cleaves a substrate, leading to color change if the enzyme-linked antibody is present.

As used herein, "solid phase detection" refers to an assay in which one substance is immobilized through binding to a solid surface and then potential binding partners are added in the liquid phase. Binding can be detected through colorimetric or fluorescent detection as described above.

As used herein, "bead based detection" refers to an assay in which a substance is coupled to a bead and then exposed to potential binding partners. Again, detection of binding may be accomplished through fluorescent or colorimetric assays.

As used herein, "sensitivity" when used in the context of describing a test refers to the ability of the test to detect a person who has the quality or disease being interrogated by the test. The sensitivity can be described as the "true positive" rate of a test. For example, in the context of allergy, the sensitivity of a test refers to the probability of having a positive result in a person who has the allergy being tested.

As used herein, "specificity" when used in the context of describing a test refers to the ability of the test to correctly identify those who do not have the quality or disease being tested. The specificity is also described as the "true negative" rate of the test.

Table 1 provides a list of potential allergens that can be placed in a chamber of the present invention. Column 1 of Table 1 provides the common name of each allergen. Column 2 lists the species and Column 3 (IUIS Allergen) provides the systemic allergen nomenclature established by the World Health Organization and International Union of Immunological Societies (WHO/IUIS). Column 4 describes the type of allergen and Column 5 provides the structurally related allergens from different species within the same genus, or from closely related genera. Column 6 shows the protein length of the allergen and Column 7 correlates the GenBank Accession Number ("GI #") with each allergen. Each allergen shown on Table 1 can be placed in a chamber on the chip of the present invention. Moreover, combinations of different allergens shown in each row of Table 1 can be included in different chambers on the chip of the present invention. The number of allergens that can be included in different chambers on a chip can vary depending on technical constraints, cost considerations, and/or the diagnosis being made. Thus in some embodiments, the chip can comprise at least 1, 2, 3, 4, 6, 7, 8, 9, 10, 11, 12, 13, 14, 15, 16, 17, 18, 19, 20, 21, 22, 23, 24, 25, 26, 27, 28, 29, 30, 30, 31, 32, 33, 34, 35, 40, 45, 50, 55, 60, 65, 70, 75, 80, 85, or 90 or more different allergens listed in each row of Table 1. Each chip can have different combinations of allergens, with each allergen being tested placed in different chambers on a single chip.

| Common Name | Species | IUIS Allergen | Type | Group | Protein Length | GI# |
|---|---|---|---|---|---|---|
| Abalone | Haliotis diversicolor | Unassigned | Food Animal | Haliotis Hal m 1 tropomyosin | 284 | 9954249 |
| Alaska pollock | Theragra chalcogramma | Unassigned | Food Animal | Theragra parvalbumin | 109 | 14531020 |
| Alaska pollock | Theragra chalcogramma | Unassigned | Food Animal | Theragra parvalbumin | 109 | 14531018 |
| Alder | Alnus glutinosa | Aln g 1 | Aero Plant | Alnus Aln g 1 | 160 | 261407 |
| Alder | Alnus glutinosa | Aln g 1.0101 | Aero Plant | Alnus Aln g 4 | 85 | 3319651 |
| Almond | Prunus dulcis | Unassigned | Food Plant | Prunus persica Pru p 2 IUIS | 241 | 190613941 |
| Almond | Prunus dulcis | Pru du 4.0101 | Food Plant | Prunus Pru 4 Profilin peach cherry almond | 131 | 24473794 |
| Almond | Prunus dulcis | Unassigned | Food Plant | Prunus Pru du 6 Amandin | 531 | 258588247 |
| Almond | Prunus dulcis | Unassigned | Food Plant | Prunus Pru du 6 Amandin | 178 | 523916668 |
| Almond | Prunus dulcis | Pru du 6.0101 | Food Plant | Prunus Pru du 6 Amandin | 551 | 307159112 |
| Almond | Prunus dulcis | Pru du 6.0201 | Food Plant | Prunus Pru du 6 Amandin | 504 | 307159114 |
| Almond | Prunus dulcis | Unassigned | Food Plant | runus Seed allergenic protein 2 (Conglutin gamma | 25 | 75107131 |
| American cockroach | Periplaneta americana | Unassigned | Aero Insect | Periplaneta GST | 216 | 60678789 |
| American cockroach | Periplaneta americana | Unassigned | Aero Insect | Periplaneta GST | 216 | 359326557 |
| American cockroach | Periplaneta americana | Per a 7.0102 | Aero Insect | Periplaneta Per 7 | 284 | 4378573 |
| American cockroach | Periplaneta americana | Per a 7.0101 | Aero Insect | Periplaneta Per 7 | 284 | 4468639 |
| American cockroach | Periplaneta americana | Unassigned | Aero Insect | Periplaneta Per 7 | 284 | 239740599 |
| American cockroach | Periplaneta americana | Per a 1.0201 | Aero Insect | Periplaneta Per a 1 | 446 | 2231297 |
| American cockroach | Periplaneta americana | Per a 1.0104 | Aero Insect | Periplaneta Per a 1 | 274 | 2253610 |
| American cockroach | Periplaneta americana | Per a 1.0103 | Aero Insect | Periplaneta Per a 1 | 395 | 2580504 |
| American cockroach | Periplaneta americana | Per a 1.0102 | Aero Insect | Periplaneta Per a 1 | 228 | 2897849 |
| American cockroach | Periplaneta americana | Per a 1.0101 | Aero Insect | Periplaneta Per a 1 | 231 | 4240399 |
| American cockroach | Periplaneta americana | Unassigned | Aero Insect | Periplaneta Per a 1 | 124 | 30144660 |
| American cockroach | Periplaneta americana | Unassigned | Aero Insect | Periplaneta Per a 1 | 395 | 284518361 |
| American cockroach | Periplaneta americana | Per a 10.0101 | Aero Insect | Periplaneta Per a 10 ser protease | 256 | 60678799 |
| American cockroach | Periplaneta americana | Unassigned | Aero Insect | Periplaneta Per a 2 | 351 | 60678785 |
| American cockroach | Periplaneta americana | Per a 2.0101 | Aero Insect | Periplaneta Per a 2 | 351 | 313870534 |
| American cockroach | Periplaneta americana | Per a 3.0201 | Aero Insect | Periplaneta Per a 3 | 631 | 1531589 |
| American cockroach | Periplaneta americana | Per a 3.0202 | Aero Insect | Periplaneta Per a 3 | 470 | 1580794 |
| American cockroach | Periplaneta americana | Per a 3.0203 | Aero Insect | Periplaneta Per a 3 | 393 | 1580797 |
| American cockroach | Periplaneta americana | Per a 3.0101 | Aero Insect | Periplaneta Per a 3 | 685 | 2833325 |
| American cockroach | Periplaneta americana | Unassigned | Aero Insect | Periplaneta Per a 3 | 688 | 284518363 |
| American cockroach | Periplaneta americana | Unassigned | Aero Insect | Periplaneta Per a 3 | 685 | 289721058 |
| American cockroach | Periplaneta americana | Unassigned | Aero Insect | Periplaneta Per a 4 | 183 | 60678787 |
| American cockroach | Periplaneta americana | Unassigned | Aero Insect | Periplaneta Per a 4 | 163 | 215794707 |
| American cockroach | Periplaneta americana | Unassigned | Aero Insect | Periplaneta Per a 4 | 167 | 212675312 |
| American cockroach | Periplaneta americana | Per a 6.0101 | Aero Insect | Periplaneta Per a 6 | 151 | 60678791 |
| American cockroach | Periplaneta americana | Unassigned | Aero Insect | Periplaneta Per a 9 | 356 | 50428904 |
| American cockroach | Periplaneta americana | Per a 9.0101 | Aero Insect | Periplaneta Per a 9 | 356 | 167782135 |
| American lobster | Homarus americanus | Hom a 1.0102 | Food Animal | Homarus Hom a 1 | 284 | 2660868 |
| American lobster | Homarus americanus | Hom a 1.0101 | Food Animal | Homarus Hom a 1 | 284 | 2660866 |
| American oyster | Crassostrea gigas | Unassigned | Food Animal | Crassostrea Tropomyosin | 233 | 15419048 |
| American oyster | Crassostrea gigas | Unassigned | Food Animal | Crassostrea Tropomyosin | 284 | 219806594 |
| Annual mercury grass | Mercurialis annua | Mer a 1 | Aero Plant | Mercurialis Mer a 1 | 133 | 2959898 |
| Apple | Malus x domestica | Mal d 1.0301 | Food Plant | Malus Mal d 1 | 159 | 1313966 |
| Apple | Malus x domestica | Mal d 1.0401 | Food Plant | Malus Mal d 1 | 160 | 1313968 |
| Apple | Malus x domestica | Mal d 1.0402 | Food Plant | Malus Mal d 1 | 160 | 1313970 |
| Apple | Malus x domestica | Mal d 1.0403 | Food Plant | Malus Mal d 1 | 160 | 1313972 |
| Apple | Malus x domestica | Mal d 1.0206 | Food Plant | Malus Mal d 1 | 159 | 2443824 |
| Apple | Malus x domestica | Mal d 1.0103 | Food Plant | Malus Mal d 1 | 159 | 4590364 |

| Common Name | Species | IUIS Allergen | Type | Group | Protein Length | GI# |
|---|---|---|---|---|---|---|
| Apple | Malus x domestica | Mal d 1.0203 | Food Plant | Malus Mal d 1 | 159 | 4590366 |
| Apple | Malus x domestica | Mal d 1.0204 | Food Plant | Malus Mal d 1 | 159 | 4590368 |
| Apple | Malus x domestica | Mal d 1.0104 | Food Plant | Malus Mal d 1 | 159 | 4590376 |
| Apple | Malus x domestica | Mal d 1.0105 | Food Plant | Malus Mal d 1 | 159 | 4590378 |
| Apple | Malus x domestica | Mal d 1.0106 | Food Plant | Malus Mal d 1 | 159 | 4590380 |
| Apple | Malus x domestica | Mal d 1.0107 | Food Plant | Malus Mal d 1 | 159 | 4590382 |
| Apple | Malus x domestica | Mal d 1.0205 | Food Plant | Malus Mal d 1 | 159 | 4590388 |
| Apple | Malus x domestica | Mal d 1.0208 | Food Plant | Malus Mal d 1 | 158 | 21685277 |
| Apple | Malus x domestica | Mal d 1.0304 | Food Plant | Malus Mal d 1 | 159 | 27922941 |
| Apple | Malus x domestica | Mal d 1.0108 | Food Plant | Malus Mal d 1 | 159 | 4768879 |
| Apple | Malus x domestica | Mal d 1.0201 | Food Plant | Malus Mal d 1 | 159 | 862307 |
| Apple | Malus x domestica | Mal d 1.0102 | Food Plant | Malus Mal d 1 | 159 | 886683 |
| Apple | Malus x domestica | Mal d 1.0101 | Food Plant | Malus Mal d 1 | 159 | 747852 |
| Apple | Malus x domestica | Mal d 1.0109 | Food Plant | Malus Mal d 1 | 159 | 15418742 |
| Apple | Malus x domestica | Mal d 1.0207 | Food Plant | Malus Mal d 1 | 159 | 15418744 |
| Apple | Malus x domestica | Mal d 1.0302 | Food Plant | Malus Mal d 1 | 159 | 15418738 |
| Apple | Malus x domestica | Unassigned | Food Plant | Malus Mal d 2 | 26 | 1478293 |
| Apple | Malus x domestica | Unassigned | Food Plant | Malus Mal d 2 | 246 | 60418842 |
| Apple | Malus x domestica | Unassigned | Food Plant | Malus Mal d 2 | 246 | 60418848 |
| Apple | Malus x domestica | Unassigned | Food Plant | Malus Mal d 2 | 246 | 30316292 |
| Apple | Malus x domestica | Unassigned | Food Plant | Malus Mal d 2 | 158 | 218059718 |
| Apple | Malus x domestica | Unassigned | Food Plant | Malus Mal d 2 | 158 | 218059715 |
| Apple | Malus x domestica | Mal d 2.0101 | Food Plant | Malus Mal d 2 | 193 | 392507603 |
| Apple | Malus x domestica | Unassigned | Food Plant | Malus Mal d 3 | 245 | 3643249 |
| Apple | Malus x domestica | Unassigned | Food Plant | Malus Mal d 3 | 115 | 50659891 |
| Apple | Malus x domestica | Unassigned | Food Plant | Malus Mal d 3 | 115 | 50659889 |
| Apple | Malus x domestica | Unassigned | Food Plant | Malus Mal d 3 | 115 | 50659885 |
| Apple | Malus x domestica | Unassigned | Food Plant | Malus Mal d 3 | 115 | 50659879 |
| Apple | Malus x domestica | Unassigned | Food Plant | Malus Mal d 3 | 115 | 50659859 |
| Apple | Malus x domestica | Unassigned | Food Plant | Malus Mal d 3 | 115 | 38492338 |
| Apple | Malus x domestica | Unassigned | Food Plant | Malus Mal d 3 | 115 | 14423814 |
| Apple | Malus x domestica | Mal d 4.0302 | Food Plant | Malus Mal d 4 | 131 | 28881453 |
| Apple | Malus x domestica | Mal d 4.0102 | Food Plant | Malus Mal d 4 | 131 | 28881457 |
| Apple | Malus x domestica | Mal d 4.0202 | Food Plant | Malus Mal d 4 | 131 | 28881455 |
| Apple | Malus x domestica | Unassigned | Food Plant | Malus Mal d 4 | 131 | 60418854 |
| Apple | Malus x domestica | Unassigned | Food Plant | Malus Mal d 4 | 131 | 60418858 |
| Apple | Malus x domestica | Unassigned | Food Plant | Malus Mal d 4 | 131 | 60418862 |
| Apple | Malus x domestica | Unassigned | Food Plant | Malus Mal d 4 | 131 | 60418866 |
| Apple | Malus x domestica | Unassigned | Food Plant | Malus Mal d 4 | 131 | 164510842 |
| Apple | Malus x domestica | Unassigned | Food Plant | Malus Mal d 4 | 131 | 164510858 |
| Apple | Malus x domestica | Unassigned | Food Plant | Malus Mal d 4 | 131 | 164510860 |
| Apple | Malus x domestica | Unassigned | Food Plant | Malus Mal d 4 | 77 | 218059730 |
| Apple | Malus x domestica | Unassigned | Food Plant | Malus Mal d 4 | 115 | 218059733 |
| Apple | Malus x domestica | Unassigned | Food Plant | Malus Mal d 4 | 131 | 218059728 |
| Apple | Malus x domestica | Mal d 4.0301 | Food Plant | Malus Mal d 4 | 131 | 4761584 |
| Apple | Malus x domestica | Mal d 4.0201 | Food Plant | Malus Mal d 4 | 131 | 4761586 |
| Apple | Malus x domestica | Mal d 4.0101 | Food Plant | Malus Mal d 4 | 131 | 4761588 |
| Apricot | Prunus armeniaca | Pru ar 1 | Food Plant | Prunus PRP (Bet v 1 family) | 160 | 2677826 |
| Apricot | Prunus armeniaca | Unassigned | Food Plant | Prunus Pru 3 | 119 | 313575730 |
| Apricot | Prunus armeniaca | Unassigned | Food Plant | Prunus Pru 3 | 117 | 313575732 |
| Apricot | Prunus armeniaca | Pru ar 3.0101 | Food Plant | Prunus Pru 3 | 117 | 313575734 |

| Common Name | Species | IUIS Allergen | Type | Group | Protein Length | GI# |
|---|---|---|---|---|---|---|
| Apricot | Prunus armeniaca | Unassigned | Food Plant | Prunus Pru 3 | 117 | 313575736 |
| Arizona Cypress | Cupressus arizonica | Cup a 1 | Aero Plant | Cupressus Cup a 1/Cup s 1 | 346 | 6562326 |
| Arizona Cypress | Cupressus arizonica | Cup a 1 | Aero Plant | Cupressus Cup a 1/Cup s 1 | 367 | 19069497 |
| Arizona Cypress | Cupressus arizonica | Unassigned | Aero Plant | Cupressus Cup a 1/Cup s 1 | 347 | 118197955 |
| Arizona Cypress | Cupressus arizonica | Unassigned | Aero Plant | Cupressus Cup s 4 | 165 | 261865475 |
| Arizona Cypress | Cupressus arizonica | Unassigned | Aero Plant | Cupressus Cup s 3 | 199 | 9929163 |
| Arthropod | Protortonia cacti | Unassigned | Food Animal | Protortonia | 335 | 237769615 |
| Asian green mussel | Perna viridis | Unassigned | Food Animal | Perna Tropomyosin | 284 | 9954251 |
| Asian needle ant | Pachycondyla chinensis | Unassigned | Venom or | Pachycondyla Pac c 3 allergen | 199 | 169822894 |
| Asian sea bass | Lates calcarifer | Lat c 1.0101 | Food Animal | Lates Lat c 1 | 109 | 56553743 |
| Asian sea bass | Lates calcarifer | Lat c 1.0201 | Food Animal | Lates Lat c 1 | 109 | 48526356 |
| Atlantic cod | Gadus morhua | Gad m 1.0101 | Food Animal | Gadus Gad c 1 Gad m 1 | 109 | 14531014 |
| Atlantic cod | Gadus morhua | Gad m 1.0201 | Food Animal | Gadus Gad c 1 Gad m 1 | 109 | 14531016 |
| Atlantic cod | Gadus morhua | Gad m 1.0102 | Food Animal | Gadus Gad c 1 Gad m 1 | 109 | 148356691 |
| Atlantic cod | Gadus morhua | Gad m 1.0202 | Food Animal | Gadus Gad c 1 Gad m 1 | 109 | 148356693 |
| Atlantic cod | Gadus morhua | Gad m 2.0101 | Food Animal | Gadus Morhua Gad m 2 | 11 | 576011130 |
| Atlantic cod | Gadus morhua | Gad m 3.0101 | Food Animal | Gadus morhua Gad m 3 | 15 | 576011086 |
| Atlantic herring | Clupea harengus | Clu h 1.0101 | Food Animal | Clupea Clu h 1 | 109 | 242253963 |
| Atlantic herring | Clupea harengus | Clu h 1.0201 | Food Animal | Clupea Clu h 1 | 110 | 242253965 |
| Atlantic herring | Clupea harengus | Clu h 1.0301 | Food Animal | Clupea Clu h 1 | 109 | 242253967 |
| Atlantic mackerel | Scomber scombrus | Unassigned | Food Animal | Scomber Parvalbumin | 109 | 288557436 |
| Avocado | Persea americana | Pers a 1 | Aero Plant | Persea Pers a 1 | 326 | 3201547 |
| Bacteria | Bacillus lentus | Unassigned | Bacteria airway | Bacillus lentus subtilisin | 269 | 267048 |
| Bacteria | Bacillus licheniformis | Unassigned | Bacteria airway | Bacillus licheniformis subtilisin | 379 | 135016 |
| Bacteria | Bacillus licheniformis | Unassigned | Bacteria airway | Bacillus licheniformis subtilisin | 374 | 11127680 |
| Bacteria | Bacillus sp. | Unassigned | Bacteria airway | Bacillus lentus Esperase | 361 | 1225905 |
| Bacteria | Staphylococcus aureus | Unassigned | Bacteria skin | Staphylococcus enterotoxin SEA | 233 | 1633233 |
| Bacteria | Staphylococcus aureus | Unassigned | Bacteria skin | Staphylococcus enterotoxin SEB | 254 | 83308249 |
| Bacteria | Staphylococcus aureus | Unassigned | Bacteria skin | Staphylococcus enterotoxin SEC | 266 | 462026 |
| Bacteria | Staphylococcus aureus | Unassigned | Bacteria skin | Staphylococcus enterotoxin SED | 258 | 119654 |
| Bacteria | Staphylococcus aureus | Unassigned | Bacteria skin | Staphylococcus enterotoxin TSST 1 | 234 | 136457 |
| Bahia grass | Paspalum notatum | Unassigned | Aero Plant | Paspalum group 13 pollen allergen | 169 | 338930686 |
| Bahia grass | Paspalum notatum | Unassigned | Aero Plant | Paspalum group 13 pollen allergen | 169 | 338930684 |
| Bahia grass | Paspalum notatum | Unassigned | Aero Plant | Paspalum group 13 pollen allergen | 169 | 338930682 |
| Bahia grass | Paspalum notatum | Unassigned | Aero Plant | Paspalum group 13 pollen allergen | 169 | 338930680 |
| Bahia grass | Paspalum notatum | Unassigned | Aero Plant | Paspalum group 13 pollen allergen | 393 | 338930678 |
| Bahia grass | Paspalum notatum | Unassigned | Aero Plant | Paspalum group 13 pollen allergen | 393 | 338930676 |
| Bahia grass | Paspalum notatum | Unassigned | Aero Plant | Paspalum group 13 pollen allergen | 391 | 338930674 |
| Bahia grass | Paspalum notatum | Unassigned | Aero Plant | Paspalum group 13 pollen allergen | 395 | 338930672 |
| Balsam of Peru | Paspalum notatum | Pas n 1.0101 | Aero Plant | Paspalum Pas n 1 beta expansin | 265 | 168419914 |
| Baltic cod | Gadus callarias | Gad c 1 | Food Animal | Gadus Gad c 1 Gad m 1 | 113 | 131112 |
| Banana | Musa acuminata | Unassigned | Food Plant | Musa Allergen Endo-Beta-1,3-Glucanase | 312 | 83754908 |
| Banana | Musa acuminata | Mus a 4.0101 | Food Plant | Musa Mus a 4 | 200 | 88191901 |
| Banana | Musa acuminata | Mus a 2.0101 | Food Plant | Musa Mus s 2 | 318 | 17932710 |
| Banana | Musa acuminata | Mus xp 1 | Food Plant | Musa profilin banana | 131 | 14161635 |
| Banana | Musa acuminata AAA Group | Unassigned | Food Plant | Musa Allergen Endo-Beta-1,3-Glucanase | 340 | 6073860 |
| Banana Prawn | Fenneropenaeus merguiensis | Unassigned | Food Animal | Fenneropenaeus hemocyanin banana shrimp | 661 | 530340505 |
| Banana Prawn | Fenneropenaeus merguiensis | Unassigned | Food Animal | Fenneropenaeus enolase | 117 | 344049993 |
| Barley | Hordeum vulgare | Unassigned | Aero Plant | Hordeum Alpha-amylase inhibitor component | 149 | 585290 |
| Barley | Hordeum vulgare | Unassigned | Aero Plant | Hordeum LTP 1 | 117 | 167077 |

| Common Name | Species | IUIS Allergen | Type | Group | Protein Length | GI# |
|---|---|---|---|---|---|---|
| Barley | Hordeum vulgare | Unassigned | Aero Plant | Hordeum Trypsin inhibitor CMe | 144 | 1405736 |
| Barley | Hordeum vulgare subsp vulgare | Unassigned | Aero Plant | Hordeum Alpha-amylase inhibitor BDAI-1 | 152 | 3367714 |
| Barley | Hordeum vulgare subsp vulgare | Unassigned | Aero Plant | Hordeum Alpha-amylase inhibitor component | 144 | 18955 |
| Barley | Hordeum vulgare subsp vulgare | Unassigned | Aero Plant | Hordeum Alpha-amylase inhibitor component | 145 | 439275 |
| Barley | Hordeum vulgare subsp vulgare | Unassigned | Aero Plant | Hordeum Trypsin inhibitor CMe | 148 | 19009 |
| Barley | Hordeum vulgare | Hor v 20.0101 | Food Plant | Hordeum Hor v 20 | 289 | 1708280 |
| Barley | Hordeum vulgare | Unassigned | Food Plant | Hordeum Hor v 20 | 286 | 288709 |
| Barley | Hordeum vulgare | Unassigned | Food Plant | Hordeum LTP 1 | 134 | 19039 |
| Barley | Hordeum vulgare subsp vulgare | Hor v 15.0101 | Food Plant | Hordeum Hor v 15 | 146 | 19003 |
| Bell pepper | Capsicum annuum | Cap a 1 | Food Plant | Capsicum Cap a 1 | 246 | 16609959 |
| Bell pepper | Capsicum annuum | Cap a 2 | Food Plant | Capsicum Cap a 2 | 131 | 16555785 |
| Benguela hake | Merluccius polli | Unassigned | Food Anima | Merluccius sp. Parvalbumin Hake | 108 | 308191471 |
| Benguela hake | Merluccius polli | Unassigned | Food Animal | Merluccius sp. Parvalbumin Hake | 69 | 308191484 |
| Bent grass | Agrostis alba | Unassigned | Aero Plant | Agrostis Agr a 1 | 26 | 320606 |
| Bent grass | Agrostis alba | Unassigned | Aero Plant | Agrostis Agr a 1 | 35 | 75139987 |
| Bent grass | Agrostis alba | Unassigned | Aero Plant | Agrostis Agr a 1 | 35 | 75139989 |
| Bermuda grass | Cynodon dactylon | Cyn d 1 | Aero Plant | Cynodon Cyn d 1 | 25 | 451274 |
| Bermuda grass | Cynodon dactylon | Cyn d 1 | Aero Plant | Cynodon Cyn d 1 | 38 | 451275 |
| Bermuda grass | Cynodon dactylon | Cyn d 1 | Aero Plant | Cynodon Cyn d 1 | 34 | 691726 |
| Bermuda grass | Cynodon dactylon | Cyn d 1.0204 | Aero Plant | Cynodon Cyn d 1 | 244 | 10314021 |
| Bermuda grass | Cynodon dactylon | Cyn d 1.0201 | Aero Plant | Cynodon Cyn d 1 | 244 | 15384338 |
| Bermuda grass | Cynodon dactylon | Cyn d 1.0202 | Aero Plant | Cynodon Cyn d 1 | 262 | 16076693 |
| Bermuda grass | Cynodon dactylon | Cyn d 1 | Aero Plant | Cynodon Cyn d 1 | 262 | 16076695 |
| Bermuda grass | Cynodon dactylon | Cyn d 1.0203 | Aero Plant | Cynodon Cyn d 1 | 262 | 16076697 |
| Bermuda grass | Cynodon dactylon | Cyn d 1.0101 | Aero Plant | Cynodon Cyn d 1 | 246 | 7687901 |
| Bermuda grass | Cynodon dactylon | Cyn d 12 | Aero Plant | Cynodon Cyn d 12 | 131 | 2154730 |
| Bermuda grass | Cynodon dactylon | Unassigned | Aero Plant | Cynodon Cyn d 7 | 71 | 1247373 |
| Bermuda grass | Cynodon dactylon | Unassigned | Aero Plant | Cynodon Cyn d 7 | 73 | 1247375 |
| Bermuda grass | Cynodon dactylon | Cyn d 7 | Aero Plant | Cynodon Cyn d 7 | 82 | 1871507 |
| Bermuda grass | Cynodon dactylon | Unassigned | Aero Plant | Cynodon Group 4 like-allergen FAD-linked | 522 | 41393750 |
| Bigfin reef squid | Sepioteuthis lessoniana | Unassigned | Food Animal | Sepioteuthis tropomyosin | 284 | 83715930 |
| Birch | Betula sp. | Unassigned | Aero Plant | Betula Bet v 1 | 51 | 298736 |
| Birch | Betula sp. | Unassigned | Aero Plant | Betula Bet v 1b | 51 | 298737 |
| biting midges | Forcipomyia taiwana | For t 1.0101 | Venom or | Forcipomyia For t 1 | 118 | 188572341 |
| biting midges | Forcipomyia taiwana | For t 2.0101 | Venom or | Forcipomyia For t 2 | 325 | 188572343 |
| Black Fire Ant | Solenopsis richteri | Sol r 2.0101 | Venom or | Solenopsis Sol i and Sol r Venom allergen II | 119 | 6136162 |
| Black Fire Ant | Solenopsis richteri | Sol r 3.0101 | Venom or | Solenopsis Venom allergen III | 211 | 6136163 |
| Black mulberry | Morus nigra | Mor n 3.0101 | Food Plant | Morus Mor n 3 mulberry LTP | 91 | 288561913 |
| Black tiger shrimp | Penaeus monodon | Pen m 1.0101 | Food Animal | Penaeus Pen m 1 tropomyosin | 284 | 60892782 |
| Black tiger shrimp | Penaeus monodon | Pen m 2 | Food Animal | Penaeus Pen m 2 | 356 | 27463265 |
| Black tiger shrimp | Penaeus monodon | Unassigned | Food Animal | Penaeus Pen m 2 | 356 | 308154236 |
| Black tiger shrimp | Penaeus monodon | Pen m 3.0101 | Food Animal | Penaeus Pen m 3 myosin light chain | 177 | 317383196 |
| Black tiger shrimp | Penaeus monodon | Pen m 4.0101 | Food Animal | Penaeus Pen m 4 sarcoplasmic calcium binding | 193 | 317383198 |
| Black walnut | Juglans nigra | Jug n 1.0101 | Food Plant | Juglans Jug r 1 Jug n 1 | 161 | 31321942 |
| Black walnut | Juglans nigra | Jug n 2.0101 | Food Plant | Juglans Jug r 2 | 481 | 31321944 |
| Blue hake | Macruronus novaezelandiae | Unassigned | Food Animal | Merluccius sp. Parvalbumin Hake | 83 | 308191475 |
| Blue Lupin | Lupinus angustifolius | Unassigned | Food Plant | Lupinus Lup an 1 conglutin beta | 521 | 149208401 |
| Blue Lupin | Lupinus angustifolius | Unassigned | Food Plant | Lupinus Lup an 1 conglutin beta | 455 | 149208403 |
| Blue Lupin | Lupinus angustifolius | Lup an 1.0101 | Food Plant | Lupinus Lup an 1 conglutin beta | 611 | 169950562 |
| blue swimmer crab | Portunus pelagicus | Por p 1.0101 | Food Animal | Portunus Por p 1 tropomyosin | 284 | 448278534 |
| Bovine | Bos taurus | Unassigned | Aero Mite | Vaccine | 1364 | 27806257 |

| Common Name | Species | IUIS Allergen | Type | Group | Protein Length | GI# |
|---|---|---|---|---|---|---|
| Bovine | Bos taurus | Unassigned | Food Animal | Bos Alpha-s1 casein | 93 | 162650 |
| Bovine | Bos taurus | Unassigned | Food Animal | Bos Alpha-s1 casein | 214 | 162794 |
| Bovine | Bos taurus | Unassigned | Food Animal | Bos Alpha-s1 casein | 76 | 162927 |
| Bovine | Bos taurus | Bos d 9.0101 | Food Animal | Bos Alpha-s1 casein | 214 | 30794348 |
| Bovine | Bos taurus | Unassigned | Food Animal | Bos Alpha-s1 casein | 205 | 159793197 |
| Bovine | Bos taurus | Unassigned | Food Animal | Bos Alpha-s1 casein | 172 | 159793201 |
| Bovine | Bos taurus | Unassigned | Food Animal | Bos Alpha-s1 casein | 129 | 159793217 |
| Bovine | Bos taurus | Bos d 10.0101 | Food Animal | Bos Bos d 10 | 222 | 27806963 |
| Bovine | Bos taurus | Unassigned | Food Animal | Bos Bos d 11 beta casein | 224 | 162797 |
| Bovine | Bos taurus | Unassigned | Food Animal | Bos Bos d 11 beta casein | 224 | 162805 |
| Bovine | Bos taurus | Unassigned | Food Animal | Bos Bos d 11 beta casein | 224 | 459292 |
| Bovine | Bos taurus | Unassigned | Food Animal | Bos Bos d 12 | 190 | 162811 |
| Bovine | Bos taurus | Bos d 12.0101 | Food Animal | Bos Bos d 12 | 172 | 27881412 |
| Bovine | Bos taurus | Unassigned | Food Animal | Bos Bos d 2 | 101 | 2497701 |
| Bovine | Bos taurus | Bos d 3 | Aero Animal | Bos Bos d 3 | 142 | 2493414 |
| Bovine | Bos taurus | Unassigned | Aero Animal | Bos Bos d 4 | 142 | 295774 |
| Bovine | Bos taurus | Bos d 4.0101 | Food Animal | Bos Bos d 4 | 178 | 163283 |
| Bovine | Bos taurus | Bos d 5 | Food Animal | Bos Bos d 5 | 14 | 520 |
| Bovine | Bos taurus | Unassigned | Food Animal | Bos Bos d 5 | 178 | 162750 |
| Bovine | Bos taurus | Unassigned | Food Animal | Bos Bos d 5 | 178 | 125910 |
| Bovine | Bos taurus | Unassigned | Food Animal | Bos Bos d 5 | 607 | 195957138 |
| Bovine | Bos taurus | Bos d 6 | Food Animal | Bos Bos d 6 | 607 | 162648 |
| Bovine | Bos taurus | Unassigned | Food Animal | Bos Bos d 6 | 708 | 3336842 |
| Bovine | Bos taurus | Unassigned | Food Animal | Bos lactotransferrin | 146 | 30794292 |
| Brazil nut | Bertholletia excelsa | Ber e 1 | Food Plant | Bertholletia Ber e 1 | 465 | 112754 |
| Brazil nut | Bertholletia excelsa | Ber e 2 | Food Plant | Bertholletia Ber e 2 | 137 | 30313867 |
| Brazilian Fire Ant | Solenopsis saevissima | Unassigned | Venom or | Solenopsis Sol g 4 Sol i 4 | 109 | 291092710 |
| Brook trout | Salvelinus fontinalis | Unassigned | Food Animal | Salvelinus parvalbumin | 108 | 288557438 |
| Brook trout | Salvelinus fontinalis | Unassigned | Food Animal | Salvelinus parvalbumin | 284 | 288557440 |
| Brown garden snail | Helix aspersa | Hel as 1.0101 | Venom or | Helix Hel as 1 tropomyosin | 284 | 4468224 |
| Brown shrimp | Farfantepenaeus aztecus | Pen a 1 | Food Animal | Farfantepenaeus Pen a 1 | 133 | 73532979 |
| Buckwheat | Fagopyrum esculentum | Unassigned | Food Plant | Fagopyrum BW 8 kDa protein | 127 | 17907758 |
| Buckwheat | Fagopyrum esculentum | Fag e 2.0101 | Food Plant | Fagopyrum Fag e 2 Fag t 2 | 149 | 61970231 |
| Buckwheat | Fagopyrum esculentum | Unassigned | Food Plant | Fagopyrum Fag e 2 Fag t 2 | 565 | 83416591 |
| Buckwheat | Fagopyrum esculentum | Unassigned | Food Plant | Fagopyrum Legumin-like protein | 504 | 29839254 |
| Buckwheat | Fagopyrum esculentum | Unassigned | Food Plant | Fagopyrum Legumin-like protein | 538 | 29839255 |
| Buckwheat | Fagopyrum esculentum | Fag e 3.0101 | Food Plant | Fagopyrum vicilin-like protein | 136 | 29839419 |
| Buckwheat | Fagopyrum tataricum | Unassigned | Food Plant | Fagopyrum BW 8 kDa protein | 133 | 146217148 |
| Buckwheat | Fagopyrum tataricum | Fag t 2.0101 | Food Plant | Fagopyrum Fag e 2 Fag t 2 | 149 | 144228127 |
| Buckwheat | Fagopyrum tataricum | Unassigned | Food Plant | Fagopyrum Legumin-like protein | 515 | 320445237 |
| Bumblebee | Bombus pennsylvanicus | Bom p 1.0101 | Venom or | Bombus Bom p 1 | 136 | 113200131 |
| Bumblebee | Bombus pennsylvanicus | Bom p 4.0101 | Venom or | Bombus Bom p 4 protease | 243 | 47117013 |
| Bumblebee | Bombus terrestris | Bom t 1.0101 | Venom or | Bombus Bom t 1 | 136 | 75009997 |
| Bumblebee | Bombus terrestris | Unassigned | Food Plant | Bombus Bom t 4 protease | 20 | 14423832 |
| Cabbage | Brassica oleracea | Unassigned | Aero Plant | Brassica Bra o 3 LTP manual entry | 20 | 313471465 |
| Canary grass | Phalaris aquatica | Pha a 1 | Aero Plant | Phalaris Pha a 1 | 269 | 1 |
| Canary grass | Phalaris aquatica | Pha a 5.0101 | Aero Plant | Phalaris Pha a 5 | 320 | 409328 |
| Canary grass | Phalaris aquatica | Unassigned | Aero Plant | Phalaris Pha a 5 | 305 | 2498576 |
| Canary grass | Phalaris aquatica | Unassigned | Aero Plant | Phalaris Pha a 5 | 294 | 2498577 |

-continued

| Common Name | Species | IUIS Allergen | Type | Group | Protein Length | GI# |
|---|---|---|---|---|---|---|
| Canary grass | Phalaris aquatica | Unassigned | Aero Plant | Phalaris Pha a 5 | 175 | 2498580 |
| Caridean shrimp | Pandalus borealis | Pan b 1.0101 | Food Animal | Pandalus Pan b 1 | 284 | 312831088 |
| Carp | Cyprinus carpio | Cyp c 1.0101 | Food Animal | Cyprinus Cyp c 1 Parvalbumin | 109 | 17977825 |
| Carp | Cyprinus carpio | Cyp c 1.0201 | Food Animal | Cyprinus Cyp c 1 Parvalbumin | 109 | 17977827 |
| Carrot | Daucus carota | Unassigned | Food Plant | Daucus cyclophilin | 171 | 373939374 |
| Carrot | Daucus carota | Dau c 1.0101 | Food Plant | Daucus Dau c 1 | 168 | 1335877 |
| Carrot | Daucus carota | Dau c 1.0102 | Food Plant | Daucus Dau c 1 | 154 | 1663522 |
| Carrot | Daucus carota | Dau c 1.0103 | Food Plant | Daucus Dau c 1 | 154 | 2154732 |
| Carrot | Daucus carota | Dau c 1.0104 | Food Plant | Daucus Dau c 1 | 154 | 2154734 |
| Carrot | Daucus carota | Dau c 1.0105 | Food Plant | Daucus Dau c 1 | 154 | 2154736 |
| Carrot | Daucus carota | Dau c 1.0201 | Food Plant | Daucus Dau c 1 | 154 | 18652047 |
| Carrot | Daucus carota | Unassigned | Food Plant | Daucus Dau c 1 | 154 | 19912791 |
| Carrot | Daucus carota | Dau c 1.0301 | Food Plant | Daucus Dau c 1 | 154 | 302379147 |
| Carrot | Daucus carota | Unassigned | Food Plant | Daucus Dau c 1 | 154 | 302379149 |
| Carrot | Daucus carota | Unassigned | Food Plant | Daucus Dau c 1 | 154 | 302379151 |
| Carrot | Daucus carota | Unassigned | Food Plant | Daucus Dau c 1 | 154 | 302379153 |
| Carrot | Daucus carota | Unassigned | Food Plant | Daucus Dau c 1 | 154 | 302379155 |
| Carrot | Daucus carota | Unassigned | Food Plant | Daucus Dau c 1 | 154 | 302379157 |
| Carrot | Daucus carota | Unassigned | Food Plant | Daucus Dau c 1 | 154 | 302379159 |
| Carrot | Daucus carota | Dau c 4 | Food Plant | Daucus Dau c 4 | 134 | 18652049 |
| Carrot | Daucus carota | Dau c 5.0101 | Food Plant | Daucus Dau c 5 isoflavone reductase | 306 | 373939378 |
| Carrot | Daucus carota | Unassigned | Food Plant | Daucus Dau c 5 isoflavone reductase | 306 | 373939376 |
| Cashew | Anacardium occidentale | Ana o 1.0102 | Food Plant | Anacardium Ana o 1 | 536 | 21666498 |
| Cashew | Anacardium occidentale | Ana o 1.0101 | Food Plant | Anacardium Ana o 1 | 538 | 21914823 |
| Cashew | Anacardium occidentale | Ana o 2 | Food Plant | Anacardium Ana o 2 | 457 | 25991543 |
| Cashew | Anacardium occidentale | Ana o 3 | Food Plant | Anacardium Ana o 3 | 138 | 24473800 |
| Cassava | Manihot esculenta | Man e 5.0101 | Food Plant | Manihot Man e 5.0101 | 177 | 21585695 |
| Cassava | Manihot esculenta | Unassigned | Food Plant | Manihot Man e 5.0101 | 177 | 332713934 |
| Castor bean | Ricinus communis | Ric c 1.0101 | Food Plant | Ricinus Ric c 1 | 258 | 21068 |
| Cat | Felis catus | Fel d 1 | Aero Animal | Felis Fel d 1 Chain 1 | 88 | 1364212 |
| Cat | Felis catus | Fel d 1 | Aero Animal | Felis Fel d 1 Chain 1 | 92 | 1364213 |
| Cat | Felis catus | Fel d 1 | Aero Animal | Felis Fel d 1 Chain 1 | 92 | 1169665 |
| Cat | Felis catus | Fel d 1.0101 | Aero Animal | Felis Fel d 1 Chain 1 | 92 | 163825 |
| Cat | Felis catus | Unassigned | Aero Animal | Felis Fel d 1 Chain 1 | 88 | 114326420 |
| Cat | Felis catus | Unassigned | Aero Animal | Felis Fel d 1 chain 2 | 107 | 395407 |
| Cat | Felis catus | Fel d 1.0101 | Aero Animal | Felis Fel d 1 chain 2 | 109 | 163823 |
| Cat | Felis catus | Fel d 2.0101 | Aero Animal | Felis Fel d 2 | 608 | 886485 |
| Cat | Felis catus | Fel d 3 | Aero Animal | Felis Fel d 3 | 98 | 17939981 |
| Cat | Felis catus | Fel d 4 | Aero Animal | Felis Fel d 4 | 186 | 45775300 |
| Cat | Felis catus | Fel d 7.0101 | Aero Animal | Felis Fel d 7 | 180 | 301072397 |
| Cat | Felis catus | Fel d 8.0101 | Aero Animal | Felis Fel d 8 latherin-like | 228 | 303387468 |
| Cedar | Juniperus rigida | Unassigned | Aero Plant | Juniperus Jun a 3 | 225 | 38456224 |
| Cedar | Juniperus rigida | Unassigned | Aero Plant | Juniperus Jun a 3 | 225 | 38456222 |
| Celery | Apium graveolens | Api g 1.0101 | Food Plant | Apium Api g 1 | 154 | 1346568 |
| Celery | Apium graveolens | Api g 1.0201 | Food Plant | Apium Api g 1 | 159 | 14423646 |
| Celery | Apium graveolens | Api g 2.0101 | Food Plant | Apium Api g 2 | 118 | 256600126 |
| Celery | Apium graveolens | Api g 4 | Food Plant | Apium Api g 4 | 134 | 4761578 |
| Celery | Apium graveolens | Api g 5.0101 | Food Plant | Apium Api g 5 | 86 | 33300920 |
| Celery | Apium graveolens Rapaceum Group | Api g 6.0101 | Food Plant | Apium graveolens Api g 6 LTP 2 | 67 | 550540827 |
| Cephalosporins |  |  | Chemical |  |  |  |
| Cherry | Prunus avium | Pru av 1.0101 | Food Plant | Prunus PRP (Bet v 1 family) | 160 | 1513216 |

-continued

| Common Name | Species | IUIS Allergen | Type | Group | Protein Length | GI# |
|---|---|---|---|---|---|---|
| Cherry | Prunus avium | Pru av 1.0203 | Food Plant | Prunus PRP (Bet v 1 family) | 160 | 44409496 |
| Cherry | Prunus avium | Pru av 1.0202 | Food Plant | Prunus PRP (Bet v 1 family) | 160 | 44409474 |
| Cherry | Prunus avium | Pru av 1.0201 | Food Plant | Prunus PRP (Bet v 1 family) | 160 | 44409451 |
| Cherry | Prunus avium | Unassigned | Food Plant | Prunus Pru 3 | 159 | 159162378 |
| Cherry | Prunus avium | Pru av 3 | Food Plant | Prunus Pru 3 | 117 | 6715520 |
| Cherry | Prunus avium | Unassigned | Food Plant | Prunus Pru 3 | 117 | 313575726 |
| Cherry | Prunus avium | Unassigned | Food Plant | Prunus Pru 3 | 131 | 313575728 |
| Cherry | Prunus avium | Pru av 4 | Food Plant | Prunus Pru 4 Profilin peach cherry almond | 245 | 4761582 |
| Cherry | Prunus avium | Pru av 2 | Food Plant | Prunus Pru av 2 | 245 | 1144346 |
| Chicken | Gallus gallus | Gal d 1 | Food Animal | Gallus Gal d 1 | 210 | 124757 |
| Chicken | Gallus gallus | Unassigned | Food Animal | Gallus Gal d 1 | 210 | 209979542 |
| Chicken | Gallus gallus | Gal d 2 | Food Animal | Gallus Gal d 2 | 155 | 63052 |
| Chicken | Gallus gallus | Gal d 2.0101 | Food Animal | Gallus Gal d 2 | 386 | 129293 |
| Chicken | Gallus gallus | Gal d 2 | Food Animal | Gallus Gal d 2 | 386 | 808969 |
| Chicken | Gallus gallus | Gal d 2 | Food Animal | Gallus Gal d 2 | 385 | 15826578 |
| Chicken | Gallus gallus | Unassigned | Food Animal | Gallus Gal d 2 | 385 | 34811333 |
| Chicken | Gallus gallus | Gal d 3.0101 | Food Animal | Gallus Gal d 3 | 705 | 757851 |
| Chicken | Gallus gallus | Gal d 3 | Food Animal | Gallus Gal d 3 | 705 | 1351295 |
| Chicken | Gallus gallus | Gal d 4 | Food Animal | Gallus Gal d 4 | 147 | 126608 |
| Chicken | Gallus gallus | Gal d 4 | Food Animal | Gallus Gal d 4 | 24 | 212279 |
| Chicken | Gallus gallus | Gal d 4.0101 | Food Animal | Gallus Gal d 4 | 147 | 63581 |
| Chicken | Gallus gallus | Gal d 5 | Food Animal | Gallus Gal d 5 | 615 | 63748 |
| Chicken | Gallus gallus | Unassigned | Food Animal | Gallus Gal d 6 YGP42 | 284 | 3 |
| Chicken | Gallus gallus | Unassigned | Food Anima | Gallus parvalbumin | 110 | 225877920 |
| Chinese mitten crab | Eriocheir sinensis | Unassigned | Food Animal | Eriocheir tropomyosin | 284 | 134305330 |
| Chinese razor clam | Sinonovacula constricta | Unassigned | Food Animal | Sinonovacula tropomyosin [Song paper] | 284 | 156145810 |
| Chinese white shrimp | Fenneropenaeus chinensis | Unassigned | Food Animal | Fenneropenaeus Arginine kinase | 53 | 46486948 |
| Chinese white shrimp | Fenneropenaeus chinensis | Unassigned | Food Animal | Fenneropenaeus Arginine kinase | 53 | 46486951 |
| Chinese-date | Ziziphus mauritiana | Ziz m 1.0101 | Food Plant | Ziziphus Ziz m 1 | 330 | 61225281 |
| Chromium | | | Metals | | | |
| Chub mackerel | Scomber japonicus | Unassigned | Food Animal | Scomber Parvalbumin | 109 | 29420793 |
| Chum salmon | Oncorhynchus keta | Onc k 5.0101 | Food Animal | Oncorhynchus Onc k 5 | 193 | 296040357 |
| clam | Scapharca broughtonii | Unassigned | Food Animal | Scapharca tropomyosin | 284 | 219806592 |
| Clam | Tresus keenae | Unassigned | Food Animal | Tresus tropomyosin | 284 | 219806600 |
| Clam | Venerupis philippinarum | Unassigned | Food Animal | Venerupis tropomyosin | 284 | 219806573 |
| Cobalt chloride | | | Metals | | | |
| Coffee | Coffea arabica | Cof a 1.0101 | Food Plant | Coffea Cof a 1 | 263 | 296399179 |
| Common Amaranth | Amaranthus retroflexus | Ama r 2.0101 | Aero Plant | Amaranthus Ama r 2 Profilin | 133 | 227937304 |
| Common timothy | Phleum pratense | Phl p 1.0102 | Aero Plant | Phleum Phl p 1 | 263 | 473360 |
| Common timothy | Phleum pratense | Phl p 1.0101 | Aero Plant | Phleum Phl p 1 | 263 | 3901094 |
| Common timothy | Phleum pratense | Phl p 1 | Aero Plant | Phleum Phl p 1 | 241 | 28373838 |
| Common timothy | Phleum pratense | Unassigned | Aero Plant | Phleum Phl p 1 | 240 | 45823012 |
| Common timothy | Phleum pratense | Unassigned | Aero Plant | Phleum Phl p 1 | 262 | 1582250 |
| Common timothy | Phleum pratense | Phl p 11 | Aero Plant | Phleum Phl p 11 | 143 | 23452313 |
| Common timothy | Phleum pratense | Phl p 12.0103 | Aero Plant | Phleum Phl p 12 | 131 | 2415700 |
| Common timothy | Phleum pratense | Unassigned | Aero Plant | Phleum Phl p 12 | 131 | 110644906 |
| Common timothy | Phleum pratense | Unassigned | Aero Plant | Phleum Phl p 12 | 131 | 110644908 |
| Common timothy | Phleum pratense | Unassigned | Aero Plant | Phleum Phl p 12 | 131 | 110644910 |
| Common timothy | Phleum pratense | Unassigned | Aero Plant | Phleum Phl p 12 | 131 | 110644912 |
| Common timothy | Phleum pratense | Unassigned | Aero Plant | Phleum Phl p 12 | 131 | 110644914 |
| Common timothy | Phleum pratense | Unassigned | Aero Plant | Phleum Phl p 12 | 131 | 110644916 |

| Common Name | Species | IUIS Allergen | Type | Group | Protein Length | GI# |
|---|---|---|---|---|---|---|
| Common timothy | Phleum pratense | Unassigned | Aero Plant | Phleum Phl p 12 | 131 | 110644918 |
| Common timothy | Phleum pratense | Phl p 12.0102 | Aero Plant | Phleum Phl p 12 | 131 | 2415698 |
| Common timothy | Phleum pratense | Phl p 12.0101 | Aero Plant | Phleum Phl p 12 | 131 | 453976 |
| Common timothy | Phleum pratense | Phl p 13 | Aero Plant | Phleum Phl p 13 | 394 | 4826572 |
| Common timothy | Phleum pratense | Phl p 2 | Aero Plant | Phleum Phl p 2 | 122 | 415896 |
| Common timothy | Phleum pratense | Phl p 4.0101 | Aero Plant | Phleum Phl p 4 | 508 | 54144332 |
| Common timothy | Phleum pratense | Unassigned | Aero Plant | Phleum Phl p 4 | 500 | 45108973 |
| Common timothy | Phleum pratense | Unassigned | Aero Plant | Phleum Phl p 4 | 500 | 45108967 |
| Common timothy | Phleum pratense | Unassigned | Aero Plant | Phleum Phl p 4 | 500 | 189014266 |
| Common timothy | Phleum pratense | Unassigned | Aero Plant | Phleum Phl p 4 | 500 | 189014268 |
| Common timothy | Phleum pratense | Unassigned | Aero Plant | Phleum Phl p 4 | 500 | 189014270 |
| Common timothy | Phleum pratense | Unassigned | Aero Plant | Phleum Phl p 4 | 500 | 189014272 |
| Common timothy | Phleum pratense | Phl p 4.0201 | Aero Plant | Phleum Phl p 4 | 508 | 405944794 |
| Common timothy | Phleum pratense | Phl p 5.0101 | Aero Plant | Phleum Phl p 5 | 312 | 54144334 |
| Common timothy | Phleum pratense | Phl p 5 | Aero Plant | Phleum Phl p 5 | 257 | 398830 |
| Common timothy | Phleum pratense | Phl p 5 | Aero Plant | Phleum Phl p 5 | 280 | 422005 |
| Common timothy | Phleum pratense | Phl p 5 | Aero Plant | Phleum Phl p 5 | 24 | 481397 |
| Common timothy | Phleum pratense | Unassigned | Aero Plant | Phleum Phl p 5 | 285 | 75139900 |
| Common timothy | Phleum pratense | Phl p 5.0202 | Aero Plant | Phleum Phl p 5 | 281 | 1092249 |
| Common timothy | Phleum pratense | Phl p 5.0104 | Aero Plant | Phleum Phl p 5 | 276 | 1684718 |
| Common timothy | Phleum pratense | Phl p 5.0102 | Aero Plant | Phleum Phl p 5 | 286 | 1684720 |
| Common timothy | Phleum pratense | Phl p 5.0105 | Aero Plant | Phleum Phl p 5 | 276 | 2398757 |
| Common timothy | Phleum pratense | Phl p 5.0106 | Aero Plant | Phleum Phl p 5 | 276 | 3135497 |
| Common timothy | Phleum pratense | Phl p 5.0107 | Aero Plant | Phleum Phl p 5 | 276 | 3135499 |
| Common timothy | Phleum pratense | Phl p 5.0108 | Aero Plant | Phleum Phl p 5 | 276 | 3135501 |
| Common timothy | Phleum pratense | Phl p 5.0103 | Aero Plant | Phleum Phl p 5 | 312 | 3135503 |
| Common timothy | Phleum pratense | Phl p 5.0203 | Aero Plant | Phleum Phl p 5 | 295 | 3309039 |
| Common timothy | Phleum pratense | Phl p 5.0206 | Aero Plant | Phleum Phl p 5 | 290 | 3309041 |
| Common timothy | Phleum pratense | Phl p 5.0207 | Aero Plant | Phleum Phl p 5 | 287 | 3309045 |
| Common timothy | Phleum pratense | Phl p 5 | Aero Plant | Phleum Phl p 5 | 275 | 3309047 |
| Common timothy | Phleum pratense | Unassigned | Aero Plant | Phleum Phl p 5 | 287 | 13430402 |
| Common timothy | Phleum pratense | Unassigned | Aero Plant | Phleum Phl p 5 | 287 | 21725606 |
| Common timothy | Phleum pratense | Unassigned | Aero Plant | Phleum Phl p 5 | 287 | 21725608 |
| Common timothy | Phleum pratense | Unassigned | Aero Plant | Phleum Phl p 5 | 287 | 21725610 |
| Common timothy | Phleum pratense | Unassigned | Aero Plant | Phleum Phl p 5 | 287 | 21725612 |
| Common timothy | Phleum pratense | Unassigned | Aero Plant | Phleum Phl p 5 | 287 | 21725614 |
| Common timothy | Phleum pratense | Unassigned | Aero Plant | Phleum Phl p 5 | 287 | 21725616 |
| Common timothy | Phleum pratense | Unassigned | Aero Plant | Phleum Phl p 5 | 287 | 21725618 |
| Common timothy | Phleum pratense | Unassigned | Aero Plant | Phleum Phl p 5 | 287 | 21725620 |
| Common timothy | Phleum pratense | Unassigned | Aero Plant | Phleum Phl p 5 | 287 | 21725622 |
| Common timothy | Phleum pratense | Unassigned | Aero Plant | Phleum Phl p 5 | 287 | 21725624 |
| Common timothy | Phleum pratense | Unassigned | Aero Plant | Phleum Phl p 5 | 287 | 21725626 |
| Common timothy | Phleum pratense | Unassigned | Aero Plant | Phleum Phl p 5 | 287 | 21725628 |
| Common timothy | Phleum pratense | Unassigned | Aero Plant | Phleum Phl p 5 | 287 | 21725630 |
| Common timothy | Phleum pratense | Unassigned | Aero Plant | Phleum Phl p 5 | 287 | 21725632 |
| Common timothy | Phleum pratense | Phl p 5 | Aero Plant | Phleum Phl p 5 | 102 | 28948464 |
| Common timothy | Phleum pratense | Phl p 5.0109 | Aero Plant | Phleum Phl p 5 | 284 | 29500897 |
| Common timothy | Phleum pratense | Phl p 5.0201 | Aero Plant | Phleum Phl p 5 | 284 | 2398759 |
| Common timothy | Phleum pratense | Unassigned | Aero Plant | Phleum Phl p 5 | 309 | 345108717 |
| Common timothy | Phleum pratense | Phl p 6.0102 | Aero Plant | Phleum Phl p 6 | 138 | 3004465 |
| Common timothy | Phleum pratense | Phl p 6.0101 | Aero Plant | Phleum Phl p 6 | 138 | 3004467 |

-continued

| Common Name | Species | IUIS Allergen | Type | Group | Protein Length | GI# |
|---|---|---|---|---|---|---|
| Common timothy | Phleum pratense | Unassigned | Aero Plant | Phleum Phl p 6 | 106 | 3004469 |
| Common timothy | Phleum pratense | Unassigned | Aero Plant | Phleum Phl p 6 | 111 | 28374072 |
| Common timothy | Phleum pratense | Phl p 7.0101 | Aero Plant | Phleum Polcalin (Phl p 7) | 78 | 3367732 |
| Common timothy | Phleum pratense | Unassigned | Aero Plant | Phleum pollen allergen group 3 | 100 | 283806867 |
| Corn | Zea mays | Unassigned | Aero Plant | Zea group 13 pollen allergen | 410 | 89892725 |
| Corn | Zea mays | Unassigned | Aero Plant | Zea group 13 pollen allergen | 404 | 89892727 |
| Corn | Zea mays | Unassigned | Aero Plant | Zea group 13 pollen allergen | 411 | 89892729 |
| Corn | Zea mays | Zea m 1.0101 | Aero Plant | Zea pollen specific protein | 170 | 1588669 |
| Corn | Zea mays | Unassigned | Aero Plant | Zea Zea m 1 beta-expansin | 269 | 28630919 |
| Corn | Zea mays | Unassigned | Aero Plant | Zea Zea m 1 beta-expansin | 269 | 28630923 |
| Corn | Zea mays | Unassigned | Aero Plant | Zea Zea m 1 beta-expansin | 269 | 14193761 |
| Corn | Zea mays | Unassigned | Aero Plant | Zea Zea m 1 beta-expansin | 245 | 114794319 |
| Corn | Zea mays | Unassigned | Aero Plant | Zea Zea m 1 isoform | 263 | 89892721 |
| Corn | Zea mays | Unassigned | Aero Plant | Zea Zea m 1 isoform | 252 | 89892723 |
| Corn | Zea mays | Unassigned | Aero Plant | Zea Zea m 1 isoform | 99 | 105969543 |
| Corn | Zea mays | Unassigned | Aero Plant | Zea Zea m 1 isoform | 269 | 105969545 |
| Corn | Zea mays | Unassigned | Aero Plant | Zea Zea m 1 isoform | 270 | 115502167 |
| Corn | Zea mays | Unassigned | Aero Plant | Zea Zea m 1 isoform | 269 | 115502168 |
| Corn | Zea mays | Unassigned | Aero Plant | Zea Zea m 25 thioredoxin | 128 | 66841002 |
| Corn | Zea mays | Zea m 12.0104 | Food Plant | Zea Zea m 12 profilin | 131 | 2642324 |
| Corn | Zea mays | Unassigned | Food Plant | Zea Zea m 12 profilin | 131 | 110644952 |
| Corn | Zea mays | Unassigned | Food Plant | Zea Zea m 12 profilin | 131 | 110644954 |
| Corn | Zea mays | Unassigned | Food Plant | Zea Zea m 12 profilin | 131 | 110644956 |
| Corn | Zea mays | Unassigned | Food Plant | Zea Zea m 12 profilin | 131 | 110644958 |
| Corn | Zea mays | Unassigned | Food Plant | Zea Zea m 12 profilin | 131 | 110644960 |
| Corn | Zea mays | Unassigned | Food Plant | Zea Zea m 12 profilin | 130 | 110644962 |
| Corn | Zea mays | Unassigned | Food Plant | Zea Zea m 12 profilin | 131 | 110644964 |
| Corn | Zea mays | Zea m 12.0101 | Food Plant | Zea Zea m 12 profilin | 137 | 313138 |
| Corn | Zea mays | Zea m 12.0102 | Food Plant | Zea Zea m 12 profilin | 131 | 313140 |
| Corn | Zea mays | Zea m 12.0103 | Food Plant | Zea Zea m 12 profilin | 131 | 313142 |
| Corn | Zea mays | Zea m 12.0105 | Food Plant | Zea Zea m 12 profilin | 131 | 11493677 |
| Corn | Zea mays | Zea m 14.0101 | Food Plant | Zea Zea m 14 | 120 | 168576 |
| Corn | Zea mays | Zea m 14.0102 | Food Plant | Zea Zea m 14 | 99 | 168578 |
| Crab | Charybdis feriatus | Cha f 1.0101 | Food Animal | Charybdis Cha f 1 | 264 | 7024506 |
| Crab | Portunus sanguinolentus | Unassigned | Food Animal | Portunus Por p 1.0101 tropomyosin | 284 | 119674937 |
| Crab | Portunus trituberculatus | Unassigned | Food Animal | Portunus Por p 1.0101 tropomyosin | 284 | 151505281 |
| Crimson seabream | Evynnis japonica | Unassigned | Food Anima | Evynnis parvalbumin | 109 | 327342663 |
| Crimson seabream | Evynnis japonica | Unassigned | Food Anima | Evynnis parvalbumin | 108 | 327342661 |
| Crustacean | Balanus rostratus | Unassigned | Food Animal | Balanus r tropomyosin | 284 | 125659386 |
| cuttle fish | Sepia esculenta | Unassigned | Food Animal | Sepia tropomyosin | 284 | 83715928 |
| Danube crayfish | Pontastacus leptodactylus | Pon l 4.0101 | Food Animal | Pontastacus Pon l 4 | 192 | 134309 |
| Date palm | Phoenix dactylifera | Pho d 2 | Aero Plant | Phoenix Pho d 2 | 131 | 21322677 |
| Deep-water cape hake | Merluccius paradoxus | Unassigned | Food Animal | Merluccius sp. Parvalbumin Hake | 108 | 308191457 |
| Deep-water cape hake | Merluccius paradoxus | Unassigned | Food Animal | Merluccius sp. Parvalbumin Hake | 108 | 308191470 |
| Deep-water cape hake | Merluccius paradoxus | Unassigned | Food Animal | Merluccius sp. Parvalbumin Hake | 95 | 308191483 |
| Dilantin | | | Chemical | | | |
| Disk abalone | Haliotis discus discus | Unassigned | Food Animal | Haliotis Hal m 1 tropomyosin | 284 | 219806586 |
| Disk abalone | Haliotis discus discus | Unassigned | Food Animal | Haliotis paramyosin | 860 | 318609972 |
| Dog | Canis familiaris | Can f 1.0101 | Aero Animal | Canis Can f 1 Lipocalin | 174 | 2598974 |
| Dog | Canis familiaris | Can f 2 | Aero Animal | Canis Can f 2 Lipocalin | 177 | 29292272 |
| Dog | Canis familiaris | Can f 2 | Aero Animal | Canis Can f 2 Lipocalin | 179 | 29292274 |

-continued

| Common Name | Species | IUIS Allergen | Type | Group | Protein Length | GI# |
|---|---|---|---|---|---|---|
| Dog | Canis familiaris | Can f 2.0101 | Aero Animal | Canis Can f 2 Lipocalin | 180 | 2598976 |
| Dog | Canis familiaris | Can f 3 | Aero Animal | Canis Can f 3 Serum albumin | 265 | 633938 |
| Dog | Canis familiaris | Can f 3 | Aero Animal | Canis Can f 3 Serum albumin | 585 | 3319897 |
| Dog | Canis familiaris | Can f 3.0101 | Aero Animal | Canis Can f 3 Serum albumin | 608 | 22531688 |
| Dog | Canis familiaris | Can f 4.0101 | Aero Animal | Canis Can f 4 epithelial 18 kDa | 174 | 262232390 |
| Dog | Canis familiaris | Can f 5.0101 | Aero Animal | Canis Can f 5 | 260 | 868 |
| Dog | Canis familiaris | Can f 6.0101 | Aero Animal | Canis Can f 6 Lipocalin | 190 | 374092884 |
| Domestic guinea pig | Cavia porcellus | Cav p 1 | Aero Animal | Cavia Cav p 1 | 15 | 32469617 |
| Domestic guinea pig | Cavia porcellus | Cav p 2.0101 | Aero Animal | Cavia Cav p 2 | 170 | 325910590 |
| Domestic guinea pig | Cavia porcellus | Cav p 3.0101 | Aero Animal | Cavia Cav p 3 lipocalin | 170 | 325910592 |
| Dust Mite | Tyrophagus putrescentiae | Unassigned | Aero mite | Tyrophagus Tyr p 10 tropomyosin | 284 | 148615631 |
| Dust Mite | Tyrophagus putrescentiae | Unassigned | Aero mite | Tyrophagus Tyr p 10 tropomyosin | 201 | 156938915 |
| Dust Mite | Tyrophagus putrescentiae | Tyr p 10.0101 | Aero mite | Tyrophagus Tyr p 10 tropomyosin | 284 | 48249227 |
| Dust Mite | Tyrophagus putrescentiae | Tyr p 13 | Aero mite | Tyrophagus Tyr p 13 | 131 | 51860756 |
| Dust Mite | Tyrophagus putrescentiae | Unassigned | Aero mite | Tyrophagus Tyr p 13 | 130 | 121296500 |
| Dust Mite | Tyrophagus putrescentiae | Unassigned | Aero mite | Tyrophagus Tyr p 13 | 131 | 156938917 |
| Dust Mite | Tyrophagus putrescentiae | Tyr p 2 | Aero mite | Tyrophagus Tyr p 2 | 141 | 2182106 |
| Dust Mite | Tyrophagus putrescentiae | Tyr p 24.0101 | Aero mite | Tyrophagus Tyr p 24 Troponin C | 153 | 219815476 |
| Dust Mite | Tyrophagus putrescentiae | Tyr p 3.0101 | Aero mite | Tyrophagus Tyr p 3 | 285 | 167540622 |
| Dust Mite | Tyrophagus putrescentiae | Unassigned | Aero mite | Tyrophagus Tyr p 8 | 218 | 452215228 |
| Eastern oyster | Crassostrea virginica | Unassigned | Food Animal | Crassostrea Tropomyosin | 160 | 3668408 |
| Egg | | | Food | | | |
| English walnut | Juglans regia | Jug r 1.0101 | Food Plant | Juglans Jug r 1 Jug n 1 | 139 | 1794252 |
| English walnut | Juglans regia | Jug r 2.0101 | Food Plant | Juglans Jug r 2 | 593 | 6580762 |
| English walnut | Juglans regia | Unassigned | Food Plant | Juglans Jug r 3 | 119 | 209484145 |
| English walnut | Juglans regia | Jug r 4.0101 | Food Plant | Juglans Jug r 4 seed storage protein | 507 | 56788031 |
| European ash | Fraxinus excelsior | Unassigned | Aero Plant | Fraxinus excelsior profilin | 134 | 589912889 |
| European ash | Fraxinus excelsior | Fra e 1.0201 | Aero Plant | Fraxinus Fra e 1 | 146 | 34978692 |
| European ash | Fraxinus excelsior | Fra e 1.0102 | Aero Plant | Fraxinus Fra e 1 | 145 | 56122438 |
| European ash | Fraxinus excelsior | Fra e 1.0101 | Aero Plant | Fraxinus Fra e 1 | 145 | 33327133 |
| European Beech | Fagus sylvatica | Unassigned | Aero Plant | Fagus Fag s 1 | 160 | 212291472 |
| European Beech | Fagus sylvatica | Fag s 1 | Aero Plant | Fagus Fag s 1 | 160 | 212291470 |
| European Beech | Fagus sylvatica | Unassigned | Aero Plant | Fagus Fag s 1 | 160 | 212291474 |
| European chestnut | Castanea sativa | Cas 1 | Aero Plant | Castanea Cas s 1 | 160 | 16555781 |
| European chestnut | Castanea sativa | Unassigned | Aero Plant | Castanea Cas s 1 | 159 | 212291466 |
| European chestnut | Castanea sativa | Cas s 1.0101 | Aero Plant | Castanea Cas s 1 | 159 | 212291464 |
| European chestnut | Castanea sativa | Unassigned | Aero Plant | Castanea Cas s 1 | 159 | 212291468 |
| European chestnut | Castanea sativa | Unassigned | Aero Plant | Castanea Cas s 5 | 298 | 307159110 |
| European chestnut | Castanea sativa | Cas s 5 | Food Plant | Castanea Cas s 5 | 316 | 1359600 |
| European hake | Merluccius merluccius | Unassigned | Food Animal | Merluccius sp. Parvalbumin Hake | 108 | 131116 |
| European hake | Merluccius merluccius | Unassigned | Food Animal | Merluccius sp. Parvalbumin Hake | 108 | 308191469 |
| European hazelnut | Corylus avellana | Cor a 1.0103 | Aero Plant | Corylus Cor a 1 | 160 | 22684 |
| European hazelnut | Corylus avellana | Cor a 1.0104 | Aero Plant | Corylus Cor a 1 | 160 | 22686 |
| European hazelnut | Corylus avellana | Cor a 1.0102 | Aero Plant | Corylus Cor a 1 | 160 | 22690 |
| European hazelnut | Corylus avellana | Cor a 1.0201 | Aero Plant | Corylus Cor a 1 | 160 | 1321731 |
| European hazelnut | Corylus avellana | Cor a 1.0301 | Aero Plant | Corylus Cor a 1 | 160 | 1321733 |
| European hazelnut | Corylus avellana | Cor a 2.0101 | Aero Plant | Corylus Cor a 2 profilins | 131 | 12659206 |
| European hazelnut | Corylus avellana | Cor a 2.0102 | Aero Plant | Corylus Cor a 2 profilins | 131 | 12659208 |
| European hazelnut | Corylus avellana | Cor a 1.0401 | Food Plant | Corylus Cor a 1 | 161 | 5726304 |
| European hazelnut | Corylus avellana | Cor a 1.0402 | Food Plant | Corylus Cor a 1 | 161 | 11762102 |
| European hazelnut | Corylus avellana | Cor a 1.0403 | Food Plant | Corylus Cor a 1 | 161 | 11762104 |

-continued

| Common Name | Species | IUIS Allergen | Type | Group | Protein Length | GI# |
|---|---|---|---|---|---|---|
| European hazelnut | Corylus avellana | Cor a 1.0404 | Food Plant | Corylus Cor a 1 | 161 | 11762106 |
| European hazelnut | Corylus avellana | Cor a 1.0101 | Food Plant | Corylus Cor a 1 | 160 | 22688 |
| European hazelnut | Corylus avellana | Cor a 11 | Food Plant | Corylus Cor a 11 | 448 | 19338630 |
| European hazelnut | Corylus avellana | Cor a 12.0101 | Food Plant | Corylus Cor a 12 | 159 | 49617323 |
| European hazelnut | Corylus avellana | Cor a 13.0101 | Food Plant | Corylus Cor a 13 Oleosin | 140 | 29170509 |
| European hazelnut | Corylus avellana | Cor a 14.0101 | Food Plant | Corylus Cor a 14 2S albumin | 147 | 226437844 |
| European hazelnut | Corylus avellana | Unassigned | Food Plant | Corylus Cor a 2 profilins | 131 | 576017879 |
| European hazelnut | Corylus avellana | Unassigned | Food Plant | Corylus Cor a 2 profilins | 133 | 576017878 |
| European hazelnut | Corylus avellana | Unassigned | Food Plant | Corylus Cor a 2 profilins | 133 | 576017819 |
| European hazelnut | Corylus avellana | Unassigned | Food Plant | Corylus Cor a 2 profilins | 131 | 576017779 |
| European hazelnut | Corylus avellana | Unassigned | Food Plant | Corylus Cor a 2 profilins | 133 | 576017777 |
| European hazelnut | Corylus avellana | Unassigned | Food Plant | Corylus Cor a 2 profilins | 133 | 576017776 |
| European hazelnut | Corylus avellana | Cor a 8 | Food Plant | Corylus Cor a 8 | 115 | 13507262 |
| European hazelnut | Corylus avellana | Cor a 9 | Food Plant | Corylus Cor a 9 | 515 | 18479082 |
| European hop hornbeam | Ostrya carpinifolia | Ost c 1.0101 | Aero Plant | Ostrya Ost c 1pollen allergen | 160 | 300872535 |
| European hornet | Vespa crabro | Unassigned | Venom or | Vespa Vesp c 1 phospholipase | 301 | 313471397 |
| European hornet | Vespa crabro | Vesp c 5.0101 | Venom or | Vespa Vesp c 5 | 202 | 549184 |
| European hornet | Vespa crabro | Vesp c 5.0102 | Venom or | Vespa Vesp c 5 | 202 | 549185 |
| European pigeon tick | Argas reflexus | Arg r 1 | Venom or | Argas Arg r 1 | 159 | 58371884 |
| European pigeon tick | Argas reflexus | Unassigned | Aero Animal | Argas Arg r 1 | 144 | 322812205 |
| European rabbit | Oryctolagus cuniculus | Ory c 3.A.0101 | Aero Animal | Oryctolagus Ory c 3 | 93 | 11993600 |
| European rabbit | Oryctolagus cuniculus | Ory c 3.B.0101 | Aero Animal | Oryctolagus Ory c 3 | 90 | 11993592 |
| European white birch | Betula pendula | Bet v 1 | Aero Plant | Betula Bet v 1 | 51 | 320545 |
| European white birch | Betula pendula | Bet v 1 | Aero Plant | Betula Bet v 1 | 160 | 534898 |
| European white birch | Betula pendula | Bet v 1 | Aero Plant | Betula Bet v 1 | 159 | 534900 |
| European white birch | Betula pendula | Bet v 1 | Aero Plant | Betula Bet v 1 | 160 | 534910 |
| European white birch | Betula pendula | Bet v 1.1601 | Aero Plant | Betula Bet v 1 | 160 | 1321714 |
| European white birch | Betula pendula | Bet v 1.1701 | Aero Plant | Betula Bet v 1 | 160 | 1321716 |
| European white birch | Betula pendula | Bet v 1.1801 | Aero Plant | Betula Bet v 1 | 160 | 1321718 |
| European white birch | Betula pendula | Bet v 1.1502 | Aero Plant | Betula Bet v 1 | 160 | 1321720 |
| European white birch | Betula pendula | Bet v 1.1901 | Aero Plant | Betula Bet v 1 | 160 | 1321722 |
| European white birch | Betula pendula | Bet v 1.2001 | Aero Plant | Betula Bet v 1 | 160 | 1321724 |
| European white birch | Betula pendula | Bet v 1.2101 | Aero Plant | Betula Bet v 1 | 160 | 1321726 |
| European white birch | Betula pendula | Bet v 1.2201 | Aero Plant | Betula Bet v 1 | 160 | 1321728 |
| European white birch | Betula pendula | Bet v 1m/n | Aero Plant | Betula Bet v 1 | 160 | 1168710 |
| European white birch | Betula pendula | Bet v 1.0108 | Aero Plant | Betula Bet v 1 | 160 | 1542861 |
| European white birch | Betula pendula | Bet v 1.0109 | Aero Plant | Betula Bet v 1 | 160 | 1542863 |
| European white birch | Betula pendula | Bet v 1.0110 | Aero Plant | Betula Bet v 1 | 160 | 1542865 |
| European white birch | Betula pendula | Bet v 1.0111 | Aero Plant | Betula Bet v 1 | 160 | 1542867 |
| European white birch | Betula pendula | Bet v 1.0112 | Aero Plant | Betula Bet v 1 | 160 | 1542869 |
| European white birch | Betula pendula | Bet v 1.0113 | Aero Plant | Betula Bet v 1 | 160 | 1542871 |
| European white birch | Betula pendula | Bet v 1.0114 | Aero Plant | Betula Bet v 1 | 160 | 1542873 |
| European white birch | Betula pendula | Bet v 1.2301 | Aero Plant | Betula Bet v 1 | 160 | 2414158 |
| European white birch | Betula pendula | Bet v 1 | Aero Plant | Betula Bet v 1 | 160 | 2564220 |
| European white birch | Betula pendula | Bet v 1 | Aero Plant | Betula Bet v 1 | 160 | 2564222 |
| European white birch | Betula pendula | Bet v 1 | Aero Plant | Betula Bet v 1 | 160 | 2564224 |
| European white birch | Betula pendula | Bet v 1 | Aero Plant | Betula Bet v 1 | 160 | 2564228 |
| European white birch | Betula pendula | Bet v 1 | Aero Plant | Betula Bet v 1 | 160 | 4006928 |
| European white birch | Betula pendula | Bet v 1 | Aero Plant | Betula Bet v 1 | 160 | 4006945 |
| European white birch | Betula pendula | Bet v 1 | Aero Plant | Betula Bet v 1 | 160 | 4006953 |
| European white birch | Betula pendula | Bet v 1 | Aero Plant | Betula Bet v 1 | 160 | 4006955 |

| Common Name | Species | IUIS Allergen | Type | Group | Protein Length | GI# |
|---|---|---|---|---|---|---|
| European white birch | Betula pendula | Bet v 1 | Aero Plant | Betula Bet v 1 | 160 | 4006957 |
| European white birch | Betula pendula | Bet v 1 | Aero Plant | Betula Bet v 1 | 160 | 4006959 |
| European white birch | Betula pendula | Bet v 1 | Aero Plant | Betula Bet v 1 | 160 | 4006961 |
| European white birch | Betula pendula | Bet v 1 | Aero Plant | Betula Bet v 1 | 160 | 4006965 |
| European white birch | Betula pendula | Bet v 1 | Aero Plant | Betula Bet v 1 | 160 | 4006967 |
| European white birch | Betula pendula | Bet v 1 | Aero Plant | Betula Bet v 1 | 159 | 4376216 |
| European white birch | Betula pendula | Bet v 1 | Aero Plant | Betula Bet v 1 | 159 | 4376219 |
| European white birch | Betula pendula | Bet v 1 | Aero Plant | Betula Bet v 1 | 159 | 4376220 |
| European white birch | Betula pendula | Bet v 1 | Aero Plant | Betula Bet v 1 | 159 | 4376221 |
| European white birch | Betula pendula | Bet v 1 b1 | Aero Plant | Betula Bet v 1 | 159 | 4376222 |
| European white birch | Betula pendula | Bet v 1 b2 | Aero Plant | Betula Bet v 1 | 160 | 4590392 |
| European white birch | Betula pendula | bet v 1 b3 | Aero Plant | Betula Bet v 1 | 160 | 4590394 |
| European white birch | Betula pendula | Bet v 1.0701 | Aero Plant | Betula Bet v 1 | 160 | 4590396 |
| European white birch | Betula pendula | Bet v 1 | Aero Plant | Betula Bet v 1 | 160 | 1168706 |
| European white birch | Betula pendula | Bet v 1x | Aero Plant | Betula Bet v 1 | 159 | 11514622 |
| European white birch | Betula pendula | Bet v 1 | Aero Plant | Betula Bet v 1 | 21 | 30908931 |
| European white birch | Betula pendula | Unassigned | Aero Plant | Betula Bet v 1 | 159 | 38492423 |
| European white birch | Betula pendula | Unassigned | Aero Plant | Betula Bet v 1 | 43 | 239734 |
| European white birch | Betula pendula | Unassigned | Aero Plant | Betula Bet v 1 | 120 | 4006963 |
| European white birch | Betula pendula | Bet v 1.0203 | Aero Plant | Betula Bet v 1 | 120 | 4006947 |
| European white birch | Betula pendula | Bet v 1 | Aero Plant | Betula Bet v 1 | 160 | 452742 |
| European white birch | Betula pendula | Unassigned | Aero Plant | Betula Bet v 1 | 159 | 159162097 |
| European white birch | Betula pendula | Bet v 1.0101 | Aero Plant | Betula Bet v 1 | 159 | 560188693 |
| European white birch | Betula pendula | Bet v 1.0102 | Aero Plant | Betula Bet v 1 | 159 | 550544347 |
| European white birch | Betula pendula | Bet v 1.0103 | Aero Plant | Betula Bet v 1 | 160 | 565807648 |
| European white birch | Betula pendula | Bet v 1.0104 | Aero Plant | Betula Bet v 1 | 159 | 560188694 |
| European white birch | Betula pendula | Bet v 1.0106 | Aero Plant | Betula Bet v 1 | 159 | 560188692 |
| European white birch | Betula pendula | Bet v 1.0107 | Aero Plant | Betula Bet v 1 | 160 | 17938 |
| European white birch | Betula pendula | Unassigned | Aero Plant | Betula Bet v 1 | 160 | 452732 |
| European white birch | Betula pendula | Bet v 1.0201 | Aero Plant | Betula Bet v 1 | 160 | 452734 |
| European white birch | Betula pendula | Bet v 1.0202 | Aero Plant | Betula Bet v 1 | 160 | 452736 |
| European white birch | Betula pendula | Unassigned | Aero Plant | Betula Bet v 1 | 160 | 452740 |
| European white birch | Betula pendula | Unassigned | Aero Plant | Betula Bet v 1 1b | 160 | 452744 |
| European white birch | Betula pendula | Unassigned | Aero Plant | Betula Bet v 1 | 160 | 450885 |
| European white birch | Betula pendula | Bet v 2.0101 | Aero Plant | Betula Bet v 2 | 160 | 452730 |
| European white birch | Betula pendula | Unassigned | Aero Plant | Betula Bet v 2 | 51 | 320546 |
| European white birch | Betula pendula | Bet v 3.0101 | Aero Plant | Betula Bet v 3 | 133 | 157830684 |
| European white birch | Betula pendula | Bet v 4.0101 | Aero Plant | Betula Bet v 4 | 133 | 166953 |
| European white birch | Betula pendula | Bet v 6.0102 | Aero Plant | Betula Bet v 6 | 133 | 576017922 |
| European white birch | Betula pendula | Bet v 7 | Aero Plant | Betula Bet v 7 | 205 | 488605 |
| European white birch | Betula pendula | Unassigned | Aero Plant | Caryota profilin | 85 | 809536 |
| Fishtail palm | Caryota mitis | Unassigned | Aero Plant | Caryota profilin | 308 | 10764491 |
| Flat fish | Lepidorhombus whiffiagonis | Lep w 1.0101 | Food Animal | Lepidorhombus Lep w 1 parvalbumin | 173 | 21886603 |
| Formaldehyde | | | Chemical | | 131 | 121277849 |
| Frog | Rana esculenta | Ran e 1 | Food Animal | Rana Ran e 1 | 109 | 208608078 |
| Frog | Rana esculenta | Ran e 2 | Food Animal | Rana Ran e 2 | 110 | 20796729 |
| Frog | Rana sp. CH-2001 | Unassigned | Food Animal | Rana Ran e 1 | 109 | 20797081 |
| Frog | Rana sp. CH-2001 | Unassigned | Food Animal | Rana Ran e 2 | 110 | 20796733 |
| Fungicide | | | Chemical | | 109 | 20797085 |

-continued

| Common Name | Species | IUIS Allergen | Type | Group | Protein Length | GI# |
|---|---|---|---|---|---|---|
| Fungus | Alternaria alternata | Alt a 1.0101 | Aero Fungi | Alternaria Alt a 1 | 157 | 1842045 |
| Fungus | Alternaria alternata | Unassigned | Aero Fungi | Alternaria Alt a 1 | 115 | 21913174 |
| Fungus | Alternaria alternata | Alt a 1.0102 | Aero Fungi | Alternaria Alt a 1 | 157 | 45680856 |
| Fungus | Alternaria alternata | Unassigned | Aero Fungi | Alternaria Alt a 1 | 133 | 390980892 |
| Fungus | Alternaria alternata | Unassigned | Aero Fungi | Alternaria Alt a 1 | 130 | 508123617 |
| Fungus | Alternaria alternata | Alt a 10.0101 | Aero Fungi | Alternaria Alt a 10 ADH | 497 | 76666767 |
| Fungus | Alternaria alternata | Alt a 12 | Aero Fungi | Alternaria Alt a 12 Ribosomal BP P1 | 110 | 1350779 |
| Fungus | Alternaria alternata | Alt a 13.0101 | Aero Fungi | Alternaria Alt a 13 | 231 | 74611808 |
| Fungus | Alternaria alternata | Alt a 3 | Aero Fungi | Alternaria Alt a 3 HSP | 152 | 14423730 |
| Fungus | Alternaria alternata | Alt a 4 | Aero Fungi | Alternaria Alt a 4 thioredoxin | 436 | 85701160 |
| Fungus | Alternaria alternata | Alt a 5 | Aero Fungi | Alternaria Alt a 5 ribosomal P2 | 113 | 1850540 |
| Fungus | Alternaria alternata | Unassigned | Aero Fungi | Alternaria Alt a 5 ribosomal P2 | 113 | 1173071 |
| Fungus | Alternaria alternata | Alt a 6 | Aero Fungi | Alternaria Alt a 6 enolase | 438 | 14423684 |
| Fungus | Alternaria alternata | Alt a 7.0101 | Aero Fungi | Alternaria Alt a 7 flavodoxin | 204 | 1168402 |
| Fungus | Alternaria alternata | Alt a 8.0101 | Aero Fungi | Alternaria Alt a 8 (mannitol dehydrogenase) | 266 | 37780013 |
| Fungus | Alternaria alternata | Unassigned | Aero Fungi | Alternaria Alt a 8 (mannitol dehydrogenase) | 266 | 118595439 |
| Fungus | Alternaria alternata | Alt a 14.0101 | Aero Fungi | Alternaria MnSOD Alt a 14 | 191 | 529279957 |
| Fungus | Alternaria alternata | Unassigned | Aero Fungi | Alternaria Nuc Transport 2 | 124 | 21748153 |
| Fungus | Alternaria alternata | Unassigned | Aero Fungi | Alternaria TCTP IgE binding | 169 | 112824341 |
| Fungus | Aspergillus flavus | Unassigned | Aero Fungi | Aspergillus Oryzin Asp o 13, fl 13 | 403 | 74665726 |
| Fungus | Aspergillus fumigatus | Asp f 1 | Aero Fungi | Aspergillus Asp f 1 | 125 | 3021324 |
| Fungus | Aspergillus fumigatus | Asp f 1 | Aero Fungi | Aspergillus Asp f 1 | 150 | 9280360 |
| Fungus | Aspergillus fumigatus | Unassigned | Aero Fungi | Aspergillus Asp f 1 | 176 | 54039254 |
| Fungus | Aspergillus fumigatus | Asp f 10 | Aero Fungi | Aspergillus Asp f 10 | 395 | 963013 |
| Fungus | Aspergillus fumigatus | Asp f 11 | Aero Fungi | Aspergillus Asp f 11 | 178 | 5019414 |
| Fungus | Aspergillus fumigatus | Asp f 18.0101 | Aero Fungi | Aspergillus Asp f 18 and Asp n 18 | 495 | 2143220 |
| Fungus | Aspergillus fumigatus | Asp f 2 | Aero Fungi | Aspergillus Asp f 2 | 250 | 664852 |
| Fungus | Aspergillus fumigatus | Asp f 2 | Aero Fungi | Aspergillus Asp f 2 | 310 | 83300352 |
| Fungus | Aspergillus fumigatus | Asp f 22 | Aero Fungi | Aspergillus Asp f 22 | 438 | 13925873 |
| Fungus | Aspergillus fumigatus | Unassigned | Aero Fungi | Aspergillus Asp f 22 | 438 | 83288046 |
| Fungus | Aspergillus fumigatus | Asp f 23.0101 | Aero Fungi | Aspergillus Asp f 23 | 392 | 21215170 |
| Fungus | Rhodotorula mucilaginosa | Rho m 1.0101 | Aero Fungi | Rhodotorula Rho m 1 | 439 | 30314940 |
| Fungus | Rhodotorula mucilaginosa | Rho m 2.0101 | Aero Fungi | Rhodotorula Rho m 2 | 342 | 54654335 |
| Fungus | Stachybotrys chartarum | Sta 3.0101 | Aero Fungi | Stachybotrys Sta c 3 | 144 | 253970748 |
| Fungus | Stemphylium callistephi | Unassigned | Aero Fungi | Stemphylium major allergen alt a1-like | 137 | 49476467 |
| Fungus | Stemphylium sp. CID1012 | Unassigned | Aero Fungi | Stemphylium major allergen alt a1-like | 137 | 152060760 |
| Fungus | Stemphylium vesicarium | Unassigned | Aero Fungi | Stemphylium major allergen alt a1-like | 137 | 49476465 |
| Fungus | Aspergillus fumigatus | Asp f 4 | Aero Fungi | Aspergillus Asp f 4 | 286 | 3005839 |
| Fungus | Aspergillus fumigatus | Asp f 27.0101 | Aero Fungi | Aspergillus Asp f 23 | 392 | 83305621 |
| Fungus | Aspergillus fumigatus | Asp f 28.0101 | Aero Fungi | Aspergillus Asp f 27 | 163 | 91680605 |
| Fungus | Aspergillus fumigatus | Asp f 29.0101 | Aero Fungi | Aspergillus Asp f 28 | 108 | 91680607 |
| Fungus | Aspergillus fumigatus | Asp f 3 | Aero Fungi | Aspergillus Asp f 29 | 110 | 91680609 |
| Fungus | Aspergillus fumigatus | Asp f 34.0101 | Aero Fungi | Aspergillus Asp f 3 | 168 | 2769700 |
| Fungus | Aspergillus fumigatus | Asp f 4 | Aero Fungi | Aspergillus Asp f 34 | 185 | 133920236 |
| Fungus | Aspergillus fumigatus | Unassigned | Aero Fungi | Aspergillus Asp f 4 | 286 | 3005839 |
| Fungus | Aspergillus fumigatus | Asp f 4 | Aero Fungi | Aspergillus Asp f 4 | 322 | 83300369 |
| Fungus | Aspergillus fumigatus | Asp f 5 | Aero Fungi | Aspergillus Asp f 5 | 634 | 3776613 |
| Fungus | Aspergillus fumigatus | Unassigned | Aero Fungi | Aspergillus Asp f 5 | 634 | 85541646 |
| Fungus | Aspergillus fumigatus | Asp f 6 | Aero Fungi | Aspergillus Asp f 6 | 221 | 1648970 |
| Fungus | Aspergillus fumigatus | Unassigned | Aero Fungi | Aspergillus Asp f 6 | 210 | 83305645 |
| Fungus | Aspergillus fumigatus | Asp f 7 | Aero Fungi | Aspergillus Asp f 7 | 270 | 83300389 |
| Fungus | Aspergillus fumigatus | Asp f 8 | Aero Fungi | Aspergillus Asp f 8 | 111 | 6686524 |

| Common Name | Species | IUIS Allergen | Type | Group | Protein Length | GI# |
|---|---|---|---|---|---|---|
| Fungus | Aspergillus fumigatus | Unassigned | Aero Fungi | Aspergillus Asp f 8 | 111 | 83305635 |
| Fungus | Aspergillus fumigatus | Asp f 9 | Aero Fungi | Aspergillus Asp f 9 | 302 | 2879890 |
| Fungus | Aspergillus fumigatus Af293 | Unassigned | Aero Fungi | Aspergillus Asp f 2 | 304 | 66849502 |
| Fungus | Aspergillus niger | Asp n 14 | Aero Fungi | Aspergillus Asp f 18 and Asp n 18 | 533 | 289172 |
| Fungus | Aspergillus niger | Asp n 14 | Aero Fungi | Aspergillus Asp n 14 | 804 | 2181180 |
| Fungus | Aspergillus niger | Asp n 14 | Aero Fungi | Aspergillus Asp n 14 | 804 | 4235093 |
| Fungus | Aspergillus oryzae | Asp o 21 | Aero Fungi | Aspergillus Asp o 21 | 499 | 94706935 |
| Fungus | Aspergillus oryzae | Asp o 21.0101 | Aero Fungi | Aspergillus Asp o 21 | 499 | 166531 |
| Fungus | Aspergillus oryzae | Asp o 13 | Aero Fungi | Aspergillus Oryzin Asp o 13, f1 13 | 403 | 129235 |
| Fungus | Cladosporium cladosporioides | Cla c 14.0101 | Aero Fungi | Cladosporium Cla c | 325 | 301015198 |
| Fungus | Cladosporium cladosporioides | Cla c 9.0101 | Aero Fungi | Cladosporium Cla c 9 Davidiella | 388 | 148361511 |
| Fungus | Cochliobolus lunatus | Cur l 3.0101 | Aero Fungi | Cochliobolus (Curvularia) Cur l 3 | 108 | 14585755 |
| Fungus | Cochliobolus lunatus | Cur l 2.01 | Aero Fungi | Cochliobolus (Curvularia) enolase Cur l 2.01 | 440 | 14585753 |
| Fungus | Cochliobolus lunatus | Cur l 4.0101 | Aero Fungi | Curvularia Cur l 4 | 506 | 193507493 |
| Fungus | Davidiella tassiana | Cla h 10 | Aero Fungi | Cladosporium / Davidiella Cla h 10 | 496 | 76666769 |
| Fungus | Davidiella tassiana | Cla h 5.0101 | Aero Fungi | Cladosporium / Davidiella Cla h 5 | 111 | 5777795 |
| Fungus | Davidiella tassiana | Cla h 6 | Aero Fungi | Cladosporium / Davidiella Cla h 6 | 440 | 467660 |
| Fungus | Davidiella tassiana | Cla h 6 | Aero Fungi | Cladosporium / Davidiella Cla h 6 | 440 | 6015094 |
| Fungus | Davidiella tassiana | Cla h 7.0101 | Aero Fungi | Cladosporium / Davidiella Cla h 7 | 204 | 467629 |
| Fungus | Davidiella tassiana | Cla h 8.0101 | Aero Fungi | Cladosporium / Davidiella Cla h 8 | 267 | 3780015 |
| Fungus | Davidiella tassiana | Cla h 9.0101 | Aero Fungi | Cladosporium / Davidiella Cla h 9 vacuolar serine | 518 | 60116876 |
| Fungus | Davidiella tassiana | Unassigned | Aero Fungi | Cladosporium / Davidiella Heat shock 70 kDa | 643 | 729764 |
| Fungus | Davidiella tassiana | Unassigned | Aero Fungi | Cladosporium / Davidiella Hydrophobin | 105 | 22796153 |
| Fungus | Davidiella tassiana | Unassigned | Aero Fungi | Cladosporium / Davidiella putative hydrolase | 274 | 76446100 |
| Fungus | Davidiella tassiana | Unassigned | Aero Fungi | Cladosporium / Davidiella Putative nuclear | 125 | 21748151 |
| Fungus | Epicoccum nigrum | Epi p 1.0101 | Aero Fungi | Epicoccum Epi p 1 | 18 | 24636820 |
| Fungus | Fusarium culmorum | Unassigned | Aero Fungi | Fusarium claimed Fus c 3 | 450 | 25361513 |
| Fungus | Fusarium culmorum | Fus c 1 | Aero Fungi | Fusarium Fus c 1 | 109 | 19879657 |
| Fungus | Fusarium culmorum | Fus c 2 | Aero Fungi | Fusarium Fus c 2 | 121 | 19879659 |
| Fungus | Fusarium proliferatum | Fus p 4.0101 | Aero Fungi | Fusarium Fus p 4 | 323 | 619498167 |
| Fungus | Penicillium brevicompactum | Pen b 26.0101 | Aero Fungi | Penicillium Pen b 26 | 107 | 59894749 |
| Fungus | Penicillium chrysogenum | Pen ch 18.0101 | Aero Fungi | Penicillium Pen 18 | 494 | 7963902 |
| Fungus | Penicillium chrysogenum | Pen ch 18 | Aero Fungi | Penicillium Pen 18 | 494 | 14215732 |
| Fungus | Penicillium chrysogenum | Pen ch 13.0101 | Aero Fungi | Penicillium Pen ch 13 | 397 | 6684758 |
| Fungus | Penicillium chrysogenum | Pen ch 13 | Aero Fungi | Penicillium Pen ch 13 | 398 | 21069093 |
| Fungus | Penicillium chrysogenum | Pen ch 20 | Aero Fungi | Penicillium Pen ch 20 | 117 | 999009 |
| Fungus | Penicillium chrysogenum | Pen ch 35.0101 | Aero Fungi | Penicillium Pen ch 35 | 324 | 300679427 |
| Fungus | Penicillium citrinum | Unassigned | Aero Fungi | Penicillium Pen 18 | 457 | 4588118 |
| Fungus | Penicillium citrinum | Unassigned | Aero Fungi | Penicillium Pen 18 | 358 | 12005501 |
| Fungus | Penicillium citrinum | Pen c 19 | Aero Fungi | Penicillium Pen c 19 | 503 | 14423733 |
| Fungus | Penicillium citrinum | Pen c 22 | Aero Fungi | Penicillium Pen c 22 | 438 | 13991101 |
| Fungus | Penicillium citrinum | Pen c 24 | Aero Fungi | Penicillium Pen c 24 | 228 | 38326693 |
| Fungus | Penicillium citrinum | Pen c 3 | Aero Fung | Penicillium Pen c 3 | 167 | 5326864 |
| Fungus | Penicillium citrinum | Pen c 30.0101 | Aero Fungi | Penicillium Pen c 30 | 733 | 82754305 |
| Fungus | Penicillium citrinum | Pen c 32.0101 | Aero Fungi | Penicillium Pen c 32 | 290 | 121584258 |
| Fungus | Penicillium citrinum | Unassigned | Aero Fungi | Penicillium Pen ch 13 | 397 | 4587983 |
| Fungus | Penicillium crustosum | Pen cr 26.0101 | Aero Fungi | Penicillium crustosum Pen cr 26 60s P1 | 107 | 371537645 |
| Fungus | Penicillium oxalicum | Pen o 18.0101 | Aero Fungi | Penicillium Pen 18 | 503 | 12005497 |
| Fungus | Arthroderma benhamiae | Unassigned | Contact | Trichophyton (Arthroderma) Tri m 4 | 726 | 23894232 |
| Fungus | Arthroderma benhamiae | Unassigned | Contact | Trichophyton (Arthroderma) Tri r 2 | 292 | 23894240 |
| Fungus | Arthroderma benhamiae | Unassigned | Contact | Trichophyton (Arthroderma) Tri r 2 | 404 | 23894244 |

-continued

| Common Name | Species | IUIS Allergen | Type | Group | Protein Length | GI# |
|---|---|---|---|---|---|---|
| Fungus | Arthroderma vanbreuseghemii | Unassigned | Contact | Trichophyton (Arthroderma) Tri m 4 | 726 | 219687753 |
| Fungus | Trichophyton rubrum | Tri r 2 | Contact | Trichophyton (Arthroderma) Tri r 2 | 412 | 5813790 |
| Fungus | Trichophyton rubrum | Tri r 4 | Contact | Trichophyton tri 4 allergen (Arthroderma) | 726 | 5813788 |
| Fungus | Trichophyton schoenleinii | Unassigned | Contact | Trichophyton (Arthroderma) Tri r 2 | 405 | 74663809 |
| Fungus | Trichophyton schoenleinii | Unassigned | Contact | Trichophyton tri 4 allergen (Arthroderma) | 726 | 23894227 |
| Garlic | | | Food | | | |
| German cockroach | Blattella germanica | Unassigned | Aero Insect | Blattella 36 kDa allergen | 20 | 544618 |
| German cockroach | Blattella germanica | Unassigned | Aero Insect | Blattella 36 kDa allergen | 25 | 544619 |
| German cockroach | Blattella germanica | Unassigned | Aero Insect | Blattella arginine kinase | 356 | 221602737 |
| German cockroach | Blattella germanica | Bla g 1.0201 | Aero Insect | Blattella Bla g 1 | 492 | 4240395 |
| German cockroach | Blattella germanica | Bla g 1.0101 | Aero Insect | Blattella Bla g 1 | 412 | 4572592 |
| German cockroach | Blattella germanica | Bla g 11.0101 | Aero Insect | Blattella Bla g 11 alpha Amylase | 515 | 85002763 |
| German cockroach | Blattella germanica | Unassigned | Aero Insect | Blattella Bla g 2 | 330 | 62738637 |
| German cockroach | Blattella germanica | Bla g 2.0101 | Aero Insect | Blattella Bla g 2 | 352 | 145105726 |
| German cockroach | Blattella germanica | Unassigned | Aero Insect | Blattella Bla g 2 | 352 | 1176397 |
| German cockroach | Blattella germanica | Unassigned | Aero Insect | Blattella Bla g 2 | 334 | 315113421 |
| German cockroach | Blattella germanica | Unassigned | Aero Insect | Blattella Bla g 3 | 657 | 262272875 |
| German cockroach | Blattella germanica | Bla g 3.0101 | Aero Insect | Blattella Bla g 3 | 657 | 262272877 |
| German cockroach | Blattella germanica | Bla g 4 | Aero Insect | Blattella Bla g 4 | 182 | 1166573 |
| German cockroach | Blattella germanica | Unassigned | Aero Insect | Blattella Bla g 4 | 182 | 144952778 |
| German cockroach | Blattella germanica | Unassigned | Aero Insect | Blattella Bla g 4 | 181 | 212675308 |
| German cockroach | Blattella germanica | Unassigned | Aero Insect | Blattella Bla g 4 | 191 | 194350815 |
| German cockroach | Blattella germanica | Unassigned | Aero Insect | Blattella Bla g 4 | 190 | 194350817 |
| German cockroach | Blattella germanica | Bla g 5.0101 | Aero Insect | Blattella Bla g 5 | 200 | 144952780 |
| German cockroach | Blattella germanica | Bla g 6.0101 | Aero Insect | Blattella Bla g 6 | 200 | 2326190 |
| German cockroach | Blattella germanica | Bla g 6.0201 | Aero Insect | Blattella Bla g 6 | 151 | 82704032 |
| German cockroach | Blattella germanica | Bla g 6.0301 | Aero Insect | Blattella Bla g 6 | 151 | 82704034 |
| German cockroach | Blattella germanica | Bla g 7.0101 | Aero Insect | Blattella Bla g 7 | 154 | 82704036 |
| German cockroach | Blattella germanica | Unassigned | Aero Insect | Blattella delta GST | 284 | 8101069 |
| German cockroach | Blattella germanica | Unassigned | Aero Insect | Blattella delta GST | 216 | 161137518 |
| Gian Bull ant | Myrmecia banksi | Myr p 3.0101 | Venom or | Myrmecia Myr p 3 | 84 | 51241753 |
| Giant honeybee | Apis dorsata | Api d 1.0101 | Venom or | Apis Api m 1 Api d 1 Api c 1 | 134 | 47117012 |
| Giant honeybee | Apis dorsata | Unassigned | Venom or | Apis Api m 4 Melittin | 26 | 126955 |
| giant mud crab | Scylla serrata | Unassigned | Food Animal | Scylla sp. (mud crab) tropomyosin | 284 | 151505279 |
| Giant ragweed | Ambrosia trifida | Amb t 5 | Aero Plant | Ambrosia Amb t 5 Ra5G | 73 | 114091 |
| Giant River Prawn | Macrobrachium rosenbergii | Mac r 1.0101 | Food Animal | Macrobrachium rosenbergii shrimp tropomyosin | 284 | 288819271 |
| Giant River Prawn | Macrobrachium rosenbergii | Unassigned | Food Animal | Macrobrachium rosenbergii shrimp tropomyosin | 284 | 558698675 |
| Gold | | gold sodium thiosulfate | Metals | | | |
| Gould's razor shell | Solen strictus | Unassigned | Food Animal | Solen tropomyosin | 284 | 219806602 |
| Grape | Vitis sp. | Unassigned | Food Plant | Vitis Lipid transfer protein P3 | 91 | 145559502 |
| Grape | Vitis sp. | Vit v 1 | Food Plant | Vitis Vit v 1 LTP | 37 | 462719 |
| Grape | Vitis sp. | Unassigned | Food Plant | Vitis Vit v 1 LTP | 38 | 462717 |
| Greasyback shrimp | Metapenaeus ensis | Met e 1 | Food Animal | Metapenaeus Met e 1 Tropomyosin | 274 | 607633 |
| green mud crab | Scylla paramamosain | Unassigned | Food Animal | Scylla arginine kinase | 357 | 375298903 |
| Hardy Kiwi | Actinidia arguta | Unassigned | Food Plant | Actinidia arguta kiwellin | 213 | 441482362 |
| Hardy Kiwi | Actinidia arguta | Unassigned | Food Plant | Actinidia arguta kiwellin | 213 | 441482364 |
| Hardy Kiwi | Actinidia arguta | Unassigned | Food Plant | Actinidia arguta kiwellin | 213 | 441482366 |
| Honeybee | Apis mellifera | Api m 1 | Venom or | Apis Api m 1 Api d 1 Api c 1 | 167 | 24418862 |
| Honeybee | Apis mellifera | Unassigned | Venom or | Apis Api m 10 icarapin | 223 | 94471622 |
| Honeybee | Apis mellifera | Api m 10.0101 | Venom or | Apis Api m 10 icarapin | 175 | 94471624 |
| Honeybee | Apis mellifera | Api m 2 | Venom or | Apis Api m 2 | 382 | 585279 |

| Common Name | Species | IUIS Allergen | Type | Group | Protein Length | GI# |
|---|---|---|---|---|---|---|
| Honeybee | Apis mellifera | Unassigned | Venom or | Apis Api m 3 acid phosphatase | 388 | 208342441 |
| Honeybee | Apis mellifera | Api m 3.0101 | Venom or | Apis Api m 3 acid phosphatase | 388 | 74835477 |
| Honeybee | Apis mellifera | Api m 4.0101 | Venom or | Apis Api m 4 Melittin | 70 | 5622 |
| Honeybee | Apis mellifera | Unassigned | Venom or | Apis Api m 4 Melittin | 27 | 69552 |
| Honeybee | Apis mellifera | Api m 5.0101 | Venom or | Apis Api m 5 dipeptidylpeptidase | 775 | 187281543 |
| Honeybee | Apis mellifera | Unassigned | Venom or | Apis Api m 6 | 92 | 94400907 |
| Honeybee | Apis mellifera | Unassigned | Venom or | Apis Api m 6 | 94 | 88770352 |
| Honeybee | Apis mellifera | Api m 11.0101 | Venom or | Apis mellifera | Api m 11 | 416 |
| Honeybee | Apis mellifera | Api m 11.0201 | Venom or | Apis mellifera | Api m 11 | 423 |
| Honeybee | Apis mellifera | Api m 12.0101 | Venom or | Apis mellifera Api m 12 | 1770 | 29329817 |
| Hornbeam | Carpinus betulus | Car b 1.0102 | Aero Plant | Carpinus Car b 1 | 159 | 402745 |
| Hornbeam | Carpinus betulus | Car b 1.0103 | Aero Plant | Carpinus Car b 1 | 160 | 1545875 |
| Hornbeam | Carpinus betulus | Car b 1.0104 | Aero Plant | Carpinus Car b 1 | 160 | 1545877 |
| Hornbeam | Carpinus betulus | Car b 1.0105 | Aero Plant | Carpinus Car b 1 | 160 | 1545879 |
| Hornbeam | Carpinus betulus | Car b 1.0108 | Aero Plant | Carpinus Car b 1 | 160 | 1545893 |
| Hornbeam | Carpinus betulus | Car b 1.0301 | Aero Plant | Carpinus Car b 1 | 161 | 1545895 |
| Hornbeam | Carpinus betulus | Car b 1.0302 | Aero Plant | Carpinus Car b 1 | 161 | 1545897 |
| Hornbeam | Carpinus betulus | Unassigned | Aero Plant | Carpinus Car b 1 | 40 | 239735 |
| Hornbeam | Carpinus betulus | Car b 1.0113 | Aero Plant | Carpinus Car b 1 | 160 | 167472845 |
| Hornbeam | Carpinus betulus | Car b 1.0109 | Aero Plant | Carpinus Car b 1 | 160 | 167472837 |
| Hornbeam | Carpinus betulus | Car b 1.0112 | Aero Plant | Carpinus Car b 1 | 160 | 167472843 |
| Hornbeam | Carpinus betulus | Car b 1.0111 | Aero Plant | Carpinus Car b 1 | 160 | 167472841 |
| Hornbeam | Carpinus betulus | Car b 1.0110 | Aero Plant | Carpinus Car b 1 | 160 | 167472839 |
| Hornbeam | Carpinus betulus | Unassigned | Aero Plant | Carpinus Car b 1 | 80 | 1008578 |
| Hornbeam | Carpinus betulus | Unassigned | Aero Plant | Carpinus Car b 1 | 80 | 1008579 |
| Hornbeam | Carpinus betulus | Unassigned | Aero Plant | Carpinus Car b 1 | 80 | 1008580 |
| Hornbeam | Carpinus betulus | Car b 1.0101 | Aero Plant | Carpinus Car b 1 | 159 | 402743 |
| Hornbeam | Carpinus betulus | Car b 1.0106 | Aero Plant | Carpinus Car b 1 | 160 | 1545881 |
| Hornbeam | Carpinus betulus | Car b 1.0107 | Aero Plant | Carpinus Car b 1 | 160 | 1545889 |
| Hornbeam | Carpinus betulus | Car b 1.0201 | Aero Plant | Carpinus Car b 1 | 159 | 402747 |
| Hornet | Vespa magnifica | Unassigned | Venom or | Vespa magnifica Vesp ma 2 hyaluronidase | 357 | 315133295 |
| Hornet | Vespa magnifica | Unassigned | Venom or | Vespa magnifica Vesp ma 5 | 225 | 319801357 |
| Horse | Equus caballus | Equ c 1.0101 | Aero Animal | Equus Equ c 1 | 187 | 1575778 |
| Horse | Equus caballus | Equ c 2.0101 | Aero Animal | Equus Equ c 2 | 29 | 3121755 |
| Horse | Equus caballus | Equ c 2.0102 | Aero Animal | Equus Equ c 2 | 19 | 3121756 |
| Horse | Equus caballus | Equ c 3.0101 | Aero Animal | Equus Equ c 3 | 607 | 399672 |
| Horse | Equus caballus | Equ c4.0101 | Aero Animal | Equus Equ c 4 and Equ c 5 | 228 | 126514234 |
| Horse fly | Tabanus yao | Tab y 1.0101 | Venom or | Tabanus Tab y 1 Apyrase | 554 | 323473390 |
| Horse fly | Tabanus yao | Tab y 2.0101 | Venom or | Tabanus Tab y 2 Hyaluronidase | 349 | 304273371 |
| Horse fly | Tabanus yao | Tab y 5.0101 | Venom or | Tabanus Tab y 5 | 256 | 304273369 |
| Horse hair crab | Erimacrus isenbeckii | Unassigned | Food Animal | Erimacrus tropomyosin | 284 | 125995169 |
| Horse hair crab | Erimacrus isenbeckii | Unassigned | Food Animal | Erimacrus tropomyosin | 284 | 125995171 |
| Hot Peppers | | | Food | | | |
| House dust mite | Dermatophagoides farinae | Der f 13.0101 | Aero Mite | Dermatophagoides Der f 13 | 131 | 37958167 |
| House dust mite | Dermatophagoides farinae | Der f 16 | Aero Mite | Dermatophagoides Der f 16 | 480 | 21591547 |
| House dust mite | Dermatophagoides farinae | Der f 25.0101 | Aero Mite | Dermatophagoides Der f 25 | 247 | 442565872 |
| House dust mite | Dermatophagoides farinae | Der f 25.0201 | Aero Mite | Dermatophagoides Der f 25 | 247 | 685432812 |
| House dust mite | Dermatophagoides farinae | Der f 28.0101 | Aero Mite | Dermatophagoides Der f 28 | 659 | 442565876 |
| House dust mite | Dermatophagoides farinae | Der f 28.0201 | Aero Mite | Dermatophagoides Der f 28 | 654 | 685432788 |
| House dust mite | Dermatophagoides farinae | Der f 29.0101 | Aero Mite | Dermatophagoides Der f 29 | 164 | 37958141 |
| House dust mite | Dermatophagoides farinae | Der f 30.0101 | Aero Mite | Dermatophagoides Der f 30 | 171 | 442565878 |

| Common Name | Species | IUIS Allergen | Type | Group | Protein Length | GI# |
|---|---|---|---|---|---|---|
| House dust mite | Dermatophagoides farinae | Der f 1 | Aero Mite | Dermatophagoides Der p 1 Der f 1 Der m 1 | 321 | 730035 |
| House dust mite | Dermatophagoides farinae | Der f 1.0101 | Aero Mite | Dermatophagoides Der p 1 Der f 1 Der m 1 | 321 | 27530349 |
| House dust mite | Dermatophagoides farinae | Der f 1.0102 | Aero Mite | Dermatophagoides Der p 1 Der f 1 Der m 1 | 276 | 76097507 |
| House dust mite | Dermatophagoides farinae | Unassigned | Aero Mite | Dermatophagoides Der p 1 Der f 1 Der m 1 | 321 | 156106765 |
| House dust mite | Dermatophagoides farinae | Unassigned | Aero Mite | Dermatophagoides Der p 1 Der f 1 Der m 1 | 263 | 37958161 |
| House dust mite | Dermatophagoides farinae | Unassigned | Aero Mite | Dermatophagoides Der p 1 Der f 1 Der m 1 | 305 | 387178006 |
| House dust mite | Dermatophagoides farinae | Der f 1.0108 | Aero Mite | Dermatophagoides Der p 1 Der f 1 Der m 1 | 303 | 305387429 |
| House dust mite | Dermatophagoides farinae | Der f 1.0109 | Aero Mite | Dermatophagoides Der p 1 Der f 1 Der m 1 | 321 | 119633260 |
| House dust mite | Dermatophagoides farinae | Der f 1.0110 | Aero Mite | Dermatophagoides Der p 1 Der f 1 Der m 1 | 321 | 119633262 |
| House dust mite | Dermatophagoides farinae | Der f 10.0101 | Aero Mite | Dermatophagoides Der p 10 / Der f 10 | 321 | 119633264 |
| House dust mite | Dermatophagoides farinae | Der f 11 | Aero Mite | Dermatophagoides Der p 11 / Der f 11 | 299 | 1359436 |
| House dust mite | Dermatophagoides farinae | Unassigned | Aero Mite | Dermatophagoides Der p 11 / Der f 11 | 692 | 13785807 |
| House dust mite | Dermatophagoides farinae | Der f 14.0101 | Aero Mite | Dermatophagoides Der p 14 / Der f 14 | 341 | 729979 |
| House dust mite | Dermatophagoides farinae | Der f 2.0102 | Aero Mite | Dermatophagoides Der p 14 / Der f 14 | 349 | 1545803 |
| House dust mite | Dermatophagoides farinae | Der f 2.0103 | Aero Mite | Dermatophagoides Der p 2 / Der f 2 | 146 | 217306 |
| House dust mite | Dermatophagoides farinae | Der f 2.0105 | Aero Mite | Dermatophagoides Der p 2 / Der f 2 | 138 | 217308 |
| House dust mite | Dermatophagoides farinae | Der f 2.0107 | Aero Mite | Dermatophagoides Der p 2 / Der f 2 | 129 | 17978844 |
| House dust mite | Dermatophagoides farinae | Der f 2.0108 | Aero Mite | Dermatophagoides Der p 2 / Der f 2 | 146 | 55859470 |
| House dust mite | Dermatophagoides farinae | Der f 2.0106 | Aero Mite | Dermatophagoides Der p 2 / Der f 2 | 146 | 55859470 |
| House dust mite | Dermatophagoides farinae | Der f 2.0109 | Aero Mite | Dermatophagoides Der p 2 / Der f 2 | 146 | 55859468 |
| House dust mite | Dermatophagoides farinae | Unassigned | Aero Mite | Dermatophagoides Der p 2 / Der f 2 | 146 | 55859466 |
| House dust mite | Dermatophagoides farinae | Der f 2.0112 | Aero Mite | Dermatophagoides Der p 2 / Der f 2 | 129 | 76097511 |
| House dust mite | Dermatophagoides farinae | Unassigned | Aero Mite | Dermatophagoides Der p 2 / Der f 2 | 146 | 256631558 |
| House dust mite | Dermatophagoides farinae | Der f 2.0101 | Aero Mite | Dermatophagoides Der p 2 / Der f 2 | 140 | 37958157 |
| House dust mite | Dermatophagoides farinae | Der f 2.0116 | Aero Mite | Dermatophagoides Der p 2 / Der f 2 | 129 | 387178018 |
| House dust mite | Dermatophagoides farinae | Der f 3 | Aero Mite | Dermatophagoides Der p 2 / Der f 2 | 138 | 217304 |
| House dust mite | Dermatophagoides farinae | Unassigned | Aero Mite | Dermatophagoides Der p 2 / Der f 2 | 146 | 124696217 |
| House dust mite | Dermatophagoides farinae | Unassigned | Aero Mite | Dermatophagoides Der p 3 / Der f 3 | 232 | 1314736 |
| House dust mite | Dermatophagoides farinae | Der f 3.0101 | Aero Mite | Dermatophagoides Der p 3 / Der f 3 | 259 | 163638970 |
| House dust mite | Dermatophagoides farinae | Unassigned | Aero Mite | Dermatophagoides Der p 3 / Der f 3 | 259 | 218203816 |
| House dust mite | Dermatophagoides farinae | Unassigned | Aero Mite | Dermatophagoides Der p 3 / Der f 3 | 259 | 218203818 |
| House dust mite | Dermatophagoides farinae | Unassigned | Aero Mite | Dermatophagoides Der p 3 / Der f 3 | 259 | 1311457 |
| House dust mite | Dermatophagoides farinae | Unassigned | Aero Mite | Dermatophagoides Der p 6 / Der f 6 | 20 | 404371 |
| House dust mite | Dermatophagoides farinae | Unassigned | Aero Mite | Dermatophagoides Der p 6 / Der f 6 | 279 | 218203826 |
| House dust mite | Dermatophagoides farinae | Der f 6.0101 | Aero Mite | Dermatophagoides Der p 6 / Der f 6 | 279 | 218203828 |
| House dust mite | Dermatophagoides farinae | Unassigned | Aero Mite | Dermatophagoides Der p 6 / Der f 6 | 279 | 6808530 |
| House dust mite | Dermatophagoides farinae | Unassigned | Aero Mite | Dermatophagoides Der p 7 / Der f 7 | 213 | 37958165 |
| House dust mite | Dermatophagoides farinae | Unassigned | Aero Mite | Dermatophagoides Der p 7 / Der f 7 | 213 | 218203832 |
| House dust mite | Dermatophagoides farinae | Der f 18 | Aero Mite | Dermatophagoides Der p farinae Der f 18 Der p 18 | 462 | 27550039 |
| House dust mite | Dermatophagoides farinae | Unassigned | Aero Mite | Dermatophagoides farinae Der f 21 Chew | 136 | 140089314 |
| House dust mite | Dermatophagoides farinae | Unassigned | Aero Mite | Dermatophagoides farinae Der f 21 Chew | 136 | 140089316 |
| House dust mite | Dermatophagoides farinae | Unassigned | Aero Mite | Dermatophagoides farinae Der f 21 Chew | 136 | 140089320 |
| House dust mite | Dermatophagoides farinae | Unassigned | Aero Mite | Dermatophagoides farinae Der f 21 Chew | 136 | 140089322 |
| House dust mite | Dermatophagoides farinae | Unassigned | Aero Mite | Dermatophagoides farinae Der f 21 Chew | 136 | 140089324 |
| House dust mite | Dermatophagoides farinae | Unassigned | Aero Mite | Dermatophagoides farinae Der f 21 Chew | 136 | 140089326 |
| House dust mite | Dermatophagoides farinae | Der f 21.0101 | Aero Mite | Dermatophagoides farinae Der f 21 Chew | 136 | 567768173 |
| House dust mite | Dermatophagoides microceras | Der m 1.0101 | Aero Mite | Dermatophagoides Der p 1 Der f 1 Der m 1 | 30 | 127205 |
| House dust mite | Dermatophagoides pteronyssinus | Unassigned | Aero Mite | Dermatophagoides Der f 30 | 180 | 15072346 |
| House dust mite | Dermatophagoides pteronyssinus | Der p 1 | Aero Mite | Dermatophagoides Der p 1 Der f 1 Der m 1 | 222 | 21725560 |
| House dust mite | Dermatophagoides pteronyssinus | Der p 1 | Aero Mite | Dermatophagoides Der p 1 Der f 1 Der m 1 | 222 | 21725562 |
| House dust mite | Dermatophagoides pteronyssinus | Der p 1 | Aero Mite | Dermatophagoides Der p 1 Der f 1 Der m 1 | 222 | 21725564 |
| House dust mite | Dermatophagoides pteronyssinus | Der p 1 | Aero Mite | Dermatophagoides Der p 1 Der f 1 Der m 1 | 222 | 21725566 |

| Common Name | Species | IUIS Allergen | Type | Group | Protein Length | GI# |
|---|---|---|---|---|---|---|
| House dust mite | Dermatophagoides pteronyssinus | Der p 1 | Aero Mite | Dermatophagoides Der p 1 / Der f 1 Der m 1 | 222 | 21725568 |
| House dust mite | Dermatophagoides pteronyssinus | Der p 1 | Aero Mite | Dermatophagoides Der p 1 / Der f 1 Der m 1 | 222 | 21725570 |
| House dust mite | Dermatophagoides pteronyssinus | Der p 1 | Aero Mite | Dermatophagoides Der p 1 / Der f 1 Der m 1 | 222 | 21725572 |
| House dust mite | Dermatophagoides pteronyssinus | Der p 1 | Aero Mite | Dermatophagoides Der p 1 / Der f 1 Der m 1 | 222 | 21725574 |
| House dust mite | Dermatophagoides pteronyssinus | Der p 1 | Aero Mite | Dermatophagoides Der p 1 / Der f 1 Der m 1 | 222 | 21725576 |
| House dust mite | Dermatophagoides pteronyssinus | Der p 1 | Aero Mite | Dermatophagoides Der p 1 / Der f 1 Der m 1 | 222 | 21725578 |
| House dust mite | Dermatophagoides pteronyssinus | Der p 1 | Aero Mite | Dermatophagoides Der p 1 / Der f 1 Der m 1 | 222 | 21725580 |
| House dust mite | Dermatophagoides pteronyssinus | Unassigned | Aero Mite | Dermatophagoides Der p 1 / Der f 1 Der m 1 | 216 | 61608445 |
| House dust mite | Dermatophagoides pteronyssinus | Unassigned | Aero Mite | Dermatophagoides Der p 1 / Der f 1 Der m 1 | 222 | 83754033 |
| House dust mite | Dermatophagoides pteronyssinus | Unassigned | Aero Mite | Dermatophagoides Der p 1 / Der f 1 Der m 1 | 223 | 157696052 |
| House dust mite | Dermatophagoides pteronyssinus | Unassigned | Aero Mite | Dermatophagoides Der p 1 / Der f 1 Der m 1 | 222 | 223365887 |
| House dust mite | Dermatophagoides pteronyssinus | Der p 1.0124 | Aero Mite | Dermatophagoides Der p 1 / Der f 1 Der m 1 | 320 | 195593901 |
| House dust mite | Dermatophagoides pteronyssinus | Unassigned | Aero Mite | Dermatophagoides Der p 1 / Der f 1 Der m 1 | 302 | 256095986 |
| House dust mite | Dermatophagoides pteronyssinus | Der p 1.0101 | Aero Mite | Dermatophagoides Der p 1 / Der f 1 Der m 1 | 96 | 387592 |
| House dust mite | Dermatophagoides pteronyssinus | Der p 1.0113 | Aero Mite | Dermatophagoides Der p 1 / Der f 1 Der m 1 | 320 | 511953 |
| House dust mite | Dermatophagoides pteronyssinus | Unassigned | Aero Mite | Dermatophagoides Der p 1 / Der f 1 Der m 1 | 304 | 387178004 |
| House dust mite | Dermatophagoides pteronyssinus | Der p 10 | Aero Mite | Dermatophagoides Der p 1 / Der f 1 Der m 1 | 302 | 76097505 |
| House dust mite | Dermatophagoides pteronyssinus | Der p 10.0101 | Aero Mite | Dermatophagoides Der p 10 / Der f 10 | 284 | 2353266 |
| House dust mite | Dermatophagoides pteronyssinus | Unassigned | Aero Mite | Dermatophagoides Der p 10 / Der f 10 | 284 | 2440053 |
| House dust mite | Dermatophagoides pteronyssinus | Der p 11.0101 | Aero Mite | Dermatophagoides Der p 10 / Der f 10 | 281 | 80553470 |
| House dust mite | Dermatophagoides pteronyssinus | Unassigned | Aero Mite | Dermatophagoides Der p 11 / Der f 11 | 284 | 208970286 |
| House dust mite | Dermatophagoides pteronyssinus | Unassigned | Aero Mite | Dermatophagoides Der p 11 / Der f 11 | 875 | 37778944 |
| House dust mite | Dermatophagoides pteronyssinus | Unassigned | Aero Mite | Dermatophagoides Der p 13 | 131 | 302035350 |
| House dust mite | Dermatophagoides pteronyssinus | Der p 14.0101 | Aero Mite | Dermatophagoides Der p 14 / Der f 14 | 1662 | 20385544 |
| House dust mite | Dermatophagoides pteronyssinus | Der p 2 | Aero Mite | Dermatophagoides Der p 2 / Der f 2 | 129 | 21465915 |
| House dust mite | Dermatophagoides pteronyssinus | Der p 2 | Aero Mite | Dermatophagoides Der p 2 / Der f 2 | 129 | 21725582 |
| House dust mite | Dermatophagoides pteronyssinus | Der p 2 | Aero Mite | Dermatophagoides Der p 2 / Der f 2 | 129 | 21725584 |
| House dust mite | Dermatophagoides pteronyssinus | Der p 2 | Aero Mite | Dermatophagoides Der p 2 / Der f 2 | 129 | 21725586 |
| House dust mite | Dermatophagoides pteronyssinus | Der p 2 | Aero Mite | Dermatophagoides Der p 2 / Der f 2 | 129 | 21725588 |
| House dust mite | Dermatophagoides pteronyssinus | Der p 2 | Aero Mite | Dermatophagoides Der p 2 / Der f 2 | 129 | 21725590 |
| House dust mite | Dermatophagoides pteronyssinus | Der p 2 | Aero Mite | Dermatophagoides Der p 2 / Der f 2 | 129 | 21725592 |
| House dust mite | Dermatophagoides pteronyssinus | Der p 2 | Aero Mite | Dermatophagoides Der p 2 / Der f 2 | 129 | 21725594 |
| House dust mite | Dermatophagoides pteronyssinus | Der p 2 | Aero Mite | Dermatophagoides Der p 2 / Der f 2 | 129 | 21725596 |
| House dust mite | Dermatophagoides pteronyssinus | Der p 2 | Aero Mite | Dermatophagoides Der p 2 / Der f 2 | 129 | 21725600 |
| House dust mite | Dermatophagoides pteronyssinus | Der p 2 | Aero Mite | Dermatophagoides Der p 2 / Der f 2 | 129 | 21725602 |
| House dust mite | Dermatophagoides pteronyssinus | Der p 2 | Aero Mite | Dermatophagoides Der p 2 / Der f 2 | 129 | 21725604 |
| House dust mite | Dermatophagoides pteronyssinus | Unassigned | Aero Mite | Dermatophagoides Der p 2 / Der f 2 | 129 | 76097509 |
| House dust mite | Dermatophagoides pteronyssinus | Der p 2.0114 | Aero Mite | Dermatophagoides Der p 2 / Der f 2 | 146 | 99644635 |
| House dust mite | Dermatophagoides pteronyssinus | Unassigned | Aero Mite | Dermatophagoides Der p 2 / Der f 2 | 130 | 110560872 |
| House dust mite | Dermatophagoides pteronyssinus | Unassigned | Aero Mite | Dermatophagoides Der p 2 / Der f 2 | 129 | 157829757 |
| House dust mite | Dermatophagoides pteronyssinus | Unassigned | Aero Mite | Dermatophagoides Der p 2 / Der f 2 | 145 | 164415595 |
| House dust mite | Dermatophagoides pteronyssinus | Der p 2.0101 | Aero Mite | Dermatophagoides Der p 2 / Der f 2 | 145 | 9280543 |
| House dust mite | Dermatophagoides pteronyssinus | Der p 2.0110 | Aero Mite | Dermatophagoides Der p 2 / Der f 2 | 129 | 256095984 |
| House dust mite | Dermatophagoides pteronyssinus | Unassigned | Aero Mite | Dermatophagoides Der p 2 / Der f 2 | 129 | 387178014 |
| House dust mite | Dermatophagoides pteronyssinus | Der p 21.0101 | Aero Mite | Dermatophagoides Der p 21 | 140 | 85687540 |
| House dust mite | Dermatophagoides pteronyssinus | Der p 23.0101 | Aero Mite | Dermatophagoides Der p 23 Peritrophin-like | 90 | 171466145 |
| House dust mite | Dermatophagoides pteronyssinus | Der p 3 | Aero Mite | Dermatophagoides Der p 3 / Der f 3 | 261 | 511476 |
| House dust mite | Dermatophagoides pteronyssinus | Der p 4 | Aero Mite | Dermatophagoides Der p 4 | 496 | 5059162 |
| House dust mite | Dermatophagoides pteronyssinus | Unassigned | Aero Mite | Dermatophagoides Der p 4 | 19 | 1351935 |
| House dust mite | Dermatophagoides pteronyssinus | Der p 5.0102 | Aero Mite | Dermatophagoides Der p 5 | 132 | 913285 |

-continued

| Common Name | Species | IUIS Allergen | Type | Group | Protein Length | GI# |
|---|---|---|---|---|---|---|
| House dust mite | Dermatophagoides pteronyssinus | Der p 5 | Aero Mite | Dermatophagoides Der p 5 | 132 | 28798085 |
| House dust mite | Dermatophagoides pteronyssinus | Der p 5.0101 | Aero Mite | Dermatophagoides Der p 5 | 148 | 9072 |
| House dust mite | Dermatophagoides pteronyssinus | Der p 6 | Aero Mite | Dermatophagoides Der p 6 / Der f 6 | 20 | 1352239 |
| House dust mite | Dermatophagoides pteronyssinus | Der p 7 | Aero Mite | Dermatophagoides Der p 7 / Der f 7 | 215 | 1045602 |
| House dust mite | Dermatophagoides pteronyssinus | Der p 7.0101 | Aero Mite | Dermatophagoides Der p 7 / Der f 7 | 215 | 10189811 |
| House dust mite | Dermatophagoides pteronyssinus | Der f 7.0101 | Aero Mite | Dermatophagoides Der p 7 / Der f 7 | 213 | 1311689 |
| House dust mite | Dermatophagoides pteronyssinus | Der p 8 | Aero Mite | Dermatophagoides Der p 8 | 219 | 807138 |
| House dust mite | Dermatophagoides pteronyssinus | Der p 8.0101 | Aero Mite | Dermatophagoides Der p 8 | 219 | 60920878 |
| House dust mite | Dermatophagoides pteronyssinus | Der p 18.0101 | Aero Mite | Dermatophagoides farinae Der f 18 Der p 18 | 462 | 67975085 |
| House dust mite | Dermatophagoides siboney | Unassigned | Aero Mite | Dermatophagoides Der p 2 / Der f 2 | 146 | 86450747 |
| House dust mite | Euroglyphus maynei | Eur m 1.0101 | Aero Mite | Euroglyphus Eur m 1 | 321 | 3941388 |
| House dust mite | Euroglyphus maynei | Unassigned | Aero Mite | Euroglyphus Eur m 1 | 327 | 3941390 |
| House dust mite | Euroglyphus maynei | Eur m 2.0102 | Aero Mite | Euroglyphus Eur m 2 | 135 | 3941386 |
| House dust mite | Euroglyphus maynei | Eur m 2.0101 | Aero Mite | Euroglyphus Eur m 2 | 145 | 3941384 |
| Indian honeybee | Apis cerana | Unassigned | Venom or | Apis Api m 1 Api d 1 Api c 1 | 134 | 7435005 |
| Indian honeybee | Apis cerana cerana | Api c 1.0101 | Venom or | Apis Api m 1 Api d 1 Api c 1 | 134 | 12958583 |
| Indian meal moth | Plodia interpunctella | Plo i 1.0101 | Aero Plant | Plodia Plo i 1 Arginine kinase | 355 | 15886861 |
| Indian meal moth | Plodia interpunctella | Plo i 2.0101 | Aero Plant | Plodia Plo i 2 thioredoxin | 106 | 308193268 |
| Intravenous contrast dye | | | Chemical | | | |
| Japanese cedar | Cryptomeria japonica | Unassigned | Aero Plant | Cryptomeria class IV chitinase | 281 | 56550550 |
| Japanese cedar | Cryptomeria japonica | Cry j 1.0102 | Aero Plant | Cryptomeria Cry j 1 | 374 | 493634 |
| Japanese cedar | Cryptomeria japonica | Cry j 1.0101 | Aero Plant | Cryptomeria Cry j 1 | 374 | 493632 |
| Japanese cedar | Cryptomeria japonica | Cry j 1.0103 | Aero Plant | Cryptomeria Cry j 1 | 374 | 516728 |
| Japanese cedar | Cryptomeria japonica | Cry j 2 | Aero Plant | Cryptomeria Cry j 2 | 514 | 1171004 |
| Japanese cedar | Cryptomeria japonica | Cry j 2 | Aero Plant | Cryptomeria Cry j 2 | 514 | 24898904 |
| Japanese cedar | Cryptomeria japonica | Cry j 2 | Aero Plant | Cryptomeria Cry j 2 | 514 | 24898906 |
| Japanese cedar | Cryptomeria japonica | Cry j 2 | Aero Plant | Cryptomeria Cry j 2 | 514 | 24898908 |
| Japanese cedar | Cryptomeria japonica | Unassigned | Aero Plant | Cryptomeria Cry j 2 | 514 | 114841607 |
| Japanese cedar | Cryptomeria japonica | Unassigned | Aero Plant | Cryptomeria Cry j 2 | 514 | 114841617 |
| Japanese cedar | Cryptomeria japonica | Unassigned | Aero Plant | Cryptomeria Cry j 2 | 514 | 114841629 |
| Japanese cedar | Cryptomeria japonica | Unassigned | Aero Plant | Cryptomeria Cry j 2 | 514 | 114841635 |
| Japanese cedar | Cryptomeria japonica | Unassigned | Aero Plant | Cryptomeria Cry j 2 | 514 | 114841641 |
| Japanese cedar | Cryptomeria japonica | Unassigned | Aero Plant | Cryptomeria Cry j 2 | 514 | 114841653 |
| Japanese cedar | Cryptomeria japonica | Unassigned | Aero Plant | Cryptomeria Cry j 2 | 514 | 114841657 |
| Japanese cedar | Cryptomeria japonica | Unassigned | Aero Plant | Cryptomeria Cry j 2 | 514 | 114841663 |
| Japanese cedar | Cryptomeria japonica | Unassigned | Aero Plant | Cryptomeria Cry j 2 | 514 | 114841665 |
| Japanese cedar | Cryptomeria japonica | Cry j 2.0101 | Aero Plant | Cryptomeria Cry j 2 | 514 | 506858 |
| Japanese cedar | Cryptomeria japonica | Unassigned | Aero Plant | Cryptomeria Cry j 2 | 65 | 123299282 |
| Japanese cedar | Cryptomeria japonica | Unassigned | Aero Plant | Cryptomeria Isoflavone reductase-like protein | 306 | 19847822 |
| Japanese cedar | Cryptomeria japonica | Unassigned | Aero Plant | Cryptomeria pollen allergen CJP-8 | 165 | 291621332 |
| Japanese cedar | Cryptomeria japonica | Unassigned | Aero Plant | Cryptomeria pollen allergen CPA63 | 472 | 293329689 |
| Japanese cedar | Cryptomeria japonica | Unassigned | Aero Plant | Cryptomeria thaumatin like Cry j 3.8 | 225 | 139002766 |
| Japanese cypress | Chamaecyparis obtusa | Cha o 1.0101 | Aero Plant | Chamaecyparis Cha o 1 | 375 | 1514943 |
| Japanese cypress | Chamaecyparis obtusa | Unassigned | Aero Plant | Chamaecyparis Cha o 2 | 514 | 47606004 |
| Japanese cypress | Chamaecyparis obtusa | Unassigned | Aero Plant | Chamaecyparis Cha o 2 | 419 | 114841683 |
| Japanese flying squid | Todarodes pacificus | Unassigned | Food Animal | Todarodes Tod p 1 | 284 | 83715932 |
| Japanese hop | Humulus japonicus | Hum j 1 | Aero Plant | Humulus Hum j1 | 155 | 33113263 |
| Japanese hop | Humulus scandens | Unassigned | Aero Plant | Humulus profilin-like protein | 131 | 34851176 |
| Japanese hop | Humulus scandens | Unassigned | Aero Plant | Humulus profilin-like protein | 131 | 34851174 |
| Japanese horse mackerel | Trachurus japonicus | Unassigned | Food Animal | Trachurus parvalbumin | 107 | 77799800 |
| Japanese turban shell | Batillus cornutus | Unassigned | Food Animal | Batillus Tur c1 | 284 | 219806588 |

| Common Name | Species | IUIS Allergen | Type | Group | Protein Length | GI# |
|---|---|---|---|---|---|---|
| Japanese white birch | Betula platyphylla | Unassigned | Aero Plant | Betula Bet v 1 | 160 | 12583681 |
| Japanese white birch | Betula platyphylla | Unassigned | Aero Plant | Betula Bet v 1 | 160 | 12583683 |
| Japanese white birch | Betula platyphylla | Unassigned | Aero Plant | Betula Bet v 1 | 160 | 12583685 |
| Johnson grass | Sorghum halepense | Sor h 1.0101 | Aero Plant | Sorghum Sor h 1 | 266 | 674275729 |
| Johnson grass | Sorghum halepense | Sor h 1.0201 | Aero Plant | Sorghum Sor h 1 | 266 | 674275731 |
| Johnson grass | Sorghum halepense | Sor h 13.0101 | Aero Plant | Sorghum Sor h 13 | 422 | 674275737 |
| Johnson grass | Sorghum halepense | Sor h 13.0201 | Aero Plant | Sorghum Sor h 13 | 410 | 674275739 |
| Jumper ant | Myrmecia pilosula | Unassigned | Venom or | Myrmecia Myr p 1 | 112 | 1911819 |
| Jumper ant | Myrmecia pilosula | Myr p 1.0101 | Venom or | Myrmecia Myr p 1 | 112 | 312284 |
| Jumper ant | Myrmecia pilosula | Myr p 2 | Venom or | Myrmecia Myr p 2 | 75 | 1587177 |
| Jumper ant | Myrmecia pilosula | Myr p 2.0101 | Venom or | Myrmecia Myr p 2 | 75 | 1438761 |
| Juniper | Juniperus oxycedrus | Unassigned | Aero Plant | Juniperus Jun a/v 1 | 367 | 15139849 |
| Juniper | Juniperus oxycedrus | Jun o 4 | Aero Plant | Juniperus Jun o 4 | 165 | 5391446 |
| Kamchatka crab | Paralithodes camtschaticus | Unassigned | Food Animal | Paralithodes tropomyosin | 284 | 125995163 |
| Kamchatka crab | Paralithodes camtschaticus | Unassigned | Food Animal | Paralithodes tropomyosin | 284 | 125995165 |
| Kentucky bluegrass | Poa pratensis | Poa p 5 | Aero Plant | Poa Poa p 5 | 303 | 11991227 |
| Kentucky bluegrass | Poa pratensis | Unassigned | Aero Plant | Poa Poa p 9 | 373 | 113560 |
| Kentucky bluegrass | Poa pratensis | Unassigned | Aero Plant | Poa Poa p 9 | 307 | 113562 |
| Kentucky bluegrass | Poa pratensis | Poa p 1 | Aero Plant | Poa Poa p 1 | 20 | 280414 |
| Kentucky bluegrass | Poa pratensis | Poa p 1 | Aero Plant | Poa Poa p 1 | 26 | 320620 |
| Kentucky bluegrass | Poa pratensis | Poa p 1.0101 | Aero Plant | Poa Poa p 1 | 263 | 4090265 |
| Kentucky bluegrass | Poa pratensis | Unassigned | Aero Plant | Poa Poa p 9 | 131 | 539056 |
| Kentucky bluegrass | Poa pratensis | Unassigned | Aero Plant | Poa Poa p 9 | 333 | 113561 |
| Kidney bean | Phaseolus vulgaris | Pha v 3.0101 | Aero Plant | Phaseolus Pha v 3 | 115 | 289064177 |
| Kidney bean | Phaseolus vulgaris | Pha v 3.0201 | Aero Plant | Phaseolus Pha v 3 | 118 | 289064179 |
| Kiwi | Actinidia chinensis | Unassigned | Food Plant | Actinidia Act c 1 Act d 1 Actinidin | 380 | 190358935 |
| Kiwi | Actinidia chinensis | Act c 1 | Food Plant | Actinidia Act c 10 LTP | 15 | 378548410 |
| Kiwi | Actinidia chinensis | Act c 5.0102 | Food Plant | Actinidia Act c 5 kiwellin | 213 | 441482354 |
| Kiwi | Actinidia chinensis | Act c 8.0101 | Food Plant | Actinidia Act c 8 Act d 8 PR-10 | 159 | 281552896 |
| Kiwi | Actinidia deliciosa | Unassigned | Food Plant | Actinidia Act d 2 thaumatin like protein | 20 | 68064399 |
| Kiwi | Actinidia deliciosa | Act d 1 | Food Plant | Actinidia Act d 2 thaumatin like protein | 225 | 441482370 |
| Kiwi | Actinidia deliciosa | Unassigned | Food Plant | Actinidia Act c 1 Act d 1 Actinidin | 380 | 15984 |
| Kiwi | Actinidia deliciosa | Unassigned | Food Plant | Actinidia Act c 1 Act d 1 Actinidin | 380 | 166317 |
| Kiwi | Actinidia deliciosa | Act d 8.0101 | Food Plant | Actinidia Act c 1 Act d 1 Actinidin | 380 | 193806686 |
| Kiwi | Actinidia deliciosa | Act d 10.0201 | Food Plant | Actinidia Act c 8 Act d 8 PR-10 | 157 | 281552898 |
| Kiwi | Actinidia deliciosa | Act d 10.0101 | Food Plant | Actinidia Act d 10 LTP | 92 | 378548411 |
| Kiwi | Actinidia deliciosa | Act d 11 | Food Plant | Actinidia Act d 10 LTP | 92 | 378405189 |
| Kiwi | Actinidia deliciosa | Act d 2.0101 | Food Plant | Actinidia Act d 11 Kirola MLP | 150 | 332319679 |
| Kiwi | Actinidia deliciosa | Unassigned | Food Plant | Actinidia Act d 2 thaumatin like protein | 225 | 71057064 |
| Kiwi | Actinidia deliciosa | Act d 4.0101 | Food Plant | Actinidia Act d 2 thaumatin like protein | 201 | 146737976 |
| Kiwi | Actinidia deliciosa | Act d 5.0101 | Food Plant | Actinidia Act d 4 Phytocystatin | 116 | 40807635 |
| Kiwi | Actinidia deliciosa | Unassigned | Food Plant | Actinidia Act d 5 kiwellin | 189 | 85701136 |
| Kiwi | Actinidia deliciosa | Unassigned | Food Plant | Actinidia Act d 5 kiwellin | 213 | 441482346 |
| Kiwi | Actinidia deliciosa | Unassigned | Food Plant | Actinidia Act d 5 kiwellin | 213 | 441482348 |
| Kiwi | Actinidia deliciosa | Unassigned | Food Plant | Actinidia Act d 5 kiwellin | 213 | 441482350 |
| Kiwi | Actinidia deliciosa | Act d 7.0101 | Food Plant | Actinidia Act d 5 kiwellin | 213 | 441482352 |
| Krill | Euphausia superba | Unassigned | Food Animal | Euphausia | 321 | 160419153 |
| Kuruma Shrimp | Marsupenaeus japonicus | Unassigned | Food Animal | Marsupenaeus tropomyosin | 284 | 156712752 |
| Latex | Hev b1, Hev b3, Hev b5, Hev b 6.02 | Unassigned | | | 284 | 125995159 |
| Lemon | Citrus limon | Cit l 3.0101 | Food Plant | Citrus LTP Cit s 3/Cit l 3 | 20 | 52783176 |

| Common Name | Species | IUIS Allergen | Type | Group | Protein Length | GI# |
|---|---|---|---|---|---|---|
| Lentil | Lens culinaris | Len c 3.0101 | Food Plant | Lens Len c 3 | 118 | 60735410 |
| Lentil | Lens culinaris | Len c 1.0101 | Food Plant | Lens Len c 1 | 418 | 29539109 |
| Lentil | Lens culinaris | Len c 1.0102 | Food Plant | Lens Len c 1 | 415 | 29539111 |
| Lesser banded hornet | Vespa affinis | Unassigned | Food Animal | Vespa affinis Phospholipase A1 | 334 | 576011175 |
| Lesser banded hornet | Vespa affinis | Unassigned | Food Animal | Vespa affinis Phospholipase A1 | 334 | 576011171 |
| Lilac | Syringa vulgaris | Syr v 3.0101 | Aero Plant | Syringa Syr v 3 | 81 | 14423847 |
| Lilac | Syringa vulgaris | Syr v 1.0101 | Aero Plant | Syringa Syr v I | 145 | 631911 |
| Lilac | Syringa vulgaris | Syr v 1.0102 | Aero Plant | Syringa Syr v I | 145 | 631912 |
| Lilac | Syringa vulgaris | Syr v 1.0103 | Aero Plant | Syringa Syr v I | 145 | 631913 |
| Lobster | Panulirus stimpsoni | Pan s 1.0101 | Food Animal | Panulirus Pan s 1 | 274 | 3080761 |
| Local anesthetics | | | Chemica | | | |
| London plane tree | Platanus x acerifolia | Pla a 1 | Aero Plant | Platanus Pla a 1 | 179 | 26190140 |
| London plane tree | Platanus x acerifolia | Pla a 2 | Aero Plant | Platanus Pla a 2 | 377 | 49523394 |
| Lychee nut | Litchi chinensis | Lit c 1 | Aero Plant | Litchi Lit c 1 | 131 | 15809696 |
| Lychee nut | Litchi chinensis | Unassigned | Aero Plant | Litchi Lit c 1 | 131 | 83317152 |
| Madagascar periwinkle | Catharanthus roseus | Cat r 1.0101 | Aero Plant | Catharanthus cyclophilin | 172 | 1220142 |
| Mantis Shrimp | Oratosquilla oratoria | Unassigned | Food Animal | Oratosquilla tropomyosin | 284 | 162286975 |
| Mediterranean Cypress | Cupressus sempervirens | Cup s 1.0101 | Aero Plant | Cupressus Cup a 1/Cup s 1 | 367 | 8101711 |
| Mediterranean Cypress | Cupressus sempervirens | Cup s 1.0102 | Aero Plant | Cupressus Cup a 1/Cup s 1 | 367 | 8101713 |
| Mediterranean Cypress | Cupressus sempervirens | Cup s 1.0103 | Aero Plant | Cupressus Cup a 1/Cup s 1 | 367 | 8101715 |
| Mediterranean Cypress | Cupressus sempervirens | Cup s 1.0104 | Aero Plant | Cupressus Cup a 1/Cup s 1 | 367 | 8101717 |
| Mediterranean Cypress | Cupressus sempervirens | Cup s 1.0105 | Aero Plant | Cupressus Cup a 1/Cup s 1 | 367 | 8101719 |
| Mediterranean Cypress | Cupressus sempervirens | Cup s 3.0102 | Aero Plant | Cupressus Cup s 3 | 225 | 38456228 |
| Mediterranean Cypress | Cupressus sempervirens | Cup s 3.0101 | Aero Plant | Cupressus Cup s 3 | 225 | 38456226 |
| Midge | Chironomus kiiensis | Chi k 10 | Aero Insect | Chironomus Chi k 10 | 285 | 7321108 |
| Midge | Chironomus thummi | Chi t 3.0501 | Aero Insect | Chironomus Chi t 3 | 160 | 156585 |
| Midge | Chironomus thummi | Chi t 1.01 | Aero Insect | Chironomus Chi t 1 | 151 | 121219 |
| Midge | Chironomus thummi thummi | Chi t 1.02 | Aero Insect | Chironomus Chi t 1 | 151 | 121227 |
| Midge | Chironomus thummi thummi | Chi t 2.0101 | Aero Insect | Chironomus Chi t 2 | 158 | 2506460 |
| Midge | Chironomus thummi thummi | Chi t 3.0601 | Aero Insect | Chironomus Chi t 3 | 161 | 56405052 |
| Midge | Chironomus thummi thummi | Chi t 3.0901 | Aero Insect | Chironomus Chi t 3 | 151 | 121237 |
| Midge | Chironomus thummi thummi | Chi t 3.0701 | Aero Insect | Chironomus Chi t 3 | 161 | 56405054 |
| Midge | Chironomus thummi thummi | Chi t 3.0702 | Aero Insect | Chironomus Chi t 3 | 161 | 121248 |
| Midge | Chironomus thummi thummi | Chi t 3.0801 | Aero Insect | Chironomus Chi t 3 | 162 | 121249 |
| Midge | Chironomus thummi thummi | Chi t 3.0301 | Aero Insect | Chironomus Chi t 3 | 161 | 56405306 |
| Midge | Chironomus thummi thummi | Chi t 3.0101 | Aero Insect | Chironomus Chi t 3 | 160 | 1707908 |
| Midge | Chironomus thummi thummi | Chi t 3.0401 | Aero Insect | Chironomus Chi t 3 | 161 | 1707911 |
| Midge | Chironomus thummi thummi | Chi t 3.0201 | Aero Insect | Chironomus Chi t 3 | 162 | 2506461 |
| Midge | Chironomus thummi thummi | Chi t 4 | Aero Insect | Chironomus Chi t 4 | 151 | 121256 |
| Midge | Chironomus thummi thummi | Chi t 7 | Aero Insect | Chironomus Chi t 7 | 161 | 121244 |
| Midge | Chironomus thummi thummi | Chi t 9 | Aero Insect | Chironomus Chi t 9 | 151 | 121259 |
| Milk | | alpha S1-casein | Food | | | |
| Mite | Acarus siro | Unassigned | Aero Mite | Acarus Aca s 4 | 517 | 118638278 |
| Mite | Acarus siro | Aca s 13 | Aero Mite | Acarus Aca s 13 | 131 | 118638268 |
| Mite | Blomia tropicalis | Blot 1 | Aero Mite | Blomia Blo t 1.01 | 221 | 14276828 |
| Mite | Blomia tropicalis | Unassigned | Aero Mite | Blomia Blo t 1.02 | 333 | 33667928 |
| Mite | Blomia tropicalis | Unassigned | Aero Mite | Blomia Blo t 1.02 | 333 | 2 |
| Mite | Blomia tropicalis | Blo t 10.0101 | Aero Mite | Blomia Blo t 10 | 284 | 156938889 |
| Mite | Blomia tropicalis | Blo t 11 | Aero Mite | Blomia Blo t 11 | 875 | 21954740 |
| Mite | Blomia tropicalis | Blo t 12 | Aero Mite | Blomia Blo t 12 | 144 | 902012 |
| Mite | Blomia tropicalis | Blo t 13 | Aero Mite | Blomia Blo t 13.01 | 130 | 1377859 |

| Common Name | Species | IUIS Allergen | Type | Group | Protein Length | GI# |
|---|---|---|---|---|---|---|
| Mite | Blomia tropicalis | Blo t 21.0101 | Aero Mite | Blomia Blo t 21 | 129 | 60679570 |
| Mite | Blomia tropicalis | Unassigned | Aero Mite | Blomia Blo t 21 | 129 | 111120432 |
| Mite | Blomia tropicalis | Unassigned | Aero Mite | Blomia Blo t 21 | 129 | 111494253 |
| Mite | Blomia tropicalis | Unassigned | Aero Mite | Blomia Blo t 21 | 129 | 111120424 |
| Mite | Blomia tropicalis | Unassigned | Aero Mite | Blomia Blo t 21 | 129 | 111120428 |
| Mite | Blomia tropicalis | Blo t 3.0101 | Aero Mite | Blomia Blo t 3 | 266 | 25989482 |
| Mite | Blomia tropicalis | Unassigned | Aero Mite | Blomia Blo t 3 | 266 | 33667930 |
| Mite | Blomia tropicalis | Unassigned | Aero Mite | Blomia Blo t 4 alpha amylase | 506 | 33667932 |
| Mite | Blomia tropicalis | Blo t 5 | Aero Mite | Blomia Blo t 5 | 134 | 4204917 |
| Mite | Blomia tropicalis | Unassigned | Aero Mite | Blomia Blo t 5 | 134 | 111120436 |
| Mite | Blomia tropicalis | Unassigned | Aero Mite | Blomia Blo t 5 | 134 | 111120450 |
| Mite | Blomia tropicalis | Unassigned | Aero Mite | Blomia Blo t 5 | 119 | 160285626 |
| Mite | Blomia tropicalis | Unassigned | Aero Mite | Blomia Blo t 7 non_iuis allergen | 192 | 33667936 |
| Mite | Blomia tropicalis | Unassigned | Aero Mite | Blomia Blo t 8 | 236 | 37958149 |
| Mite | Blomia tropicalis | Blo t 8.0101 | Aero Mite | Blomia Blo t 8 | 236 | 256665455 |
| Mite | Suidasia medanensis | Unassigned | Aero mite | Suidasia putative Sui m 2 | 141 | 45738062 |
| Mollusc | Fulvia mutica | Unassigned | Food Animal | Fulvia tropomyosin | 284 | 219806596 |
| Mollusc | Pseudocardium sachalinensis | Unassigned | Food Animal | Pseudocardium tropomyosin | 284 | 219806598 |
| Mountain cedar | Juniperus ashei | Jun a 2 | Aero Plant | Juniperus Jun a 2 | 507 | 9955725 |
| Mountain cedar | Juniperus ashei | Jun a 3.0101 | Aero Plant | Juniperus Jun a 3 | 225 | 9087177 |
| Mountain cedar | Juniperus ashei | Jun a 1.010101 | Aero Plant | Juniperus Jun a/v 1 | 367 | 4138877 |
| Mouse | Mus musculus | Mus m 1 | Aero Animal | Mus Mus m 1 | 180 | 20178291 |
| Mouse | Mus musculus | Mus m 1.0101 | Aero Animal | Mus Mus m 1 | 180 | 295910 |
| Mouse | Mus musculus domesticus | Mus m 1.0102 | Aero Animal | Mus Mus m 1 | 180 | 199881 |
| Mozambique tilapia | Oreochromis mossambicus | Ore m 4.0101 | Food Anima | Oreochromis Ore m 4 tropomyosin | 284 | 410060781 |
| Mugwort | Artemisia vulgaris | Art v 1 | Aero Plant | Artemisia Art v 1 | 132 | 27818335 |
| Mugwort | Artemisia vulgaris | Art v 2.0101 | Aero Plant | Artemisia Art v 2 | 162 | 148887203 |
| Mugwort | Artemisia vulgaris | Art v 3.0101 | Aero Plant | Artemisia Art v 3 | 37 | 73621307 |
| Mugwort | Artemisia vulgaris | Art v 3.0201 | Aero Plant | Artemisia Art v 3 | 114 | 189544578 |
| Mugwort | Artemisia vulgaris | Art v 3.0202 | Aero Plant | Artemisia Art v 3 | 116 | 189544584 |
| Mugwort | Artemisia vulgaris | Art v 3.0301 | Aero Plant | Artemisia Art v 3 | 117 | 189544590 |
| Mugwort | Artemisia vulgaris | Unassigned | Aero Plant | Artemisia Art v 3 | 117 | 189544595 |
| Mugwort | Artemisia vulgaris | Art v 4.0101 | Aero Plant | Artemisia Art v 4 | 133 | 25955969 |
| Mugwort | Artemisia vulgaris | Art v 4.0201 | Aero Plant | Artemisia Art v 4 | 133 | 25955971 |
| Mugwort | Artemisia vulgaris | Art v 6.0101 | Aero Plant | Artemisia Art v 6 pectate lyase | 396 | 62530263 |
| Mugwort | Artemisia vulgaris | Art v 5.0101 | Aero Plant | Artemisia mugwort Art v 5 | 82 | 62530265 |
| Mulberry | Morus bombycis | Unassigned | Food Plant | Morus winter accumulating protein | 157 | 54311115 |
| Mulberry | Morus bombycis | Unassigned | Food Plant | Morus winter accumulating protein | 157 | 54311119 |
| mung bean | Vigna radiata | Vig r 1.0101 | Food Plant | Vigna Vig r 1 PR 10 | 155 | 60418924 |
| mung bean | Vigna radiata | Vig r 2.0101 | Food Plant | Vigna Vig r 2 | 453 | 108743976 |
| mung bean | Vigna radiata | Vig r 2.0201 | Food Plant | Vigna Vig r 2 | 454 | 158251953 |
| mung bean | Vigna radiata | Vig r 6.0101 | Food Plant | Vigna Vig r 6 Cytokinin-specific binding protein | 155 | 4190976 |
| mung bean | Vigna radiata var. radiata | Vig r 4.0101 | Food Plant | Vigna Vig r 4 | 272 | 1000708 |
| Mushroom | Schizophyllum commune H4-8 | Sch c 1.0101 | Gliadin | Schizophyllum Sch c 1 | 576 | 302681819 |
| Muskmelon | Cucumis melo | Cuc m 1 | Aero Plant | Cucumis Cuc m 1 | 731 | 807698 |
| Muskmelon | Cucumis melo | Unassigned | Aero Plant | Cucumis Cuc m 2 | 131 | 31559374 |
| Muskmelon | Cucumis melo | Cuc m 2 | Aero Plant | Cucumis Cuc m 2 | 131 | 58263793 |
| Muskmelon | Cucumis melo var. inodorus | Cuc m 3.0101 | Food Plant | Cucumis Cuc m 3 | 41 | 46396595 |
| Muskmelon | Cucumis melo | Unassigned | Food Plant | Cucumis Cuc m 3 | 151 | 171464770 |
| Mustard | Brassica juncea | Bra j 1 | Food Plant | Brassica Bra j 1 2S albumin | 129 | 32363444 |
| Narrow-leaved plantain | Plantago lanceolata | Pla l 1.0101 | Aero Plant | Plantago Pla l 1 | 131 | 14422359 |

| Common Name | Species | IUIS Allergen | Type | Group | Protein Length | GI# |
|---|---|---|---|---|---|---|
| Narrow-leaved plantain | Plantago lanceolata | Pla l 1.0102 | Aero Plant | Plantago Pla l 1 | 131 | 14422361 |
| Narrow-leaved plantain | Plantago lanceolata | Pla l 1.0103 | Aero Plant | Plantago Pla l 1 | 131 | 14422363 |
| Narrow-leaved plantain | Plantago lanceolata | Unassigned | Aero Plant | Plantago Pla l 1 | 65 | 29163773 |
| Navel orange | Citrus sinensis | Cit s 1.0101 | Food Plant | Citrus Cit s 1 | 25 | 52782810 |
| Navel orange | Citrus sinensis | Cit s 2.0101 | Food Plant | Citrus Cit s 2 | 131 | 56000996 |
| Navel orange | Citrus sinensis | Unassigned | Food Plant | Citrus LTP Cit s 3/Cit l 3 | 20 | 52783177 |
| Navel orange | Citrus sinensis | Cit s 3 | Food Plant | Citrus LTP Cit s 3/Cit l 3 | 91 | 50199132 |
| Netted muskmelon | Cucumis melo var. reticulatus | Unassigned | Food Plant | Cucumis Cuc m 2 | 131 | 57021110 |
| Nickel | | nickel sulfate hexahydrate | Metals | | | |
| Noble scallop | Mimachlamys nobilis | Unassigned | Food Animal | Mimachlamys Tropomyosin | 284 | 9954253 |
| Non-steroidal anti-inflammatoir | | | Chemical | | | |
| North Pacific hake | Merluccius productus | Unassigned | Food Anima | Merluccius sp. Parvalbumin Hake | 108 | 308191459 |
| North Pacific hake | Merluccius productus | Unassigned | Food Animal | Merluccius sp. Parvalbumin Hake | 108 | 308191472 |
| North Pacific Krill | Euphausia pacifica | Unassigned | Food Animal | Euphausia | 284 | 156712754 |
| Oak | Quercus alba | Que a 1.0201 | Aero Plant | Quercus Que a 1 | 159 | 167472847 |
| Oak | Quercus alba | Que a 1.0401 | Aero Plant | Quercus Que a 1 | 160 | 167472851 |
| Oak | Quercus alba | Que a 1.0301 | Aero Plant | Quercus Que a 1 | 160 | 167472849 |
| ocean perch (red fish) | Sebastes marinus | Seb m 1.0101 | Food Animal | Sebastes Seb m 1 | 109 | 242253959 |
| ocean perch (red fish) | Sebastes marinus | Seb m 1.0201 | Food Animal | Sebastes Seb m 1 | 110 | 242253961 |
| Octopus | Amphioctopus fangsiao | Unassigned | Food Animal | Amphioctopus arginine kinase | 348 | 340742817 |
| Octopus | Octopus vulgaris | Unassigned | Food Animal | Octopus tropomyosin | 284 | 83715936 |
| Olive tree | Olea europaea | Ole e 1 | Aero Plant | Olea Ole e 1 | 145 | 14424429 |
| Olive tree | Olea europaea | Unassigned | Aero Plant | Olea Ole e 1 | 137 | 1362128 |
| Olive tree | Olea europaea | Unassigned | Aero Plant | Olea Ole e 1 | 136 | 1362129 |
| Olive tree | Olea europaea | Unassigned | Aero Plant | Olea Ole e 1 | 136 | 1362130 |
| Olive tree | Olea europaea | Ole e 1.0104 | Aero Plant | Olea Ole e 1 | 145 | 1362131 |
| Olive tree | Olea europaea | Ole e 1 | Aero Plant | Olea Ole e 1 | 137 | 1362132 |
| Olive tree | Olea europaea | Unassigned | Aero Plant | Olea Ole e 1 | 136 | 1362133 |
| Olive tree | Olea europaea | Ole e 1.0103 | Aero Plant | Olea Ole e 1 | 145 | 1362136 |
| Olive tree | Olea europaea | Unassigned | Aero Plant | Olea Ole e 1 | 136 | 1362137 |
| Olive tree | Olea europaea | Ole e 1.0105 | Aero Plant | Olea Ole e 1 | 146 | 2465127 |
| Olive tree | Olea europaea | Ole e 1.0106 | Aero Plant | Olea Ole e 1 | 146 | 2465129 |
| Olive tree | Olea europaea | Ole e 1.0107 | Aero Plant | Olea Ole e 1 | 146 | 2465131 |
| Olive tree | Olea europaea | Ole e 1.0101 | Aero Plant | Olea Ole e 1 | 130 | 13195753 |
| Olive tree | Olea europaea | Unassigned | Aero Plant | Olea Ole e 1 | 134 | 37724597 |
| Olive tree | Olea europaea | Unassigned | Aero Plant | Olea Ole e 1 | 135 | 37724593 |
| Olive tree | Olea europaea | Unassigned | Aero Plant | Olea Ole e 1 | 132 | 37548753 |
| Olive tree | Olea europaea | Unassigned | Aero Plant | Olea Ole e 1 | 131 | 33329758 |
| Olive tree | Olea europaea | Unassigned | Aero Plant | Olea Ole e 1 | 132 | 33329756 |
| Olive tree | Olea europaea | Unassigned | Aero Plant | Olea Ole e 1 | 132 | 33329754 |
| Olive tree | Olea europaea | Unassigned | Aero Plant | Olea Ole e 1 | 131 | 33329752 |
| Olive tree | Olea europaea | Unassigned | Aero Plant | Olea Ole e 1 | 131 | 33329750 |
| Olive tree | Olea europaea | Unassigned | Aero Plant | Olea Ole e 1 | 129 | 33329748 |
| Olive tree | Olea europaea | Unassigned | Aero Plant | Olea Ole e 1 | 131 | 33329744 |
| Olive tree | Olea europaea | Unassigned | Aero Plant | Olea Ole e 1 | 132 | 33329738 |
| Olive tree | Olea europaea | Unassigned | Aero Plant | Olea Ole e 1 | 132 | 33329732 |
| Olive tree | Olea europaea | Unassigned | Aero Plant | Olea Ole e 1 | 132 | 33325115 |
| Olive tree | Olea europaea | Unassigned | Aero Plant | Olea Ole e 1 | 140 | 145313982 |
| Olive tree | Olea europaea | Unassigned | Aero Plant | Olea Ole e 1 | 140 | 145313984 |
| Olive tree | Olea europaea | Unassigned | Aero Plant | Olea Ole e 1 | 140 | 145313988 |
| Olive tree | Olea europaea | Unassigned | Aero Plant | Olea Ole e 1 | 140 | 145313990 |

-continued

| Common Name | Species | IUIS Allergen | Type | Group | Protein Length | GI# |
|---|---|---|---|---|---|---|
| Olive tree | Olea europaea | Unassigned | Aero Plant | Olea Ole e 1 | 140 | 145313992 |
| Olive tree | Olea europaea | Ole e 10 | Aero Plant | Olea Ole e 10 | 123 | 29465664 |
| Olive tree | Olea europaea | Ole e 11.0102 | Aero Plant | Olea Ole e 11.0101 and 0102 | 364 | 68270856 |
| Olive tree | Olea europaea | Ole e 11.0101 | Aero Plant | Olea Ole e 11.0101 and 0102 | 364 | 269996495 |
| Olive tree | Olea europaea | Unassigned | Aero Plant | Olea Ole e 13 | 226 | 449061783 |
| Olive tree | Olea europaea | Ole e 2 | Aero Plant | Olea Ole e 2 | 134 | 3914427 |
| Olive tree | Olea europaea | Ole e 2 | Aero Plant | Olea Ole e 2 | 134 | 3914428 |
| Olive tree | Olea europaea | Unassigned | Aero Plant | Olea Ole e 2 | 131 | 576017874 |
| Olive tree | Olea europaea | Unassigned | Aero Plant | Olea Ole e 2 | 131 | 576017774 |
| Olive tree | Olea europaea | Ole e 2.0101 | Aero Plant | Olea Ole e 2 | 134 | 2465133 |
| Olive tree | Olea europaea | Ole e 3.0101 | Aero Plant | Olea Ole e 3 | 84 | 3337403 |
| Olive tree | Olea europaea | Ole e 3 | Aero Plant | Olea Ole e 3 | 52 | 37725377 |
| Olive tree | Olea europaea | Ole e 5.0101 | Aero Plant | Olea Ole e 5 | 30 | 122064581 |
| Olive tree | Olea europaea | Ole e 5 | Aero Plant | Olea Ole e 5 | 152 | 39840779 |
| Olive tree | Olea europaea | Unassigned | Aero Plant | Olea Ole e 5 | 152 | 145313972 |
| Olive tree | Olea europaea | Unassigned | Aero Plant | Olea Ole e 5 | 152 | 160347106 |
| Olive tree | Olea europaea | Unassigned | Aero Plant | Olea Ole e 5 | 144 | 160347108 |
| Olive tree | Olea europaea | Unassigned | Aero Plant | Olea Ole e 5 | 152 | 160347112 |
| Olive tree | Olea europaea | Unassigned | Aero Plant | Olea Ole e 5 | 152 | 160347120 |
| Olive tree | Olea europaea | Unassigned | Aero Plant | Olea Ole e 5 | 152 | 160347122 |
| Olive tree | Olea europaea | Unassigned | Aero Plant | Olea Ole e 5 | 152 | 160347124 |
| Olive tree | Olea europaea | Unassigned | Aero Plant | Olea Ole e 5 | 152 | 160347126 |
| Olive tree | Olea europaea | Unassigned | Aero Plant | Olea Ole e 5 | 152 | 160347130 |
| Olive tree | Olea europaea | Unassigned | Aero Plant | Olea Ole e 5 | 152 | 160347134 |
| Olive tree | Olea europaea | Unassigned | Aero Plant | Olea Ole e 5 | 152 | 160347138 |
| Olive tree | Olea europaea | Unassigned | Aero Plant | Olea Ole e 5 | 152 | 160962543 |
| Olive tree | Olea europaea | Unassigned | Aero Plant | Olea Ole e 5 | 152 | 160962547 |
| Olive tree | Olea europaea | Unassigned | Aero Plant | Olea Ole e 5 | 152 | 160962557 |
| Olive tree | Olea europaea | Unassigned | Aero Plant | Olea Ole e 5 | 152 | 160962569 |
| Olive tree | Olea europaea | Unassigned | Aero Plant | Olea Ole e 5 | 152 | 160962577 |
| Olive tree | Olea europaea | Unassigned | Aero Plant | Olea Ole e 5 | 152 | 160962583 |
| Olive tree | Olea europaea | Unassigned | Aero Plant | Olea Ole e 5 | 144 | 160962587 |
| Olive tree | Olea europaea | Unassigned | Aero Plant | Olea Ole e 5 | 152 | 160962591 |
| Olive tree | Olea europaea | Unassigned | Aero Plant | Olea Ole e 5 | 152 | 160962597 |
| Olive tree | Olea europaea | Unassigned | Aero Plant | Olea Ole e 5 | 152 | 160962611 |
| Olive tree | Olea europaea | Unassigned | Aero Plant | Olea Ole e 5 | 152 | 160962613 |
| Olive tree | Olea europaea | Ole e 6.0101 | Aero Plant | Olea Ole e 6 | 50 | 2276458 |
| Olive tree | Olea europaea | Ole e 7 | Aero Plant | Olea Ole e 7 | 21 | 22002032 |
| Olive tree | Olea europaea | Ole e 8 | Aero Plant | Olea Ole e 8 | 171 | 6901654 |
| Olive tree | Olea europaea | Ole e 8.0101 | Aero Plant | Olea Ole e 8 | 171 | 6901652 |
| Olive tree | Olea europaea | Ole e 9 | Aero Plant | Olea Ole e 9 | 460 | 14279169 |
| Olive tree | Olea europaea | Unassigned | Aero Plant | Olea Ole e 9 | 101 | 166235350 |
| Orchard grass | Dactylis glomerata | Dac g 1 | Aero Plant | Dactylis Dac g 1 | 264 | 18093991 |
| Orchard grass | Dactylis glomerata | Dac g 1.0101 | Aero Plant | Dactylis Dac g 1 | 240 | 33149333 |
| Orchard grass | Dactylis glomerata | Dac g 2 | Aero Plant | Dactylis Dac g 2 | 196 | 1093120 |
| Orchard grass | Dactylis glomerata | Dac g 2 | Aero Plant | Dactylis Dac g 2 | 122 | 4007040 |
| Orchard grass | Dactylis glomerata | Dac g 3 | Aero Plant | Dactylis Dac g 3 | 96 | 1825459 |
| Orchard grass | Dactylis glomerata | Dac g 4.0101 | Aero Plant | Dactylis Dac g 4 | 55 | 32363463 |
| Orchard grass | Dactylis glomerata | Dac g 5 | Aero Plant | Dactylis Dac g 5 | 290 | 14423124 |
| Orchard grass | Dactylis glomerata | Dac g 5 | Aero Plant | Dactylis Dac g 5 | 265 | 18093971 |
| Oriental plane | Platanus orientalis | Pla or 1.0101 | Aero Plant | Platanus Pla or 1 | 170 | 162949336 |

-continued

| Common Name | Species | IUIS Allergen | Type | Group | Protein Length | GI# |
|---|---|---|---|---|---|---|
| Oriental plane | Platanus orientalis | Pla or 2.0101 | Aero Plant | Platanus Pla or 2 | 378 | 162949338 |
| Papaya | Carica papaya | Unassigned | Food Plant | Carica Car p 1 | 345 | 129614 |
| Paper wasp | Polistes annularis | Pol a 5.0101 | Food Plant | Polistes Pol 5 | 209 | 160780 |
| Paper wasp | Polistes annularis | Pol a 1.0101 | Food Plant | Polistes Pol a 1 Pol d 1 | 301 | 5815249 |
| Paper wasp | Polistes annularis | Pol a 2.0101 | Food Plant | Polistes Pol a 2 | 367 | 5815251 |
| Paper wasp | Polistes dominulus | Pol d 5 | Food Plant | Polistes Pol 5 | 227 | 51093377 |
| Paper wasp | Polistes dominulus | Pol d 1.0104 | Food Plant | Polistes Pol a 1 Pol d 1 | 316 | 45510893 |
| Paper wasp | Polistes dominulus | Pol d 1.0103 | Food Plant | Polistes Pol a 1 Pol d 1 | 316 | 45510891 |
| Paper wasp | Polistes dominulus | Pol d 1.0102 | Food Plant | Polistes Pol a 1 Pol d 1 | 316 | 45510889 |
| Paper wasp | Polistes dominulus | Pol d 1.0101 | Food Plant | Polistes Pol a 1 Pol d 1 | 337 | 45510887 |
| Paper wasp | Polistes dominulus | Pol d 4.0101 | Food Plant | Polistes Venom serine protease | 277 | 30909091 |
| Paper wasp | Polistes exclamans | Pol e 5.0101 | Food Plant | Polistes Pol 5 | 226 | 51093375 |
| Paper wasp | Polistes fuscatus | Pol f 5 | Food Plant | Polistes Pol 5 | 205 | 549188 |
| Paper wasp | Polistes gallicus | Pol g 5 | Food Plant | Polistes Pol 5 | 206 | 25091511 |
| Paper wasp | Polistes gallicus | Unassigned | Food Plant | Polistes Pol a 1 Pol d 1 | 42 | 41017429 |
| Para rubber tree | Hevea brasiliensis | Hev b 1.0101 | Aero Plant | Hevea Hev b 1 | 138 | 18839 |
| Para rubber tree | Hevea brasiliensis | Hev b 10.0101 | Aero Plant | Hevea Hev b 10 | 233 | 348137 |
| Para rubber tree | Hevea brasiliensis | Hev b 10.0102 | Aero Plant | Hevea Hev b 10 | 205 | 5777414 |
| Para rubber tree | Hevea brasiliensis | Hev b 10.0103 | Aero Plant | Hevea Hev b 10 | 205 | 10862818 |
| Para rubber tree | Hevea brasiliensis | Hev b 11.0101 | Aero Plant | Hevea Hev b 11 | 295 | 14575525 |
| Para rubber tree | Hevea brasiliensis | Hev b 12 | Aero Plant | Hevea Hev b 12 | 116 | 20135538 |
| Para rubber tree | Hevea brasiliensis | Hev b 13 | Aero Plant | Hevea Hev b 13 | 391 | 30909057 |
| Para rubber tree | Hevea brasiliensis | Hev b 14.0101 | Aero Plant | Hevea Hev b 14 hevamine | 208 | 313870530 |
| Para rubber tree | Hevea brasiliensis | Hev b 2.0101 | Aero Plant | Hevea Hev b 2 | 374 | 1184668 |
| Para rubber tree | Hevea brasiliensis | Hev b 2 | Aero Plant | Hevea Hev b 2 | 374 | 32765543 |
| Para rubber tree | Hevea brasiliensis | Unassigned | Aero Plant | Hevea Hev b 2 | 374 | 124294783 |
| Para rubber tree | Hevea brasiliensis | Unassigned | Aero Plant | Hevea Hev b 2 | 374 | 124294785 |
| Para rubber tree | Hevea brasiliensis | Unassigned | Aero Plant | Hevea Hev b 2 | 374 | 124365249 |
| Para rubber tree | Hevea brasiliensis | Unassigned | Aero Plant | Hevea Hev b 2 | 374 | 124365251 |
| Para rubber tree | Hevea brasiliensis | Unassigned | Aero Plant | Hevea Hev b 2 | 374 | 124365253 |
| Para rubber tree | Hevea brasiliensis | Unassigned | Aero Plant | Hevea Hev b 2 | 374 | 268037674 |
| Para rubber tree | Hevea brasiliensis | Unassigned | Aero Plant | Hevea Hev b 2 | 374 | 270315180 |
| Para rubber tree | Hevea brasiliensis | Unassigned | Aero Plant | Hevea Hev b 2 | 373 | 359359690 |
| Para rubber tree | Hevea brasiliensis | Unassigned | Aero Plant | Hevea Hev b 2 | 374 | 387778882 |
| Para rubber tree | Hevea brasiliensis | Unassigned | Aero Plant | Hevea Hev b 2 | 374 | 387778880 |
| Para rubber tree | Hevea brasiliensis | Hev b 3.0101 | Aero Plant | Hevea Hev b 3 | 204 | 3818475 |
| Para rubber tree | Hevea brasiliensis | Hev b 4.0101 | Aero Plant | Hevea Hev b 4 | 366 | 46410859 |
| Para rubber tree | Hevea brasiliensis | Hev b 5 | Aero Plant | Hevea Hev b 5 | 151 | 1480457 |
| Para rubber tree | Hevea brasiliensis | Hev b 6 | Aero Plant | Hevea Hev b 6 | 187 | 2832430 |
| Para rubber tree | Hevea brasiliensis | Unassigned | Aero Plant | Hevea Hev b 6 | 43 | 73535415 |
| Para rubber tree | Hevea brasiliensis | Unassigned | Aero Plant | Hevea Hev b 6 | 204 | 158342650 |
| Para rubber tree | Hevea brasiliensis | Hev b 6.01 | Aero Plant | Hevea Hev b 6 | 204 | 168209 |
| Para rubber tree | Hevea brasiliensis | Hev b 7.01 | Aero Plant | Hevea Hev b 7 | 388 | 1916805 |
| Para rubber tree | Hevea brasiliensis | Hev b 7.02 | Aero Plant | Hevea Hev b 7 | 388 | 3087805 |
| Para rubber tree | Hevea brasiliensis | Unassigned | Aero Plant | Hevea Hev b 7 | 388 | 3288200 |
| Para rubber tree | Hevea brasiliensis | Hev b 7 | Aero Plant | Hevea Hev b 7 | 388 | 6707018 |
| Para rubber tree | Hevea brasiliensis | Unassigned | Aero Plant | Hevea Hev b 7 | 387 | 41581137 |
| Para rubber tree | Hevea brasiliensis | Hev b 8.0203 | Aero Plant | Hevea Hev b 8 | 131 | 6979171 |
| Para rubber tree | Hevea brasiliensis | Hev b 8.0101 | Aero Plant | Hevea Hev b 8 | 131 | 3183706 |
| Para rubber tree | Hevea brasiliensis | Hev b 8 | Aero Plant | Hevea Hev b 8 | 131 | 11513601 |
| Para rubber tree | Hevea brasiliensis | Hev b 8.0201 | Aero Plant | Hevea Hev b 8 | 131 | 6979167 |

| Common Name | Species | IUIS Allergen | Type | Group | Protein Length | GI# |
|---|---|---|---|---|---|---|
| Para rubber tree | Hevea brasiliensis | Hev b 8.0202 | Aero Plant | Hevea Hev b 8 | 131 | 6979169 |
| Para rubber tree | Hevea brasiliensis | Hev b 8.0102 | Aero Plant | Hevea Hev b 8 | 131 | 5689740 |
| Para rubber tree | Hevea brasiliensis | Hev b 8.0204 | Aero Plant | Hevea Hev b 8 | 131 | 8919948 |
| Para rubber tree | Hevea brasiliensis | Hev b 9 | Aero Plant | Hevea Hev b 9 | 445 | 9581744 |
| Para rubber tree | Hevea brasiliensis | Unassigned | Aero Plant | Hevea Hev b 9 | 445 | 14423687 |
| Para rubber tree | Hevea brasiliensis subsp brasiliensis | Hev b 11.0102 | Aero Plant | Hevea Hev b 11 | 295 | 27526732 |
| Parasitic fish worm | Anisakis pegreffii | Unassigned | Food Animal | Anisakis Ani s 12 | 264 | 442577845 |
| Parasitic fish worm | Anisakis pegreffii | Unassigned | Food Animal | Anisakis Ani s 12 | 264 | 442577847 |
| parasitic fish worm | Anisakis pegreffii | Unassigned | Food Animal | Anisakis Ani s 12 | 264 | 442577849 |
| Parasitic fish worm | Anisakis pegreffii | Unassigned | Food Animal | Anisakis Ani s 2 paramyosin | 869 | 442577833 |
| Parasitic fish worm | Anisakis simplex | Ani s 1 | Food Animal | Anisakis Ani s 1 protease inhibitor | 194 | 47605452 |
| Parasitic fish worm | Anisakis simplex | Unassigned | Food Animal | Anisakis Ani s 1 protease inhibitor | 163 | 442577863 |
| Parasitic fish worm | Anisakis simplex | Unassigned | Food Animal | Anisakis Ani s 1 protease inhibitor | 163 | 442577865 |
| Parasitic fish worm | Anisakis simplex | Ani s 10.0101 | Food Animal | Anisakis Ani s 10 | 231 | 272574378 |
| Parasitic fish worm | Anisakis simplex | Ani s 11.0101 | Food Animal | Anisakis Ani s 11 | 307 | 323575361 |
| Parasitic fish worm | Anisakis simplex | Unassigned | Food Animal | Anisakis Ani s 11 | 160 | 323575363 |
| Parasitic fish worm | Anisakis simplex | Unassigned | Food Animal | Anisakis Ani s 11 | 287 | 323575365 |
| Parasitic fish worm | Anisakis simplex | Ani s 12.0101 | Food Animal | Anisakis Ani s 12 | 295 | 323575367 |
| Parasitic fish worm | Anisakis simplex | Unassigned | Food Animal | Anisakis Ani s 12 | 264 | 442577851 |
| Parasitic fish worm | Anisakis simplex | Unassigned | Food Animal | Anisakis Ani s 12 | 264 | 442577853 |
| Parasitic fish worm | Anisakis simplex | Unassigned | Food Animal | Anisakis Ani s 12 | 264 | 442577855 |
| Parasitic fish worm | Anisakis simplex | Ani s 2 | Food Animal | Anisakis Ani s 2 paramyosin | 473 | 8453086 |
| Parasitic fish worm | Anisakis simplex | Unassigned | Food Animal | Anisakis Ani s 2 paramyosin | 869 | 42559536 |
| Parasitic fish worm | Anisakis simplex | Ani s 3 | Food Animal | Anisakis Ani s 3 tropomyosin | 284 | 14423976 |
| Parasitic fish worm | Anisakis simplex | Unassigned | Food Animal | Anisakis Ani s 3 tropomyosin | 284 | 350285785 |
| Parasitic fish worm | Anisakis simplex | Ani s 4 | Food Animal | Anisakis Ani s 4 | 14 | 47605398 |
| Parasitic fish worm | Anisakis simplex | Unassigned | Food Animal | Anisakis Ani s 4 | 115 | 110346534 |
| Parasitic fish worm | Anisakis simplex | Ani s 5.0101 | Food Animal | Anisakis Ani s 5 SXP/RAL-2 family protein | 152 | 121308878 |
| Parasitic fish worm | Anisakis simplex | Ani s 7.0101 | Food Animal | Anisakis Ani s 7 UA3-recognized allergen | 1096 | 119524036 |
| Parasitic fish worm | Anisakis simplex | Unassigned | Food Animal | Anisakis Ani s 8 SXP/RAL-2 family protein 2 | 150 | 155676636 |
| Parasitic fish worm | Anisakis simplex | Unassigned | Food Animal | Anisakis Ani s 8 SXP/RAL-2 family protein 2 | 150 | 155676682 |
| Parasitic fish worm | Anisakis simplex | Unassigned | Food Animal | Anisakis Ani s 8 SXP/RAL-2 family protein 2 | 150 | 155676684 |
| Parasitic fish worm | Anisakis simplex | Unassigned | Food Animal | Anisakis Ani s 8 SXP/RAL-2 family protein 2 | 150 | 155676686 |
| Parasitic fish worm | Anisakis simplex | Unassigned | Food Animal | Anisakis Ani s 8 SXP/RAL-2 family protein 2 | 150 | 155676688 |
| Parasitic fish worm | Anisakis simplex | Unassigned | Food Animal | Anisakis Ani s 8 SXP/RAL-2 family protein 2 | 150 | 155676690 |
| Parasitic fish worm | Anisakis simplex | Unassigned | Food Animal | Anisakis Ani s 8 SXP/RAL-2 family protein 2 | 150 | 155676692 |
| Parasitic fish worm | Anisakis simplex | Unassigned | Food Animal | Anisakis Ani s 8 SXP/RAL-2 family protein 2 | 150 | 155676694 |
| Parasitic fish worm | Anisakis simplex | Unassigned | Food Animal | Anisakis Ani s 8 SXP/RAL-2 family protein 2 | 150 | 155676696 |
| Parasitic fish worm | Anisakis simplex | Unassigned | Food Animal | Anisakis Ani s 8 SXP/RAL-2 family protein 2 | 150 | 155676698 |
| Parasitic fish worm | Anisakis simplex | Ani s 9.0101 | Food Animal | Anisakis Ani s 9 | 147 | 157418806 |
| Parasitic fish worm | Anisakis simplex | Unassigned | Food Animal | Anisakis simplex troponin-like | 161 | 6065738 |
| Parasitic fish nematode | Strongyloides stercoralis | Unassigned | Work (parasite) | Strongyloides L3NieAg.01 | 229 | 5669875 |
| Parasitic nematode | Onchocerca volvulus | Unassigned | Worm (parasite) | Onchocerca tropomyosin | 284 | 42559586 |
| Parasitic roundworm | Ascaris lumbricoides | Unassigned | Worm (parasite) | Ascaris Asc s 1 | 134 | 2735096 |
| Parasitic roundworm | Ascaris lumbricoides | Unassigned | Worm (parasite) | Ascaris Asc s 1 | 134 | 2735098 |
| Parasitic roundworm | Ascaris lumbricoides | Unassigned | Worm (parasite) | Ascaris Asc s 1 | 133 | 2735102 |
| Parasitic roundworm | Ascaris lumbricoides | Unassigned | Worm (parasite) | Ascaris Asc s 1 | 133 | 2735106 |
| Parasitic roundworm | Ascaris lumbricoides | Unassigned | Worm (parasite) | Ascaris Asc s 1 | 267 | 2735108 |
| Parasitic roundworm | Ascaris lumbricoides | Unassigned | Worm (parasite) | Ascaris Asc s 1 | 267 | 2735110 |
| Parasitic roundworm | Ascaris lumbricoides | Unassigned | Worm (parasite) | Ascaris Asc s 1 | 267 | 2735112 |
| Parasitic roundworm | Ascaris lumbricoides | Unassigned | Worm (parasite) | Ascaris Asc s 1 | 134 | 2735114 |

-continued

| Common Name | Species | IUIS Allergen | Group | Type | Protein Length | GI# |
|---|---|---|---|---|---|---|
| Parasitic roundworm | Ascaris lumbricoides | Unassigned | Ascaris Asc s 1 | Worm (parasite) | 134 | 2735118 |
| Parasitic roundworm | Ascaris lumbricoides | Unassigned | Ascaris Asc s 1 | Worm (parasite) | 134 | 2735100 |
| Parasitic roundworm | Ascaris lumbricoides | Asc l 3.0101 | Ascaris tropomyosin Asc l 3 | Worm (parasite) | 287 | 224016002 |
| Parasitic roundworm | Ascaris suum | Asc s 1 | Ascaris Asc s 1 | Worm (parasite) | 68 | 299550 |
| Parasitic roundworm | Ascaris suum | Asc s 1 | Ascaris Asc s 1 | Worm (parasite) | 1365 | 77416849 |
| Parasitic roundworm | Ascaris suum | Unassigned | Ascaris Asc s 1 | Worm (parasite) | 134 | 343197079 |
| Parasitic roundworm | Ascaris suum | Asc s 13.0101 | Ascaris lumbricoides/suum Glutathione S- | Worm (parasite) | 206 | 1170109 |
| Patagonian Grenadier | Macruronus magellanicus | Unassigned | Merluccius sp. Parvalbumin Hake | Food Animal | 98 | 308191450 |
| Patagonian Grenadier | Macruronus magellanicus | Unassigned | Merluccius sp. Parvalbumin Hake | Food Animal | 108 | 308191461 |
| Patagonian Grenadier | Macruronus magellanicus | Unassigned | Merluccius sp. Parvalbumin Hake | Food Animal | 74 | 308191474 |
| Pea | Pisum sativum | Pis s 1.0102 | Pisum Pis s 1 | Food Plant | 415 | 42414629 |
| Pea | Pisum sativum | Pis s 1.0101 | Pisum Pis s 1 | Food Plant | 415 | 42414627 |
| Pea | Pisum sativum | Pis s 2.0101 | Pisum Pis s 2 | Food Plant | 613 | 7339551 |
| Peanut | Arachis hypogaea | Unassigned | Arachis Agglutinin (lectin) | Food Plant | 273 | 253289 |
| Peanut | Arachis hypogaea | Ara h 1 | Arachis Ara h 1 | Food Plant | 614 | 1168390 |
| Peanut | Arachis hypogaea | Ara h 1 | Arachis Ara h 1 | Food Plant | 626 | 1168391 |
| Peanut | Arachis hypogaea | Unassigned | Arachis Ara h 1 | Food Plant | 299 | 46560474 |
| Peanut | Arachis hypogaea | Unassigned | Arachis Ara h 1 | Food Plant | 303 | 46560472 |
| Peanut | Arachis hypogaea | Unassigned | Arachis Ara h 1 | Food Plant | 428 | 46560476 |
| Peanut | Arachis hypogaea | Unassigned | Arachis Ara h 1 | Food Plant | 619 | 312233063 |
| Peanut | Arachis hypogaea | Unassigned | Arachis Ara h 1 | Food Plant | 418 | 375332427 |
| Peanut | Arachis hypogaea | Unassigned | Arachis Ara h 1 | Food Plant | 418 | 347447588 |
| Peanut | Arachis hypogaea | Ara h 2.0201 | Arachis Ara h 2 | Food Plant | 172 | 26245447 |
| Peanut | Arachis hypogaea | Ara h 2.0101 | Arachis Ara h 2 | Food Plant | 169 | 31322017 |
| Peanut | Arachis hypogaea | Unassigned | Arachis Ara h 2 | Food Plant | 156 | 15418705 |
| Peanut | Arachis hypogaea | Unassigned | Arachis Ara h 2 | Food Plant | 158 | 224747150 |
| Peanut | Arachis hypogaea | Ara h 3.0101 | Arachis Ara h 3 Glycinin | Food Plant | 507 | 3703107 |
| Peanut | Arachis hypogaea | Ara h 3.0201 | Arachis Ara h 3 Glycinin | Food Plant | 530 | 5712199 |
| Peanut | Arachis hypogaea | Unassigned | Arachis Ara h 3 Glycinin | Food Plant | 538 | 21314465 |
| Peanut | Arachis hypogaea | Unassigned | Arachis Ara h 3 Glycinin | Food Plant | 219 | 22135348 |
| Peanut | Arachis hypogaea | Unassigned | Arachis Ara h 3 Glycinin | Food Plant | 512 | 112380623 |
| Peanut | Arachis hypogaea | Unassigned | Arachis Ara h 3 Glycinin | Food Plant | 530 | 199732457 |
| Peanut | Arachis hypogaea | Unassigned | Arachis Ara h 3 Glycinin | Food Plant | 510 | 224036293 |
| Peanut | Arachis hypogaea | Unassigned | Arachis Ara h 3 Glycinin | Food Plant | 512 | 312233065 |
| Peanut | Arachis hypogaea | Ara h 5 | Arachis Ara h 5 | Food Plant | 131 | 5902968 |
| Peanut | Arachis hypogaea | Unassigned | Arachis Ara h 5 | Food Plant | 131 | 284810529 |
| Peanut | Arachis hypogaea | Ara h 6 | Arachis Ara h 6 | Food Plant | 131 | 431812555 |
| Peanut | Arachis hypogaea | Unassigned | Arachis Ara h 6 | Food Plant | 129 | 5923742 |
| Peanut | Arachis hypogaea | Unassigned | Arachis Ara h 6 | Food Plant | 144 | 17225991 |
| Peanut | Arachis hypogaea | Unassigned | Arachis Ara h 6 | Food Plant | 127 | 159163254 |
| Peanut | Arachis hypogaea | Unassigned | Arachis Ara h 6 | Food Plant | 145 | 75114094 |
| Peanut | Arachis hypogaea | Ara h 7.0101 | Arachis Ara h 7 | Food Plant | 160 | 5931948 |
| Peanut | Arachis hypogaea | Ara h 7.0201 | Arachis Ara h 7 | Food Plant | 164 | 158121995 |
| Peanut | Arachis hypogaea | Ara h 8.0101 | Arachis Ara h 8 | Food Plant | 157 | 37499626 |
| Peanut | Arachis hypogaea | Ara h 8.0201 | Arachis Ara h 8 | Food Plant | 153 | 145904610 |
| Peanut | Arachis hypogaea | Unassigned | Arachis Ara h 8 | Food Plant | 157 | 169786740 |
| Peanut | Arachis hypogaea | Unassigned | Arachis Ara h 8 | Food Plant | 157 | 110676574 |
| Peanut | Arachis hypogaea | Ara h 9.0101 | Arachis Ara h 9 LTP isoallergens | Food Plant | 116 | 161087230 |
| Peanut | Arachis hypogaea | Ara h 9.0201 | Arachis Ara h 9 LTP isoallergens | Food Plant | 92 | 161610580 |
| Pear | Pyrus communis | Pyr c 3.0101 | Pyrus LTP Pyr c 3 IUIS | Food Plant | 115 | 6715524 |
| Pear | Pyrus communis | Unassigned | Pyrus LTP Pyr c 3 IUIS | Food Plant | 94 | 355525862 |

| Common Name | Species | IUIS Allergen | Type | Group | Protein Length | GI# |
|---|---|---|---|---|---|---|
| Pear | Pyrus communis | Unassigned | Food Plant | Pyrus LTP Pyr c 3 IUIS | 94 | 355525860 |
| Pear | Pyrus communis | Unassigned | Food Plant | Pyrus LTP Pyr c 3 IUIS | 94 | 355525856 |
| Pear | Pyrus communis | Pyr c 1.0101 | Food Plant | Pyrus Pyr c 1 | 159 | 14423877 |
| Pear | Pyrus communis | Pyr c 4 | Food Plant | Pyrus Pyr c 4 | 131 | 4761580 |
| Pear | Pyrus communis | Pyr c 5 | Food Plant | Pyrus Pyr c 5 | 308 | 3243234 |
| Pecan | Carya illinoinensis | Car i 1.0101 | Food Plant | Carya Car i 1 Seed storage protein | 143 | 28207731 |
| Pecan | Carya illinoinensis | Car i 4.0101 | Food Plant | Carya Car i 4 11s legumin | 505 | 158998780 |
| Pecan | Carya illinoinensis | Unassigned | Food Plant | Carya Car i 4 11s legumin | 505 | 158998782 |
| Penicillin | | | Chemical | | | |
| Perennial ryegrass | Lolium perenne | Lol p 1 | Aero Plant | Lolium Lol p 1 | 263 | 126385 |
| Perennial ryegrass | Lolium perenne | Lol p 1.0102 | Aero Plant | Lolium Lol p 1 | 252 | 168314 |
| Perennial ryegrass | Lolium perenne | Lol p 1.0101 | Aero Plant | Lolium Lol p 1 | 263 | 168316 |
| Perennial ryegrass | Lolium perenne | Lol p 1.0103 | Aero Plant | Lolium Lol p 1 | 263 | 6599300 |
| Perennial ryegrass | Lolium perenne | Lol p 11 | Aero Plant | Lolium Lol p 11 | 134 | 47605808 |
| Perennial ryegrass | Lolium perenne | Lol p 2.0101 | Aero Plant | Lolium Lol p 2 | 97 | 126386 |
| Perennial ryegrass | Lolium perenne | Lol p 2 | Aero Plant | Lolium Lol p 2 | 88 | 939932 |
| Perennial ryegrass | Lolium perenne | Lol p 3 | Aero Plant | Lolium Lol p 3 | 97 | 126387 |
| Perennial ryegrass | Lolium perenne | Lol p 4.0101 | Aero Plant | Lolium Lol p 4 | 423 | 55859464 |
| Perennial ryegrass | Lolium perenne | Lol p 5 | Aero Plant | Lolium Lol p 5 | 301 | 4416516 |
| Perennial ryegrass | Lolium perenne | Lol p 5 | Aero Plant | Lolium Lol p 5 | 301 | 6634467 |
| Perennial ryegrass | Lolium perenne | Lol p 5.0101 | Aero Plant | Lolium Lol p 5 | 339 | 455288 |
| Perennial ryegrass | Lolium perenne | Lol p 5.0102 | Aero Plant | Lolium Lol p 5 | 307 | 332278195 |
| Photographic developers | | | Chemical | | | |
| Pig | Sus scrofa | Unassigned | Aero animal | Sus Porcine Pepsin | 385 | 118572685 |
| Pigweed | Chenopodium album | Che a 1 | Aero Plant | Chenopodium Che a 1 | 168 | 22074346 |
| Pigweed | Chenopodium album | Che a 2 | Aero Plant | Chenopodium Che a 2 | 131 | 29465666 |
| Pigweed | Chenopodium album | Unassigned | Aero Plant | Chenopodium Che a 2 | 133 | 238886048 |
| Pigweed | Chenopodium album | Che a 3 | Aero Plant | Chenopodium Che a 3 | 86 | 29465668 |
| Pine moth | Thaumetopoea pityocampa | Tha p 1.0101 | Contact | Thaumetopoea Tha p 1 full length | 126 | 301030229 |
| Pine moth | Thaumetopoea pityocampa | Tha p 2.0101 | Contact | Thaumetopoea Tha p 2 | 115 | 408387552 |
| Pineapple | Ananas comosus | Ana c 2.0101 | Aero Plant | Ananas Ana c 2 Bromelain precursor | 351 | 75277440 |
| Pineapple | Ananas comosus | Ana c 1.0101 | Food Plant | Ananas profilin | 131 | 75306610 |
| Pistachio | Pistacia vera | Unassigned | Food Plant | Pistacia 11S globulin | 472 | 156001070 |
| Pistachio | Pistacia vera | Pis v 2.0101 | Food Plant | Pistacia 11S globulin | 496 | 110349083 |
| Pistachio | Pistacia vera | Pis v 2.0201 | Food Plant | Pistacia 11S globulin | 472 | 110349085 |
| Pistachio | Pistacia vera | Pis v 1.0101 | Food Plant | Pistacia Pis v 1 2S albumin | 149 | 110349081 |
| Pistachio | Pistacia vera | Pis v 3.0101 | Food Plant | Pistacia Pis v 3 vicilin | 519 | 133711974 |
| Pistachio | Pistacia vera | Pis v 4.0101 | Food Plant | Pistacia Pis v 4 | 230 | 149786150 |
| Plum | Prunus domestica | Pru d 3 | Food Plant | Prunus Pru 3 | 91 | 9297015 |
| Pomegranate | Punica granatum | Pun g 1.0101 | Food Plant | Punica Pun g 1 | 120 | 559797767 |
| Pomegranate | Punica granatum | Pun g 1.0201 | Food Plant | Punica Pun g 1 | 120 | 559797765 |
| Pomegranate | Punica granatum | Pun g 1.0301 | Food Plant | Punica Pun g 1 | 120 | 559797763 |
| Potato | Solanum tuberosum | Unassigned | Food Plant | Solanum profilin-like | 131 | 77416979 |
| Potato | Solanum tuberosum | Unassigned | Food Plant | Solanum profilin-like | 131 | 77999277 |
| Potato | Solanum tuberosum | Unassigned | Food Plant | Solanum Sola t 1 | 386 | 21510 |
| Potato | Solanum tuberosum | Unassigned | Food Plant | Solanum Sola t 1 | 386 | 21512 |
| Potato | Solanum tuberosum | Unassigned | Food Plant | Solanum Sola t 1 | 386 | 21514 |
| Potato | Solanum tuberosum | Unassigned | Food Plant | Solanum Sola t 1 | 386 | 169500 |
| Potato | Solanum tuberosum | Sola t 1 | Food Plant | Solanum Sola t 1 | 386 | 158517845 |
| Potato | Solanum tuberosum | Sola t 2 | Food Plant | Solanum Sola t 2 | 188 | 124148 |
| Potato | Solanum tuberosum | Sola t 3 | Food Plant | Solanum Sola t 3 | 222 | 20141344 |

| Common Name | Species | IUIS Allergen | Type | Group | Protein Length | GI# |
|---|---|---|---|---|---|---|
| Potato | Solanum tuberosum | Sola t 3.0101 | Food Plant | Solanum Sola t 3 | 186 | 1575306 |
| Potato | Solanum tuberosum | Sola t 4.0101 | Food Plant | Solanum Sola t 4 | 221 | 994779 |
| Privet | Ligustrum vulgare | Lig v 1.0101 | Aero Plant | Ligustrum Lig v 1 | 145 | 3256210 |
| Privet | Ligustrum vulgare | Lig v 1.0102 | Aero Plant | Ligustrum Lig v 1 | 145 | 3256212 |
| rainbow trout | Oncorhynchus mykiss | Onc m 1.0101 | Food Animal | Oncorhynchus Rainbow trout parv Onc m 1 | 108 | 288559139 |
| rainbow trout | Oncorhynchus mykiss | Onc m 1.0201 | Food Animal | Oncorhynchus Rainbow trout parv Onc m 1 | 107 | 288559140 |
| Rape | Brassica napus | Unassigned | Aero Plant | Bra n Bra r 2 | 83 | 2129801 |
| Rape | Brassica napus | Unassigned | Aero Plant | Bra n Bra r 2 | 83 | 2129802 |
| Rape | Brassica napus | Bra n 1 | Food Plant | Bra n 1 | 125 | 75107016 |
| Rape | Brassica napus | Unassigned | Food Plant | Brassica napus 2S albumin | 109 | 26985163 |
| Raspberry | Rubus idaeus | Rub i 1.0101 | Food Plant | Rubus Rub i 1 | 137 | 110180525 |
| Raspberry | Rubus idaeus | Rub i 3.0101 | Food Plant | Rubus Rub i 3 | 117 | 110180523 |
| Rat | Rattus norvegicus | Rat n 1 | Aero Animal | Rattus Rat n 1 | 181 | 127533 |
| Rat | Rattus norvegicus | Rat n 1 | Aero Animal | Rattus Rat n 1 | 181 | 81890324 |
| Rat | Rattus norvegicus | Rat n 1.0101 | Aero Animal | Rattus Rat n 1 | 177 | 204261 |
| Red Fire Ant | Solenopsis invicta | Sol i 4 | Venom or | Solenopsis Sol g 4 Sol i 4 | 137 | 4038411 |
| Red Fire Ant | Solenopsis invicta | Sol i 4.0101 | Venom or | Solenopsis Sol g 4 Sol i 4 | 137 | 4038409 |
| Red Fire Ant | Solenopsis invicta | Unassigned | Venom or | Solenopsis Sol i 1 | 58 | 1336809 |
| Red Fire Ant | Solenopsis invicta | Unassigned | Venom or | Solenopsis Sol i 1 | 25 | 1336811 |
| Red Fire Ant | Solenopsis invicta | Unassigned | Venom or | Solenopsis Sol i 1 | 26 | 1336812 |
| Red Fire Ant | Solenopsis invicta | Unassigned | Venom or | Solenopsis Sol i 1 | 26 | 1336813 |
| Red Fire Ant | Solenopsis invicta | Sol i 1.0101 | Venom or | Solenopsis Sol i 1 | 346 | 51093373 |
| Red Fire Ant | Solenopsis invicta | Sol i 2.0101 | Venom or | Solenopsis Sol i and Sol r Venom allergen II | 138 | 549179 |
| Red Fire Ant | Solenopsis invicta | Sol i 3.0101 | Venom or | Solenopsis Venom allergen III | 234 | 2293571 |
| Red cedar | Juniperus virginiana | Unassigned | Aero Plant | Juniperus Jun a 3 | 110 | 51316532 |
| Red cedar | Juniperus virginiana | Jun v 1.0101 | Aero Plant | Juniperus Jun a/v 1 | 367 | 8843917 |
| Red cedar | Juniperus virginiana | Jun v 1.0102 | Aero Plant | Juniperus Jun a/v 1 | 367 | 8843921 |
| red squid | Ommastrephes bartramii | Unassigned | Food Animal | Ommastrephes tropomyosin | 284 | 83715934 |
| red swamp crayfish | Procambarus clarkii | Unassigned | Food Animal | Procambarus red crayfish arginine kinase | 357 | 375298901 |
| red swamp crayfish | Procambarus clarkii | Unassigned | Food Animal | Procambarus tropomyosin | 284 | 225348412 |
| Rice | Oryza sativa | Ory s 1.0101 | Aero Plant | Oryza Ory s 1 | 263 | 1173557 |
| Rice | Oryza sativa | Ory s 1 | Aero Plant | Oryza Ory s 1 | 267 | 8118439 |
| Rice | Oryza sativa | Unassigned | Aero Plant | Oryza Ory s 1 | 267 | 109913547 |
| Rice | Oryza sativa (japonica cultivar-group) | Unassigned | Aero Plant | Oryza putative polcalcin Phl p 7 | 82 | 45736119 |
| Rice | Oryza sativa | Unassigned | Food Plant | Oryza Glyoxalase I | 291 | 84029333 |
| Rice | Oryza sativa | Unassigned | Food Plant | Oryza Glyoxalase I | 291 | 16580747 |
| Rice | Oryza sativa (japonica cultivar-group) | Unassigned | Food Plant | Oryza Trypsin alpha-amylase inhibitor | 157 | 23616954 |
| Rice | Oryza sativa (japonica cultivar-group) | Unassigned | Food Plant | Oryza Trypsin alpha-amylase inhibitor | 165 | 218193 |
| Rice | Oryza sativa (japonica cultivar-group) | Unassigned | Food Plant | Oryza Trypsin alpha-amylase inhibitor | 157 | 218197 |
| Rice | Oryza sativa (japonica cultivar-group) | Unassigned | Food Plant | Oryza Trypsin alpha-amylase inhibitor | 111 | 1304216 |
| Rice | Oryza sativa (japonica cultivar-group) | Unassigned | Food Plant | Oryza Trypsin alpha-amylase inhibitor | 109 | 1304217 |
| Rice | Oryza sativa (japonica cultivar-group) | Unassigned | Food Plant | Oryza Trypsin alpha-amylase inhibitor | 113 | 1304218 |
| Rice | Oryza sativa (japonica cultivar-group) | Unassigned | Food Plant | Oryza Trypsin alpha-amylase inhibitor | 166 | 1398913 |
| Rice | Oryza sativa (japonica cultivar-group) | Unassigned | Food Plant | Oryza Trypsin alpha-amylase inhibitor | 160 | 1398915 |
| Rice | Oryza sativa (japonica cultivar-group) | Unassigned | Food Plant | Oryza Trypsin alpha-amylase inhibitor | 157 | 1398916 |
| Rice | Oryza sativa (japonica cultivar-group) | Unassigned | Food Plant | Oryza Trypsin alpha-amylase inhibitor | 160 | 1398918 |
| Rice | Oryza sativa (japonica cultivar-group) | Unassigned | Food Plant | Oryza Trypsin alpha-amylase inhibitor | 157 | 2827316 |
| Rice | Oryza sativa (japonica cultivar-group) | Unassigned | Food Plant | Oryza Trypsin alpha-amylase inhibitor | 166 | 114152865 |
| Rice | Oryza sativa (japonica cultivar-group) | Unassigned | Food Plant | Oryza Trypsin alpha-amylase inhibitor | 163 | 114152864 |
| Rice | Oryza sativa (japonica cultivar-group) | Unassigned | Food Plant | Oryza Trypsin alpha-amylase inhibitor | 160 | 23495787 |
| Rice | Oryza sativa (japonica cultivar-group) | Unassigned | Food Plant | Oryza Trypsin alpha-amylase inhibitor | 160 | 23616947 |

| Common Name | Species | IUIS Allergen | Type | Group | Protein Length | GI# |
|---|---|---|---|---|---|---|
| Rye | Secale cereale | Unassigned | Aero Plant | Secale Sec c 4 | 520 | 55859456 |
| Rye | Secale cereale | Unassigned | Aero Plant | Secale Sec c 4 | 518 | 55859454 |
| Rye | Secale cereale | Unassigned | Aero Plant | Secale Sec c 5 | 16 | 75140047 |
| Rye | Secale cereale | Sec c 5.0101 | Aero Plant | Secale Sec c 5 | 292 | 332205751 |
| Rye | Secale cereale | Sec c 20.0101 | Food Plant | Secale Sec c 20 | 23 | 1699225 |
| Rye | Secale cereale | Sec c 20.0201 | Food Plant | Secale Sec c 20 | 29 | 1699228 |
| Rye | Secale cereale | Sec c 38.0101 | Food Plant | Secale Sec c 38.01 | 26 | 994865 |
| Saffron crocus | Crocus sativus | Cro s 2.0101 | Aero Plant | Crocus profilin Cro s 2 | 131 | 58700651 |
| Salmon | Salmo salar | Sal s 1 | Food Animal | Salmo Sal s 1 | 108 | 18281421 |
| Salmon | Salmo salar | Unassigned | Food Animal | Salmo Sal s 1 | 109 | 209734468 |
| Salmon | Salmo salar | Sal s 1.0101 | Food Animal | Salmo Sal s 1 | 109 | 1322183 |
| Salmon | Salmo salar | Unassigned | Food Animal | Salmo Sal s 2 enolase | 432 | 385145180 |
| Salmon | Salmo salar | Sal s 2.0101 | Food Anima | Salmo Sal s 2 enolase | 434 | 197632415 |
| Salmon | Salmo salar | Unassigned | Food Animal | Salmo Sal s 3 aldolase | 363 | 385145176 |
| Salmon | Salmo salar | Sal s 3.0101 | Food Animal | Salmo Sal s 3 aldolase | 363 | 213511774 |
| Sapodilla plum | Manilkara zapota | Unassigned | Food Plant | Manilkara Thaumatin like protein 1 | 12 | 442580988 |
| Sapodilla plum | Manilkara zapota | Unassigned | Food Plant | Manilkara Thaumatin like protein 1 | 9 | 442570282 |
| Sapodilla plum | Manilkara zapota | Unassigned | Food Plant | Manilkara Thaumatin like protein 1 | 207 | 663434113 |
| Scabies mite | Sarcoptes scabiei type suis | Unassigned | Aero mite | Sarcoptes Apolipoprotein Ssag1.2 | 310 | 507480520 |
| Scabies mite | Sarcoptes scabiei type hominis | Unassigned | Venom or | Sarcoptes Apolipoprotein Ssag1.2 | 330 | 27462848 |
| Scabies mite | Sarcoptes scabiei type hominis | Unassigned | Venom or | Sarcoptes cysteine protease CO8 | 340 | 46406002 |
| Scabies mite | Sarcoptes scabiei type hominis | Unassigned | Venom or | Sarcoptes cysteine proteases FO4 | 338 | 46406012 |
| Scabies mite | Sarcoptes scabiei type hominis | Unassigned | Venom or | Sarcoptes cysteine proteases FO4 | 339 | 46406014 |
| Scabies mite | Sarcoptes scabiei type hominis | Unassigned | Venom or | Sarcoptes cysteine proteases FO4 | 273 | 46406016 |
| Scabies mite | Sarcoptes scabiei type hominis | Unassigned | Venom or | Sarcoptes Glutathione S-transferase Mu | 219 | 27462836 |
| Scabies mite | Sarcoptes scabiei type hominis | Unassigned | Venom or | Sarcoptes Glutathione S-transferase Mu | 219 | 60920770 |
| Schistosoma | Schistosoma japonicum | Unassigned | Protozoan | Schistosoma profilin | 129 | 29841461 |
| Schistosoma | Schistosoma japonicum | Unassigned | Protozoan | Schistosoma tegumental antigen | 191 | 2739154 |
| Semen | | | | | | |
| Sesame | Sesamum indicum | Ses i 1 | Food Plant | Sesamum Ses i 1 | 153 | 13183175 |
| Sesame | Sesamum indicum | Unassigned | Food Plant | Sesamum Ses i 1 | 153 | 209165427 |
| Sesame | Sesamum indicum | Ses i 2 | Food Plant | Sesamum Ses i 2 | 148 | 5381323 |
| Sesame | Sesamum indicum | Ses i 3 | Food Plant | Sesamum Ses i 3 | 585 | 13183177 |
| Sesame | Sesamum indicum | Ses i 4.0101 | Food Plant | Sesamum Ses i 4 oleosin | 166 | 10834827 |
| Sesame | Sesamum indicum | Unassigned | Food Plant | Sesamum Ses i 5 oleosin | 145 | 198250343 |
| Sesame | Sesamum indicum | Ses i 5.0101 | Food Plant | Sesamum Ses i 5 oleosin | 145 | 5381321 |
| Sesame | Sesamum indicum | Ses i 6.0101 | Food Plant | Sesamum Ses i 6 | 459 | 5381325 |
| Sesame | Sesamum indicum | Ses i 7.0101 | Food Plant | Sesamum Ses i 7 | 497 | 13183173 |
| Shaggy mane | Coprinus comatus | Cop c 1 | Food Fungi | Coprinus Cop c 1 | 81 | 4538529 |
| Shallow-water cape hake | Merluccius capensis | Unassigned | Food Animal | Merluccius sp. Parvalbumin Hake | 108 | 308191466 |
| Short ragweed | Ambrosia artemisiifolia | Amb a 1.0101 | Aero Plant | Ambrosia Amb a 1 | 396 | 113475 |
| Short ragweed | Ambrosia artemisiifolia | Amb a 1.0201 | Aero Plant | Ambrosia Amb a 1 | 398 | 113476 |
| Short ragweed | Ambrosia artemisiifolia | Amb a 1.0301 | Aero Plant | Ambrosia Amb a 1 | 397 | 113477 |
| Short ragweed | Ambrosia artemisiifolia | Amb a 1.0401 | Aero Plant | Ambrosia Amb a 1 | 392 | 113478 |
| Short ragweed | Ambrosia artemisiifolia | Amb a 1.0303 | Aero Plant | Ambrosia Amb a 1 | 397 | 16443 |
| Short ragweed | Ambrosia artemisiifolia | Unassigned | Aero Plant | Ambrosia Amb a 1 | 396 | 302127810 |
| Short ragweed | Ambrosia artemisiifolia | Amb a 1.0202 | Aero Plant | Ambrosia Amb a 1 | 398 | 302127812 |
| Short ragweed | Ambrosia artemisiifolia | Amb a 1.0304 | Aero Plant | Ambrosia Amb a 1 | 397 | 302127814 |
| Short ragweed | Ambrosia artemisiifolia | Amb a 1.0305 | Aero Plant | Ambrosia Amb a 1 | 397 | 302127816 |
| Short ragweed | Ambrosia artemisiifolia | Unassigned | Aero Plant | Ambrosia Amb a 1 | 397 | 302127818 |
| Short ragweed | Ambrosia artemisiifolia | Unassigned | Aero Plant | Ambrosia Amb a 1 | 397 | 302127820 |

| Common Name | Species | IUIS Allergen | Type | Group | Protein Length | GI# |
|---|---|---|---|---|---|---|
| Short ragweed | Ambrosia artemisiifolia | Unassigned | Aero Plant | Ambrosia Amb a 1 | 397 | 302127822 |
| Short ragweed | Ambrosia artemisiifolia | Amb a 1.0402 | Aero Plant | Ambrosia Amb a 1 | 387 | 302127824 |
| Short ragweed | Ambrosia artemisiifolia | Unassigned | Aero Plant | Ambrosia Amb a 1 | 397 | 302127826 |
| Short ragweed | Ambrosia artemisiifolia | Amb a 1.0502 | Aero Plant | Ambrosia Amb a 1 | 397 | 302127828 |
| Short ragweed | Ambrosia artemisiifolia | Amb a 10.0101 | Aero Plant | Ambrosia Amb a 10 | 160 | 62249491 |
| Short ragweed | Ambrosia artemisiifolia | Amb a 2 | Aero Plant | Ambrosia Amb a 2 | 397 | 113479 |
| Short ragweed | Ambrosia artemisiifolia | Unassigned | Aero Plant | Ambrosia Amb a 4 | 164 | 285005079 |
| Short ragweed | Ambrosia artemisiifolia | Amb a 4.0101 | Aero Plant | Ambrosia Amb a 4 | 164 | 291197394 |
| Short ragweed | Ambrosia artemisiifolia | Unassigned | Aero Plant | Ambrosia Amb a 4 | 111 | 291482306 |
| Short ragweed | Ambrosia artemisiifolia | Unassigned | Aero Plant | Ambrosia Amb a 4 | 140 | 291482308 |
| Short ragweed | Ambrosia artemisiifolia | Unassigned | Aero Plant | Ambrosia Amb a 4 | 134 | 291482310 |
| Short ragweed | Ambrosia artemisiifolia | Unassigned | Aero Plant | Ambrosia Amb a 4 | 96 | 291482314 |
| Short ragweed | Ambrosia artemisiifolia | Unassigned | Aero Plant | Ambrosia Amb a 4 | 110 | 291482316 |
| Short ragweed | Ambrosia artemisiifolia | Unassigned | Aero Plant | Ambrosia Amb a 4 | 116 | 291482318 |
| Short ragweed | Ambrosia artemisiifolia | Amb a 6 | Aero Plant | Ambrosia Amb a 6 | 118 | 14285595 |
| Short ragweed | Ambrosia artemisiifolia | Unassigned | Aero Plant | Ambrosia Amb a 8 profilin | 133 | 34851182 |
| Short ragweed | Ambrosia artemisiifolia | Amb a 8.0101 | Aero Plant | Ambrosia Amb a 8 profilin | 131 | 34851180 |
| Short ragweed | Ambrosia artemisiifolia | Amb a 8.0102 | Aero Plant | Ambrosia Amb a 8 profilin | 131 | 34851178 |
| Short ragweed | Ambrosia artemisiifolia | Unassigned | Aero Plant | Ambrosia Amb a 8 profilin | 133 | 62249502 |
| Short ragweed | Ambrosia artemisiifolia | Amb a 9.0101 | Aero Plant | Ambrosia Amb a 9 | 133 | 62249512 |
| Short ragweed | Ambrosia artemisiifolia | Amb a 9.0102 | Aero Plant | Ambrosia Amb a 9 | 83 | 62249470 |
| Short ragweed | Ambrosia artemisiifolia | Unassigned | Aero Plant | Ambrosia Amb a 9 | 83 | 62249481 |
| Short ragweed | Ambrosia artemisiifolia (elatior) | Amb a 3 | Aero Plant | Ambrosia Amb a 3 | 101 | 416636 |
| Short ragweed | Ambrosia artemisiifolia (elatior) | Amb a 5 | Aero Plant | Ambrosia Amb a 5 Ra5 | 45 | 114090 |
| Shrimp | Crangon crangon | Cra c 1.0101 | Food Animal | Crangon Cra c 1 tropomyosin | 284 | 238477263 |
| Shrimp | Crangon crangon | Cra c 2.0101 | Food Animal | Crangon Cra c 2 arginine kinase | 356 | 238477265 |
| Shrimp | Crangon crangon | Cra c 4.0101 | Food Animal | rangon Cra c 4 sarcoplasmic calcium- binding prot | 193 | 238477327 |
| Shrimp | Crangon crangon | Cra c 5.0101 | Food Animal | Crangon Cra c 5 myosin light chain | 153 | 238477331 |
| Shrimp | Crangon crangon | Cra c 6.0101 | Food Animal | Crangon Cra c 6 troponin C | 150 | 238477333 |
| Shrimp | Crangon crangon | Cra c 8.0101 | Food Animal | Crangon Cra c 8 triosephosphate isomerase | 249 | 238477329 |
| Silkworm | Bombyx mori | Bomb m 1.0101 | Aero Insect | Bombyx Bomb m 1 | 355 | 82658675 |
| Silver hake | Merluccius bilinearis | Unassigned | Food Animal | Merluccius sp. Parvalbumin Hake | 108 | 308191465 |
| Silver hake | Merluccius bilinearis | Unassigned | Food Animal | Merluccius sp. Parvalbumin Hake | 108 | 308191478 |
| Silver hake | Merluccius bilinearis | Unassigned | Food Animal | Merluccius sp. Parvalbumin Hake | 94 | 308191488 |
| Silverfish | Lepisma saccharina | Lep s 1 | Aero Insect | Lepisma Tropomyosin | 284 | 2038027 |
| Silverfish | Lepisma saccharina | Unassigned | Aero Insect | Lepisma Tropomyosin | 243 | 2038702 |
| Smokybrown cockroach | Periplaneta fuliginosa | Unassigned | Aero Insect | Periplaneta Per 7 | 284 | 19310971 |
| Snow Crab | Chionoecetes opilio | Unassigned | Food Animal | Chionoecetes tropomyosin | 284 | 308191588 |
| South American Pilchard | Sardinops sagax | Sar sa 1.0101 | Food animal | Sardinops Sar sa 1 parvalbumin | 109 | 193247972 |
| southern hake | Merluccius australis australis | Unassigned | Food Animal | Merluccius sp. Parvalbumin Hake | 108 | 308191452 |
| southern hake | Merluccius australis polylepis | Unassigned | Food Animal | Merluccius sp. Parvalbumin Hake | 108 | 308191453 |
| southern hake | Merluccius australis polylepis | Unassigned | Food Animal | Merluccius sp. Parvalbumin Hake | 108 | 308191464 |
| Southern Pacific hake | Merluccius gayi | Unassigned | Food Animal | Merluccius sp. Parvalbumin Hake | 108 | 308191455 |
| Southern Pacific hake | Merluccius gayi | Unassigned | Food Animal | Merluccius sp. Parvalbumin Hake | 91 | 308191489 |
| Soybean | Glycine max | Gly m 1.0101 | Food Plant | Glycine Gly m 1 | 80 | 123506 |
| Soybean | Glycine max | Gly m 3.0102 | Food Plant | Glycine Gly m 3 | 131 | 3021373 |
| Soybean | Glycine max | Unassigned | Food Plant | Glycine Gly m 3 | 131 | 156938901 |
| Soybean | Glycine max | Gly m 3.0101 | Food Plant | Glycine Gly m 3 | 131 | 3021375 |
| Soybean | Glycine max | Gly m 4 | Food Plant | Glycine Gly m 4 | 158 | 18744 |
| Soybean | Glycine max | Unassigned | Food Plant | Glycine Gly m 5.0101 alpha subunit beta cong1 | 605 | 18536 |
| Soybean | Glycine max | Unassigned | Food Plant | Glycine Gly m 5.0101 alpha subunit beta cong1 | 218 | 169927 |

| Common Name | Species | IUIS Allergen | Type | Group | Protein Length | GI# |
|---|---|---|---|---|---|---|
| Soybean | Glycine max | Gly m 5.0101 | Food Plant | Glycine Gly m 5.0101 alpha subunit beta congl | 543 | 9967357 |
| Soybean | Glycine max | Unassigned | Food Plant | Glycine Gly m 5.0201 alpha prime beta congl | 639 | 169929 |
| Soybean | Glycine max | Gly m 5.0201 | Food Plant | Glycine Gly m 5.0201 alpha prime beta congl | 621 | 15425631 |
| Soybean | Glycine max | Unassigned | Food Plant | Glycine Gly m 5.0201 alpha prime beta congl | 559 | 9967361 |
| Soybean | Glycine max | Gly m 5.0301 | Food Plant | Glycine Gly m 5.0301 beta sub unit beta congl | 439 | 15425637 |
| Soybean | Glycine max | Unassigned | Food Plant | Glycine Gly m 5.0301 beta sub unit beta congl | 439 | 121282 |
| Soybean | Glycine max | Gly m 6.0101 | Food Plant | Glycine Gly m 6.0101 | 495 | 18615 |
| Soybean | Glycine max | Unassigned | Food Plant | Glycine Gly m 6.0101 | 495 | 169973 |
| Soybean | Glycine max | Gly m 6.0201 | Food Plant | Glycine Gly m 6.0201 | 485 | 18609 |
| Soybean | Glycine max | Unassigned | Food Plant | Glycine Gly m 6.0201 | 485 | 218265 |
| Soybean | Glycine max | Gly m 6.0301 | Food Plant | Glycine Gly m 6.0301 | 481 | 18639 |
| Soybean | Glycine max | Unassigned | Food Plant | Glycine Gly m 6.0301 | 562 | 18641 |
| Soybean | Glycine max | Gly m 6.0401 | Food Plant | Glycine Gly m 6.0401 | 563 | 732706 |
| Soybean | Glycine max | Unassigned | Food Plant | Glycine Gly m 6.0401 | 516 | 4249568 |
| Soybean | Glycine max | Gly m 6.0501 | Food Plant | Glycine Gly m 6.0501 | 240 | 169969 |
| Soybean | Glycine max | Unassigned | Food Plant | Glycine Gly m 6.0501 | 517 | 169971 |
| Soybean | Glycine max | Unassigned | Food Plant | Glycine Gly m 8 2s albumin | 155 | 10566449 |
| Soybean | Glycine max | Gly m 8.0101 | Food Plant | Glycine Gly m 8 2s albumin | 158 | 4097894 |
| Soybean | Glycine max | Unassigned | Food Plant | Glycine Gly m Bd 28K | 373 | 351727517 |
| Soybean | Glycine max | Unassigned | Food Plant | Glycine Gly m Bd 28K | 373 | 187766751 |
| Soybean | Glycine max | Unassigned | Food Plant | Glycine Gly m Bd 28K | 373 | 187766749 |
| Soybean | Glycine max | Unassigned | Food Plant | Glycine Gly m Bd 28K | 455 | 187766747 |
| Soybean | Glycine max | Unassigned | Food Plant | Glycine Gly m Bd 28K | 476 | 187766755 |
| Soybean | Glycine max | Unassigned | Food Plant | Glycine Gly m Bd 30 kDa | 379 | 410067729 |
| Soybean | Glycine max | Unassigned | Food Plant | Glycine Gly m Bd 30 kDa | 379 | 129353 |
| Soybean | Glycine max | Unassigned | Food Plant | Glycine Gly m Bd 30 kDa | 379 | 1199563 |
| Soybean | Glycine max | Unassigned | Food Plant | Glycine Major Gly 50 kDa allergen | 17 | 3097321 |
| Soybean | Glycine max | Unassigned | Food Plant | Glycine Trypsin inhibitor | 217 | 85681057 |
| Soybean | Glycine max | Unassigned | Food Plant | Glycine Trypsin inhibitor | 217 | 18770 |
| Soybean | Glycine max | Unassigned | Food Plant | Glycine Trypsin inhibitor | 216 | 18772 |
| Soybean | Glycine max | Unassigned | Food Plant | Glycine Trypsin inhibitor | 203 | 256429 |
| Soybean | Glycine max | Unassigned | Food Plant | Glycine Trypsin inhibitor | 204 | 256635 |
| Soybean | Glycine max | Unassigned | Food Plant | Glycine Gly m 6.0401 | 208 | 256636 |
| Soybean | Glycine soja | Unassigned | Food Plant | Glycine Gly m 6.0401 | 563 | 510515 |
| Storage mite | Glycyphagus domesticus | Gly d 2.0101 | Aero Mite | Glycyphagus Gly d 2 | 128 | 806556 |
| Storage mite | Glycyphagus domesticus | Gly d 2.0201 | Aero Mite | Glycyphagus Gly d 2 | 125 | 6179520 |
| Storage mite | Glycyphagus domesticus | Unassigned | Aero Mite | Glycyphagus Gly d 2 | 141 | 7160811 |
| Storage mite | Lepidoglyphus destructor | Unassigned | Aero Mite | Blomia Blo t 12 | 143 | 33772588 |
| Storage mite | Lepidoglyphus destructor | Lep d 10.0101 | Aero Mite | Lepidoglyphus Lep d 10 | 284 | 33943777 |
| Storage mite | Lepidoglyphus destructor | Lep d 13.0101 | Aero Mite | Lepidoglyphus Lep d 13 | 131 | 6900304 |
| Storage mite | Lepidoglyphus destructor | Lep d 2.0102 | Aero Mite | Lepidoglyphus Lep d 2 | 141 | 6523380 |
| Storage mite | Lepidoglyphus destructor | Lep d 2.0202 | Aero Mite | Lepidoglyphus Lep d 2 | 141 | 21213898 |
| Storage mite | Lepidoglyphus destructor | Lep d 2 | Aero Mite | Lepidoglyphus Lep d 2 | 141 | 21213900 |
| Storage mite | Lepidoglyphus destructor | Lep d 2 | Aero Mite | Lepidoglyphus Lep d 2 | 141 | 1582223 |
| Storage mite | Lepidoglyphus destructor | Unassigned | Aero Mite | Lepidoglyphus Lep d 2 | 141 | 1582222 |
| Storage mite | Lepidoglyphus destructor | Unassigned | Aero Mite | Lepidoglyphus Lep d 2 | 141 | 34495274 |
| Storage mite | Lepidoglyphus destructor | Unassigned | Aero Mite | Lepidoglyphus Lep d 2 | 141 | 34495278 |
| Storage mite | Lepidoglyphus destructor | Unassigned | Aero Mite | Lepidoglyphus Lep d 2 | 140 | 34495280 |
| Storage mite | Lepidoglyphus destructor | Unassigned | Aero Mite | Lepidoglyphus Lep d 2 | 141 | 34495282 |
| Storage mite | Lepidoglyphus destructor | Unassigned | Aero Mite | Lepidoglyphus Lep d 2 | 141 | 34495284 |
| Storage mite | Lepidoglyphus destructor | Unassigned | Aero Mite | Lepidoglyphus Lep d 2 | 141 | 34495286 |

| Common Name | Species | IUIS Allergen | Type | Group | Protein Length | GI# |
|---|---|---|---|---|---|---|
| Storage mite | Lepidoglyphus destructor | Unassigned | Aero Mite | Lepidoglyphus Lep d 2 | 141 | 34495288 |
| Storage mite | Lepidoglyphus destructor | Unassigned | Aero Mite | Lepidoglyphus Lep d 2 | 141 | 34495290 |
| Storage mite | Lepidoglyphus destructor | Lep d 2.0101 | Aero Mite | Lepidoglyphus Lep d 2 | 98 | 587450 |
| Storage mite | Lepidoglyphus destructor | Lep d 2.0201 | Aero Mite | Lepidoglyphus Lep d 2 | 141 | 999458 |
| Storage mite | Lepidoglyphus destructor | Lep d 5.0102 | Aero Mite | Lepidoglyphus Lep d 5 | 171 | 34495292 |
| Storage mite | Lepidoglyphus destructor | Lep d 5.0103 | Aero Mite | Lepidoglyphus Lep d 5 | 169 | 34495294 |
| Storage mite | Lepidoglyphus destructor | Lep d 5.0101 | Aero Mite | Lepidoglyphus Lep d 5 | 110 | 6523378 |
| Storage mite | Lepidoglyphus destructor | Lep d 7.0101 | Aero Mite | Lepidoglyphus Lep d 7 | 216 | 6706282 |
| Strawberry | Fragaria x ananassa | Fra a 1 | Food Plant | Fragaria Fra a 1 | 160 | 90185692 |
| Strawberry | Fragaria x ananassa | Fra a 1 | Food Plant | Fragaria Fra a 1 | 159 | 90185688 |
| Strawberry | Fragaria x ananassa | Fra a 1 | Food Plant | Fragaria Fra a 1 | 160 | 90185684 |
| Strawberry | Fragaria x ananassa | Fra a 1 | Food Plant | Fragaria Fra a 1 | 160 | 90185682 |
| Strawberry | Fragaria x ananassa | Fra a 1 | Food Plant | Fragaria Fra a 1 | 162 | 88082485 |
| Strawberry | Fragaria x ananassa | Unassigned | Food Plant | Fragaria Fra a 1 | 162 | 550544407 |
| Strawberry | Fragaria x ananassa | Fra a 3.0101 | Food Plant | Fragaria Fra a 3 | 117 | 18477856 |
| Strawberry | Fragaria x ananassa | Fra a 3.0102 | Food Plant | Fragaria Fra a 3 | 117 | 67937767 |
| Strawberry | Fragaria x ananassa | Fra a 3.0201 | Food Plant | Fragaria Fra a 3 | 117 | 67937765 |
| Strawberry | Fragaria x ananassa | Fra a 3.0202 | Food Plant | Fragaria Fra a 3 | 117 | 67937773 |
| Sulfites | | | Food | | | |
| Sulfonamides | | | Chemical | | | |
| Sunflower | Helianthus annuus | Hel a 2 | Aero Plant | Helianthus Hel a 2 | 133 | 3581965 |
| Sunflower | Helianthus annuus | Hel a 3.0101 | Food Plant | Helianthus Hel a 3 | 116 | 31324341 |
| Sunflower | Helianthus annuus | Unassigned | Food Plant | Helianthus Seed 2S albumin | 141 | 112745 |
| Sweet vernal grass | Anthoxanthum odoratum | Ant o 1.0101 | Aero Plant | Anthoxanthum Ant o 1 | 26 | 320607 |
| Sweet vernal grass | Anthoxanthum odoratum | Unassigned | Aero Plant | Anthoxanthum Ant o 1 | 32 | 75139986 |
| Sweet vernal grass | Anthoxanthum odoratum | Unassigned | Aero Plant | Anthoxanthum Ant o 1 | 32 | 75139990 |
| Swordfish | Xiphias gladius | Xip g 1.0101 | Food Animal | Xiphias Xip g 1 beta-parvalbumin | 109 | 222352960 |
| Tall fescue | Schedonorus arundinaceus | Unassigned | Aero Plant | Festuca group 1 allergen | 35 | 75139991 |
| Tall fescue | Schedonorus arundinaceus | Unassigned | Aero Plant | Festuca group 1 allergen | 17 | 320610 |
| Tall fescue | Schedonorus arundinaceus | Unassigned | Aero Plant | Festuca group 1 allergen | 20 | 320611 |
| Tartrazine | | | Food | | | |
| Tegretol | | | Chemical | | | |
| Tetracycline | | | Chemical | | | |
| Thistle | Salsola kali | Sal k 1.0302 | Aero Plant | Salsola pectin methylesterase Sal k 1.01 & 1.02 | 339 | 59895728 |
| Thistle | Salsola kali | Sal k 1.0301 | Aero Plant | Salsola pectin methylesterase Sal k 1.01 & 1.02 | 339 | 59895730 |
| Thistle | Salsola kali | Unassigned | Aero Plant | Salsola pectin methylesterase Sal k 1.01 & 1.02 | 339 | 225810597 |
| Thistle | Salsola kali | Sal k 1.0101 | Aero Plant | Salsola Sal k 1 | 42 | 25090947 |
| Thistle | Salsola kali | Unassigned | Aero Plant | Salsola Sal k 3 pollen allergen | 757 | 225810599 |
| Thistle | Salsola kali | Sal k 4.0101 | Aero Plant | Salsola Sal k 4 profilin | 133 | 239916566 |
| Thistle | Salsola kali | Unassigned | Aero Plant | Salsola Sal k 4 profilin | 133 | 589912885 |
| Thistle | Salsola kali | Sal k 4.0201 | Aero Plant | Salsola Sal k 4 profilin | 133 | 300490499 |
| Thistle | Salsola kali | Sal k 5.0101 | Aero Plant | Salsola Sal k 5 | 151 | 300490501 |
| Thistle | Salsola kali | Sal k 1.0201 | Aero Plant | Salsola pectin methylesterase Sal k 1.01 & 1.02 | 362 | 51242679 |
| Tobacco | Nicotiana tabacum | Unassigned | Aero Plant | Nicotiana villin | 520 | 57283139 |
| Tobacco | Nicotiana tabacum | Unassigned | Aero Plant | Nicotiana villin | 559 | 57283137 |
| Tomato | lanum lycopersicum (Lycopersicon esculentu | Lyc e 1 | Food Plant | Solanum Sola l 1 profilin (Lyc e 1) | 131 | 16555787 |
| Tomato | lanum lycopersicum (Lycopersicon esculentu | Lyc e 1 | Food Plant | Solanum Sola l 1 profilin (Lyc e 1) | 131 | 17224229 |
| Tomato | lanum lycopersicum (Lycopersicon esculentu | Sola l 2.0101 | Food Plant | Solanum Sola l 2 Beta-fructofuranosidase (Lyc e 2) | 553 | 18542113 |
| Tomato | lanum lycopersicum (Lycopersicon esculentu | Sola l 2.0201 | Food Plant | Solanum Sola l 2 Beta-fructofuranosidase (Lyc e 2) | 636 | 18542115 |

| Common Name | Species | IUIS Allergen | Type | Group | Protein Length | GI# |
|---|---|---|---|---|---|---|
| Tomato | lanum lycopersicum (Lycopersicon esculentu | Unassigned | Food Plant | Solanum Sola l 3 LTP (Lyc e 3) | 114 | 71360928 |
| Tomato | lanum lycopersicum (Lycopersicon esculentu | Sola l 3.0101 | Food Plant | Solanum Sola l 3 LTP (Lyc e 3) | 114 | 1816535 |
| Tomato | lanum lycopersicum (Lycopersicon esculentu | Sola l 4.0101 | Food Plant | Solanum Sola l 4 PR-10 (Lyc e 4) | 178 | 2887310 |
| Tomato | lanum lycopersicum (Lycopersicon esculentu | Sola l 4.0201 | Food Plant | Solanum Sola l 4 PR-10 (Lyc e 4) | 160 | 565380268 |
| Tomato | lanum lycopersicum (Lycopersicon esculentu | Unassigned | Food Plant | Solanum Sola l 4 PR-10 (Lyc e 4) | 160 | 565380238 |
| Tropical Fire Ant | Solenopsis geminata | Sol g 4.0101 | Venom or | Solenopsis Sol g 4 Sol i 4 | 137 | 7638028 |
| Tropical Fire Ant | Solenopsis geminata | Sol g 4.0201 | Venom or | Solenopsis Sol g 4 Sol i 4 | 137 | 7638030 |
| Trumpet lily | Lilium longiflorum | Unassigned | Aero Plant | Lilium polygalacturonase | 413 | 73913442 |
| Tsetse fly | Glossina morsitans morsitans | Unassigned | Venom or | Glossina Glo m 5 | 258 | 289740263 |
| Tsetse fly | Glossina morsitans morsitans | Unassigned | Venom or | Glossina Glo m 5 | 259 | 289742475 |
| Tsetse fly | Glossina morsitans morsitans | Unassigned | Venom or | Glossina Glo m 5 | 222 | 289742483 |
| Tsetse fly | Glossina morsitans morsitans | Glo m 5.0101 | Venom or | Glossina Glo m 5 | 259 | 8927462 |
| Turnip | Brassica rapa | Unassigned | Aero Plant | Bra n Bra r 2 | 80 | 2129805 |
| Turnip | Brassica rapa subsp rapa | Unassigned | Aero Plant | Bra n Bra r 2 | 83 | 59800146 |
| Turnip | Brassica rapa subsp rapa | Bra r 2.0101 | Contact | Brassica Bra r 2 | 91 | 32363456 |
| Turnip | Brassica rapa | Bra r 1.0101 | Food Plant | Brassica Bra r 1 | 178 | 17697 |
| Velvet grass | Holcus lanatus | Hol l 1.0101 | Aero Plant | Brassica Calcim binding protein Group I | 79 | 1255540 |
| Velvet grass | Holcus lanatus | Hol l 1.0102 | Aero Plant | Holcus Hol l 1 | 265 | 414703 |
| Velvet grass | Holcus lanatus | Unassigned | Aero Plant | Holcus Hol l 1 | 248 | 1167836 |
| Velvet grass | Holcus lanatus | Unassigned | Aero Plant | Holcus Hol l 1 | 263 | 3860384 |
| Velvet grass | Holcus lanatus | Hol l 5.0201 | Aero Plant | Holcus Hol l 5 | 20 | 75140046 |
| Velvet grass | Holcus lanatus | Hol l 5.0101 | Aero Plant | Holcus Hol l 5 | 240 | 2266623 |
| Velvet grass | Holcus lanatus | Unassigned | Aero Plant | Holcus Hol l 5 | 264 | 2266625 |
| Wasp | Vespa mandarinia | Vesp m 5.0101 | Venom or | Holcus Hol l 5 | 296 | 11991229 |
| Wasp | Vespa flavopilosa | Ves f 5.0101 | Venom or | Vespa Vesp c 5 | 202 | 6136165 |
| Wasp | Vespula germanica | Unassigned | Venom or | Vespula Ves f 5 | 204 | 549189 |
| Wasp | Vespula germanica | Ves g 5.0101 | Venom or | Vespula Phospholipase A1- Ves m/v 1 | 300 | 74035843 |
| Wasp | Vespula germanica | Unassigned | Venom or | Vespula Ves f 5 | 204 | 549190 |
| Wasp | Vespula germanica | Unassigned | Venom or | Vespula Ves f 5 | 204 | 74035841 |
| Wasp | Vespula maculifrons | Ves m 1.0101 | Venom or | Vespula Ves v 2 | 331 | 116174180 |
| Wasp | Vespula maculifrons | Ves m 5.0101 | Venom or | Vespula Ves v 2 | 323 | 116174182 |
| Wasp | Vespula maculifrons | Unassigned | Venom or | Vespula Phospholipase A1- Ves m/v 1 | 300 | 1709545 |
| Wasp | Vespula maculifrons | Unassigned | Venom or | Vespula Ves f 5 | 204 | 549191 |
| Wasp | Vespula pensylvanica | Ves p 5.0101 | Venom or | Vespula Ves m 2 Hyaluronidase | 227 | 85681830 |
| Wasp | Vespula squamosa | Ves s 5.0101 | Venom or | Vespula Ves m 2 Hyaluronidase | 31 | 313118253 |
| Wasp | Vespula squamosa | Unassigned | Venom or | Vespula Ves f 5 | 204 | 549192 |
| Wasp | Vespula vidua | Ves vi 5.0101 | Venom or | Vespula Ves f 5 | 205 | 549193 |
| Wasp | Vespula vulgaris | Ves v 1.0101 | Venom or | Vespula Ves s 1 phospholipase | 298 | 313471398 |
| Wasp | Vespula vulgaris | Ves v 5.0101 | Venom or | Vespula Ves f 5 | 206 | 549194 |
| Wasp | Vespula vulgaris | Ves v 5 | Venom or | Vespula Phospholipase A1- Ves m/v 1 | 336 | 897647 |
| Wasp | Vespula vulgaris | Ves v 5 | Venom or | Vespula Ves v 2 | 227 | 162551 |
| Wasp | Vespula vulgaris | Ves v 2 | Venom or | Vespula Ves v 2 | 204 | 4826574 |
| Wasp | Vespula vulgaris | Ves v 2.0101 | Venom or | Vespula Ves v 2 | 209 | 11514279 |
| Wasp | Vespula vulgaris | Unassigned | Venom or | Vespula Ves v 2 | 331 | 1346323 |
| Wasp | Vespula vulgaris | Ves v 3.0101 | Venom or | Vespula Ves v 3 dipeptidylpeptidase IV | 340 | 62147665 |
| Wasp | Polybia paulista | Unassigned | Food Plant | Polybia p hyaluronidase | 331 | 109157163 |
| Wasp | Polybia paulista | Unassigned | Food Plant | Polybia p hyaluronidase | 776 | 167782086 |
| Wasp | Polybia paulista | Unassigned | Food Plant | Polybia Ves v 3 dipeptidylpeptidase IV | 345 | 302201583 |
| Wasp | Polybia paulista | Unassigned | Food Plant | Polybia p venom allergen 5 | 288 | 302425085 |
| Wasp | Polybia paulista | Unassigned | Food Plant | Polybia p venom allergen 5 | 141 | 290792375 |
| Wasp | Polybia paulista | Unassigned | Food Plant | Polybia p venom allergen 5 | 207 | 302595972 |

| Common Name | Species | IUIS Allergen | Type | Group | Protein Length | GI# |
|---|---|---|---|---|---|---|
| Wasp | Polybia paulista | Pol p 1.0101 | Food Plant | Polybia Pol p 1.0101 phospholipase | 322 | 166216292 |
| Wasp | Polybia paulista | Unassigned | Food Plant | Polybia Pol p 1.0101 phospholipase | 302 | 315190620 |
| Weed | Parietaria judaica | Par j 1 | Aero Plant | Parietaria Par j 1 | 143 | 741844 |
| Weed | Parietaria judaica | Par j 1.0102 | Aero Plant | Parietaria Par j 1 | 176 | 1532058 |
| Weed | Parietaria judaica | Par j 1.0101 | Aero Plant | Parietaria Par j 1 | 133 | 992612 |
| Weed | Parietaria judaica | Par j 1.0103 | Aero Plant | Parietaria Par j 1 | 139 | 95007033 |
| Weed | Parietaria judaica | Par j 1.0201 | Aero Plant | Parietaria Par j 1 | 138 | 706811 |
| Weed | Parietaria judaica | Par j 2.0102 | Aero Plant | Parietaria Par j 2 | 133 | 1532056 |
| Weed | Parietaria judaica | Par j 2.0101 | Aero Plant | Parietaria Par j 2 | 133 | 2497750 |
| Weed | Parietaria judaica | Par j 3.0102 | Aero Plant | Parietaria Par j 3 profilin | 131 | 14423869 |
| Weed | Parietaria judaica | Par j 3.0101 | Aero Plant | Parietaria Par j 3 profilin | 132 | 14423876 |
| Weed | Parietaria judaica | Par j 3.0201 | Aero Plant | Parietaria Par j 3 profilin | 131 | 444175753 |
| Weed | Parietaria judaica | Par j 4.0101 | Aero Plant | Parietaria Par j 4 | 84 | 201071363 |
| Weed | Parietaria officinalis | Par o 1 | Aero Plant | Parietaria Par o 1 | 12 | 75139847 |
| Weed | Parietaria officinalis | Par o 1 | Aero Plant | Parietaria Par o 1 | 17 | 1311509 |
| Weed | Parietaria officinalis | Par o 1 | Aero Plant | Parietaria Par o 1 | 15 | 1311510 |
| Weed | Parietaria officinalis | Par o 1 | Aero Plant | Parietaria Par o 1 | 15 | 1311511 |
| Weed | Parietaria officinalis | Par o 1 | Aero Plant | Parietaria Par o 1 | 15 | 1311512 |
| Weed | Parietaria officinalis | Par o 1 | Aero Plant | Parietaria Par o 1 | 30 | 1311513 |
| Weed | Parietaria officinalis | Par o 1 | Aero Plant | Parietaria Par o 1 | 24 | 1836011 |
| Weed | Parietaria officinalis | Par o 1 | Aero Plant | Parietaria Par o 1 | 25 | 1836010 |
| Western conenose | Triatoma protracta | Tria p 1 | Venom or | Triatoma Tria p 1 | 169 | 15426413 |
| Western ragweed | Ambrosia psilostachya | Amb p 5.0101 | Aero Plant | Ambrosia Amb a 5 Ra5 | 77 | 515953 |
| Western ragweed | Ambrosia psilostachya | Unassigned | Aero Plant | Ambrosia Amb a 5 Ra5 | 77 | 515954 |
| Western ragweed | Ambrosia psilostachya | Amb p 5.0201 | Aero Plant | Ambrosia Amb a 5 Ra5 | 77 | 515955 |
| Western ragweed | Ambrosia psilostachya | Unassigned | Aero Plant | Ambrosia Amb a 5 Ra5 | 77 | 515956 |
| Western ragweed | Ambrosia psilostachya | Unassigned | Aero Plant | Ambrosia Amb a 5 Ra5 | 77 | 515957 |
| Wheat | Triticum aestivum | Unassigned | Aero Plant | Triticum Tri a 14 LTP_amylase inhibitor | 113 | 417370 |
| Wheat | Triticum aestivum | Unassigned | Aero Plant | Triticum Bakers asthma allergen #4 | 27 | 3913017 |
| Wheat | Triticum aestivum | Tri a 29.0101 | Aero Plant | Triticum flour Glutathione Transferase | 222 | 190684057 |
| Wheat | Triticum aestivum | Tri a 29.0201 | Aero Plant | Triticum Tri a 29 | 120 | 253783731 |
| Wheat | Triticum aestivum | Unassigned | Aero Plant | Triticum Tri a 29 | 120 | 283465827 |
| Wheat | Triticum aestivum | Tri a 32.0101 | Aero Plant | Triticum Tri a 32 Peroxiredoxin | 218 | 190684059 |
| Wheat | Triticum aestivum | Unassigned | Aero Plant | Triticum Tri a 32 Peroxiredoxin | 218 | 75324900 |
| Wheat | Triticum aestivum | Unassigned | Aero Plant | Triticum Tri a 39 serine proteinase inhibitor-lik | 84 | 154101366 |
| Wheat | Triticum aestivum | Tri a 39.0101 | Aero Plant | Triticum Tri a 39 serine proteinase inhibitor-lik | 84 | 122065237 |
| Wheat | Triticum aestivum | Unassigned | Aero Plant | Triticum Tri a 39 serine proteinase inhibitor-lik | 84 | 403213259 |
| Wheat | Triticum aestivum | Unassigned | Gliadin | Triticum alpha/beta gliadin | 307 | 21673 |
| Wheat | Triticum aestivum | Unassigned | Gliadin | Triticum alpha/beta gliadin | 296 | 21757 |
| Wheat | Triticum aestivum | Unassigned | Gliadin | Triticum alpha/beta gliadin | 286 | 21761 |
| Wheat | Triticum aestivum | Unassigned | Gliadin | Triticum alpha/beta gliadin | 313 | 21765 |
| Wheat | Triticum aestivum | Unassigned | Gliadin | Triticum alpha/beta gliadin | 318 | 170710 |
| Wheat | Triticum aestivum | Unassigned | Gliadin | Triticum alpha/beta gliadin | 291 | 170712 |
| Wheat | Triticum aestivum | Unassigned | Gliadin | Triticum alpha/beta gliadin | 313 | 170718 |
| Wheat | Triticum aestivum | Unassigned | Gliadin | Triticum alpha/beta gliadin | 286 | 170720 |
| Wheat | Triticum aestivum | Unassigned | Gliadin | Triticum alpha/beta gliadin | 262 | 170722 |
| Wheat | Triticum aestivum | Unassigned | Gliadin | Triticum alpha/beta gliadin | 297 | 170724 |
| Wheat | Triticum aestivum | Unassigned | Gliadin | Triticum alpha/beta gliadin | 282 | 170726 |
| Wheat | Triticum aestivum | Unassigned | Gliadin | Triticum alpha/beta gliadin | 186 | 170728 |
| Wheat | Triticum aestivum | Unassigned | Gliadin | Triticum alpha/beta gliadin | 259 | 1304264 |
| Wheat | Triticum aestivum | Unassigned | Gliadin | Triticum omega-5 gliadin Tri a 19 | 366 | 508732623 |

-continued

| Common Name | Species | IUIS Allergen | Type | Group | Protein Length | GI# |
|---|---|---|---|---|---|---|
| Wheat | Triticum aestivum | Tri a 12.0101 | Gliadin | Triticum Tri a 12 | 131 | 548948848 |
| Wheat | Triticum aestivum | Tri a 12.0102 | Gliadin | Triticum Tri a 12 | 131 | 548948850 |
| Wheat | Triticum aestivum | Tri a 12.0104 | Gliadin | Triticum Tri a 12 | 131 | 207366248 |
| Wheat | Triticum aestivum | Tri a 15.0101 | Gliadin | Triticum Tri a 15 | 121 | 283465829 |
| Wheat | Triticum aestivum | Unassigned | Gliadin | Triticum Tri a 20 | 302 | 170702 |
| Wheat | Triticum aestivum | Unassigned | Gliadin | Triticum Tri a 20 | 291 | 170708 |
| Wheat | Triticum aestivum | Unassigned | Gliadin | Triticum Tri a 20 | 251 | 170736 |
| Wheat | Triticum aestivum | Unassigned | Gliadin | Triticum Tri a 20 | 327 | 170738 |
| Wheat | Triticum aestivum | Unassigned | Gliadin | Triticum Tri a 20 | 279 | 1063270 |
| Wheat | Triticum aestivum | Tri a 20.0101 | Gliadin | Triticum Tri a 20 | 285 | 62484809 |
| Wheat | Triticum aestivum | Tri a 21.0101 | Gliadin | Triticum Tri a 21 alpha, beta-gliadin | 279 | 508732621 |
| Wheat | Triticum aestivum | Tri a 25.0101 | Gliadin | Triticum Tri a 25 | 281 | 283476402 |
| Wheat | Triticum aestivum | Unassigned | Gliadin | Triticum Tri a 25 | 125 | 8980491 |
| Wheat | Triticum aestivum | Tri a 26.0101 | Gliadin | Triticum Tri a 26 | 794 | 508732625 |
| Wheat | Triticum aestivum | Tri a 26.0201 | Gliadin | Triticum Tri a 26 | 848 | 288860106 |
| Wheat | Triticum aestivum | Tri a 28.0101 | Gliadin | Triticum Tri a 26 | 795 | 71084277 |
| Wheat | Triticum aestivum | Tri a 33.0101 | Gliadin | Triticum Tri a 28 | 119 | 66841026 |
| Wheat | Triticum aestivum | Tri a 34.0101 | Gliadin | Triticum Tri a 33 Serine protease inhibitor | 398 | 5734506 |
| Wheat | Triticum aestivum | Unassigned | Gliadin | Triticum Tri a 34 GAPDH | 337 | 253783729 |
| Wheat | Triticum aestivum | Unassigned | Gliadin | Triticum Tri a 36 | 304 | 170730 |
| Wheat | Triticum aestivum | Unassigned | Gliadin | Triticum Tri a 36 | 323 | 170732 |
| Wheat | Triticum aestivum | Unassigned | Gliadin | Triticum Tri a 36 | 244 | 170734 |
| Wheat | Triticum aestivum | Unassigned | Gliadin | Triticum Tri a 36 | 283 | 508732627 |
| Wheat | Triticum aestivum | Unassigned | Food Plant | Triticum 5a2 protein | 94 | 66840998 |
| Wheat | Triticum aestivum | Unassigned | Food Plant | Triticum aAI CM16_17 | 143 | 21711 |
| Wheat | Triticum aestivum | Unassigned | Food Plant | Triticum alpha/beta gliadin | 286 | 21755 |
| Wheat | Triticum aestivum | Tri a 19.0101 | Food Plant | Triticum omega-5 gliadin Tri a 19 | 439 | 73912496 |
| Wheat | Triticum aestivum | Unassigned | Food Plant | Triticum omega-5 gliadin Tri a 19 | 359 | 208605344 |
| Wheat | Triticum aestivum | Unassigned | Food Plant | Triticum omega-5 gliadin Tri a 19 | 272 | 21779 |
| Wheat | Triticum aestivum | Unassigned | Food Plant | Triticum omega-5 gliadin Tri a 19 | 346 | 208605346 |
| Wheat | Triticum aestivum | Unassigned | Food Plant | Triticum putative leucine-rich repeat protein | 137 | 208605348 |
| Wheat | Triticum aestivum | Unassigned | Food Plant | Triticum serine carboxypeptidase II | 260 | 66840996 |
| Wheat | Triticum aestivum | Unassigned | Food Plant | Triticum serine carboxypeptidase II | 444 | 66840994 |
| Wheat | Triticum aestivum | Unassigned | Food Plant | Triticum Thaumatin-like | 173 | 125987805 |
| Wheat | Triticum aestivum | Unassigned | Food Plant | Triticum Tri a 12 | 131 | 190684061 |
| Wheat | Triticum aestivum | Tri a 12.0103 | Food Plant | Triticum Tri a 12 | 131 | 548948852 |
| Wheat | Triticum aestivum | Unassigned | Food Plant | Triticum Tri a 26 | 830 | 21743 |
| Wheat | Triticum aestivum | Unassigned | Food Plant | Triticum Tri a 26 | 648 | 21751 |
| Wheat | Triticum aestivum | Unassigned | Food Plant | Triticum Tri a 26 | 660 | 21779 |
| Wheat | Triticum aestivum | Unassigned | Food Plant | Triticum Tri a 26 | 39 | 21793 |
| Wheat | Triticum aestivum | Unassigned | Food Plant | Triticum Tri a 26 | 705 | 22090 |
| Wheat | Triticum aestivum | Unassigned | Food Plant | Triticum Tri a 26 | 815 | 170743 |
| Wheat | Triticum aestivum | Unassigned | Food Plant | Triticum Tri a 26 | 838 | 736319 |
| Wheat | Triticum aestivum | Unassigned | Food Plant | Triticum Tri a 29 | 101 | 897811 |
| Wheat | Triticum aestivum | Unassigned | Food Plant | Triticum Tri a 29 | 145 | 21701 |
| Wheat | Triticum aestivum | Tri a 30.0101 | Food Plant | Triticum Tri a 30 | 168 | 21713 |
| Wheat | Triticum aestivum | Tri a 31.0101 | Food Plant | Triticum Tri a 31 | 253 | 11124572 |
| Wheat | Triticum aestivum | Unassigned | Food Plant | Triticum Tri a 33 Serine protease inhibitor | 399 | 1885350 |
| Wheat | Triticum aestivum | Unassigned | Food Plant | Triticum Tri a 36 | 307 | 21773 |
| Wheat | Triticum aestivum | Unassigned | Food Plant | Triticum Tri a 36 | 356 | 21783 |
| Wheat | Triticum aestivum | Unassigned | Food Plant | Triticum Tri a 36 | 373 | 75317968 |

-continued

| Common Name | Species | IUIS Allergen | Type | Group | Protein Length | GI# |
|---|---|---|---|---|---|---|
| Wheat | Triticum aestivum | Unassigned | Food Plant | Triticum Tri a 36 | 229 | 886963 |
| Wheat | Triticum aestivum | Unassigned | Food Plant | Triticum Tri a 36 | 261 | 886965 |
| Wheat | Triticum aestivum | Unassigned | Food Plant | Triticum Tri a 36 | 276 | 886967 |
| Wheat | Triticum aestivum | Unassigned | Food Plant | Triticum Tri a 36 | 285 | 75219081 |
| Wheat | Triticum aestivum | Unassigned | Food Plant | Triticum Tri a 36 | 326 | 62550933 |
| Wheat | Triticum aestivum | Tri a 36.0101 | Food Plant | Triticum Tri a 36 | 369 | 335331566 |
| Wheat | Triticum aestivum | Tri a 37.0101 | Food Plant | Triticum Tri a 37 alpha purothionin | 137 | 4007850 |
| Wheat | Triticum turgidum subsp durum | Unassigned | Food Plant | Triticum Tri a 36 | 295 | 21926 |
| Wheat | Triticum turgidum subsp durum | Unassigned | Food Plant | Triticum Tri a 36 | 285 | 21930 |
| Wheat | Triticum urartu | Unassigned | Food Plant | Triticum alpha/beta gliadin | 296 | 170740 |
| Wheat | Triticum aestivum | Unassigned | Food Plant | Triticum Tri a 27.0101 Thiol reductase | 203 | 30793446 |
| Wheat | Triticum turgidum subsp durum | Unassigned | Food Plant | Triticum aAI CM16_17 | 143 | 21916 |
| Wheat | Triticum turgidum subsp durum | Unassigned | Food Plant | Triticum Tri a 29 | 145 | 21920 |
| white lupine | Lupinus albus | Unassigned | Food Plant | Lupinus albus congluten beta | 531 | 89994190 |
| White Mulberry | Morus alba var. atropurpurea | Unassigned | Food Plant | Morus winter accumulating protein | 157 | 610664572 |
| White mustard | Sinapis alba | Sin a 1 | Food Plant | Sinapis Sin a 1.01 | 145 | 1009434 |
| White mustard | Sinapis alba | Sin a 1 | Food Plant | Sinapis Sin a 1.01 | 145 | 1009436 |
| White mustard | Sinapis alba | Sin a 1 | Food Plant | Sinapis Sin a 1.01 | 145 | 1009438 |
| White mustard | Sinapis alba | Sin a 1 | Food Plant | Sinapis Sin a 1.01 | 145 | 1009440 |
| White mustard | Sinapis alba | Sin a 1 | Food Plant | Sinapis Sin a 1.01 | 145 | 1009442 |
| White mustard | Sinapis alba | Sin a 1.0101 | Food Plant | Sinapis Sin a 1.01 | 145 | 51338758 |
| White mustard | Sinapis alba | Sin a 2.0101 | Food Plant | Sinapis Sin a 2.01 11S globulin | 510 | 62240390 |
| White mustard | Sinapis alba | Unassigned | Food Plant | Sinapis Sin a 2.01 11S globulin | 523 | 62240392 |
| White mustard | Sinapis alba | Sin a 3.0101 | Food Plant | Sinapis Sin a 3.01 LTP | 92 | 156778059 |
| White mustard | Sinapis alba | Sin a 4.0101 | Food Plant | Sinapis Sin a 4.01 profilin | 131 | 156778061 |
| Whiteface hornet | Dolichovespula maculata | Dol m 1.02 | Venom or | Dolichovespula Dol m 1 Phospholipase A1B | 303 | 1709542 |
| Whiteface hornet | Dolichovespula maculata | Dol m 1.0101 | Venom or | Dolichovespula Dol m 1 Phospholipase A1B | 317 | 288917 |
| Whiteface hornet | Dolichovespula maculata | Dol m 2.0101 | Venom or | Dolichovespula Dol m 2 Hyaluronidase | 331 | 511604 |
| Whiteface hornet | Dolichovespula maculata | Dol m 5.0101 | Venom or | Dolichovespula Venom allergen 5 | 227 | 156715 |
| Whiteface hornet | Dolichovespula maculata | Dol m 5.02 | Venom or | Dolichovespula Venom allergen 5 | 212 | 552080 |
| Whiteleg Shrimp | Litopenaeus vannamei | Lit v 4.0101 | Food Animal | Litopenaeus Lit v 4 sarcoplasmic Ca+ binding | 193 | 223403273 |
| Whiteleg Shrimp | Litopenaeus vannamei | Lit v 1.0101 | Food Animal | Litopenaeus Lit v 1 tropomyosin | 284 | 170791252 |
| Whiteleg Shrimp | Litopenaeus vannamei | Lit v 2.0101 | Food Animal | Litopenaeus Lit v 2 | 356 | 115492980 |
| Whiteleg Shrimp | Litopenaeus vannamei | Lit v 3.0101 | Food Anima | Litopenaeus Lit v 3 myosin | 177 | 184198734 |
| Wild Kiwi | Actinidia eriantha | Unassigned | Food Plant | Actinidia eriantha kiwellin | 213 | 441482356 |
| Wild Kiwi | Actinidia eriantha | Unassigned | Food Plant | Actinidia eriantha kiwellin | 213 | 441482358 |
| Wild Kiwi | Actinidia eriantha | Unassigned | Food Plant | Actinidia eriantha kiwellin | 213 | 441482360 |
| wolfberry | Lycium barbarum | Unassigned | Food Plant | Lycium ltp | 51 | 363805423 |
| Wrinked Neptune | Neptunea polycostata | Unassigned | Food Animal | Neptunea tropomyosin | 284 | 219806590 |
| Yak | Bos grunniens mutus | Bos d 11.0101 | Food Animal | Bos Bos d 11 beta casein | 224 | 555980347 |
| Yeast | Candida albicans | Cand a 1.0101 | Contact | Candida Cand a 1 Alcohol dehydrogenase | 350 | 608690 |
| Yeast | Candida albicans | Cand a 3.0101 | Contact | Candida Cand a 3 Peroxysomal protein | 236 | 37548637 |
| Yeast | Candida albicans | Unassigned | Contact | Candida Enolase 1 | 440 | 232054 |
| Yeast | Malassezia furfur | Mala f 2 | Contact | Malassezia Mala f 2 | 177 | 3445490 |
| Yeast | Malassezia furfur | Mala f 3 | Contact | Malassezia Mala f 3 | 166 | 3445492 |
| Yeast | Malassezia furfur | Mala f 4 | Contact | Malassezia Mala f 4 | 342 | 4587985 |
| Yeast | Malassezia sympodialis | Mala s 1 | Contact | Malassezia Mala s 1 | 350 | 1261972 |
| Yeast | Malassezia sympodialis | Mala s 10.0101 | Contact | Malassezia Mala s 10 heat shock protein | 773 | 28564467 |
| Yeast | Malassezia sympodialis | Mala s 11 | Contact | Malassezia Mala s 11 first 38 aa signal | 237 | 28569698 |
| Yeast | Malassezia sympodialis | Mala s 12.0101 | Contact | Malassezia Mala s 12 | 618 | 78038796 |
| Yeast | Malassezia sympodialis | Mala s 5 | Contact | Malassezia Mala s 5 | 172 | 4138171 |

| Common Name | Species | IUIS Allergen | Type | Group | Protein Length | GI# |
|---|---|---|---|---|---|---|
| Yeast | Malassezia sympodialis | Mala s 6 | Contact | Malassezia Mala s 6 | 162 | 4138173 |
| Yeast | Malassezia sympodialis | Mala s 7 | Contact | Malassezia Mala s 7 | 187 | 4138175 |
| Yeast | Malassezia sympodialis | Mala s 8 | Contact | Malassezia Mala s 8 | 179 | 7271239 |
| Yeast | Malassezia sympodialis | Mala s 9 | Contact | Malassezia Mala s 9 | 342 | 19069920 |
| Yeast | Malassezia sympodialis ATCC 42132 | Unassigned | Contact | Malassezia Mala s 10 heat shock protein | 773 | 465797105 |
| Yeast | Malassezia sympodialis ATCC 42132 | Unassigned | Contact | Malassezia Mala s 11 first 38 aa signal | 202 | 465795607 |
| Yeast | Malassezia sympodialis ATCC 42132 | Mala s 13 | Contact | Malassezia Mala s 13 Thioredoxin Rev | 107 | 465793078 |
| Yeast | Malassezia sympodialis ATCC 42132 | Unassigned | Contact | Malassezia Mala s 5 | 172 | 465794772 |
| Yeast | Malassezia sympodialis ATCC 42132 | Unassigned | Contact | Malassezia Mala s 9 | 342 | 465794420 |
| Yellow fever mosquito | Aedes aegypti | Aed a 1 | Venom or | Aedes Aed a 1 apyrase | 562 | 556272 |
| Yellow fever mosquito | Aedes aegypti | Unassigned | Venom or | Aedes Aed a 1 apyrase | 562 | 193806340 |
| Yellow fever mosquito | Aedes aegypti | Aed a 2 | Venom or | Aedes Aed a 2 | 321 | 205525919 |
| Yellow fever mosquito | Aedes aegypti | Aed a 3 | Venom or | Aedes Aed a 3 | 253 | 2114497 |
| Yellow fever mosquito | Aedes aegypti | Unassigned | Venom or | Aedes Aed a 3 | 273 | 94468546 |
| Yellow jacket | Dolichovespula arenaria | Dol a 5.0101 | Venom or | Dolichovespula Venom allergen 5 | 203 | 156719 |
| Yellowfin tuna | Thunnus albacares | Thu a 2.0101 | Food Animal | Thunnus Thu a 2 enolase | 432 | 385145178 |
| Yellowfin tuna | Thunnus albacares | Unassigned | Food Animal | Thunnus Thu a 2 enolase | 12 | 576011132 |
| Yellowfin tuna | Thunnus albacares | Unassigned | Food Anima | Thunnus Thu a 3 aldolase | 364 | 291195949 |

As used herein, the term "about" is used to refer to an amount that is approximately, nearly, almost, or in the vicinity of being equal to a stated amount, e.g., the state amount plus/minus about 5%, about 4%, about 3%, about 2%, or about 1%.

The term "patient" or "subject" as used herein in reference to individuals who are being tested for the potential to produce an allergic response to an allergen and can encompasses veterinary uses, such as, for example, the testing of a rodent (e.g. a guinea pig, a hamster, a rat, a mouse), rabbit, murine (e.g. a mouse), canine (e.g. a dog), feline (e.g. a cat), equine (e.g. a horse), bovine (e.g., cow) a primate, simian (e.g. a monkey or ape), a monkey (e.g. marmoset, baboon), an ape (e.g. gorilla, chimpanzee, orangutan, gibbon). In preferred embodiments the mammal is a human.

Other aspects and embodiments of the invention provide the aspects and embodiments described above with the term "comprising" replaced by the term "consisting of" and the aspects and embodiments described above with the term "comprising" replaced by the term "consisting essentially of".

As used herein, "and/or" is to be taken as specific disclosure of each of the two specified features or components with or without the other. For example "A and/or B" is to be taken as specific disclosure of each (i) A, (ii) B and (iii) A and B, just as if each is set out individually.

It is to be understood that the application discloses all combinations of any of the above aspects and embodiments described above with each other, unless the context demands otherwise. Similarly, the application discloses all combinations of the preferred and/or optional features either singly or together with any of the other aspects, unless the context demands otherwise.

The device of present invention is to derive simultaneous biological information on a variety of specific and nonspecific factors for risk of acute allergy from a single mammalian (including human) biological sample, such as a whole blood sample. In this situation, the blood sample will be acquired via a simple lancet skin pinprick or phlebotomy blood draw and analyzed by the microfluidic chip described herein, and the results will be integrated into a predictive algorithm that can accurately assess the current risk of acute allergic reactions to foods and/or drugs.

The chip can be employed in conjunction with antibodies specific for cell-derived biological markers including: total and allergen specific IgG & IgE, histamine, cytokines such as IL-2, IL-4 and IL-13, tryptase, and LTC4. The antibodies can be conjugated with fluorescent dyes to produce a fluorescent signal upon binding to an antigen in the blood sample, or the antibodies can be detected in other ways, including surface plasmon resonance, bead-based solid phase detection, or colorimetric absorbance methodologies.

Utilizing this method, type I hypersensitivity reactions can be tested within 3 to 6 hours after the injection of the blood sample onto the chip and type IV hypersensitivity reactions within about 72-96 hours after the injection of the blood sample onto the microfluidic chip, with $CO_2$, $O_2$, and pH parameters regulated to match in vivo conditions and maintain cell viability. In preferred embodiments, the chip described herein will have greater than 99% sensitivity and specificity with our laboratory diagnostic solution, making this the gold standard for allergy diagnostics in the future-able to both diagnose allergies to antigens as well as possibly predict the severity of the allergic reaction.

As the technique and test will be conducted ex vivo, the patient will be protected from direct exposure to any allergens and the test will carry no risk of medical morbidity or mortality such as from anaphylaxis, making the test safe for all patients of all ages and for all allergy severities.

All publications, patents and patent applications cited herein, whether supra or infra, are hereby incorporated by reference in their entirety for all purposes.

Figure 1:
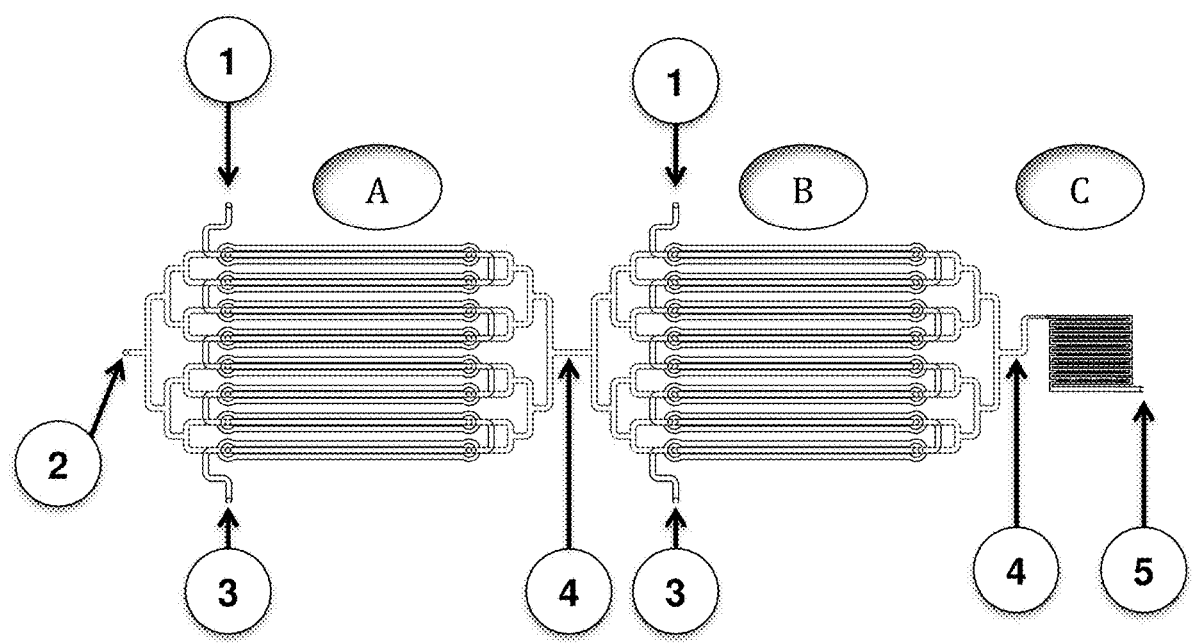
FIG. 1 shows the top view of the general structure of one exemplified chip, with black lines representing fluidic channels in the bottom layer and red lines representing fluidic channels in the top layer. The exemplified chip is divided into three sections such as an incubation chamber A, a washing chamber B, and a readout chamber C. The outlets of the first two chambers are connected to the inlet of the following chambers via a bridge 4.
Figure 2:
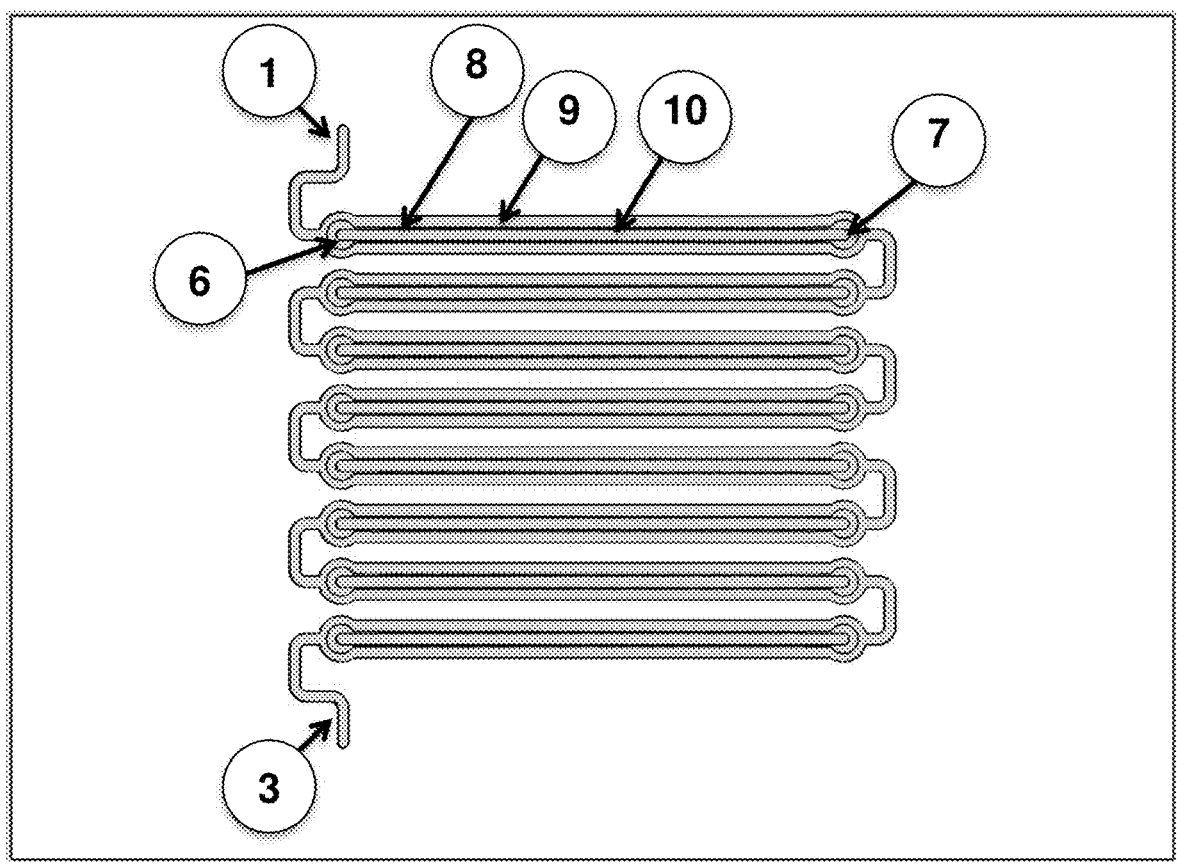
FIG. 2 shows a magnified sketch of the bottom layer of the incubation or washing chambers, which have identical structures. There is an outer channel 9 (cellular incubation channel) and a center channel 10 (microbead analyte capture channel).
Figure 3:
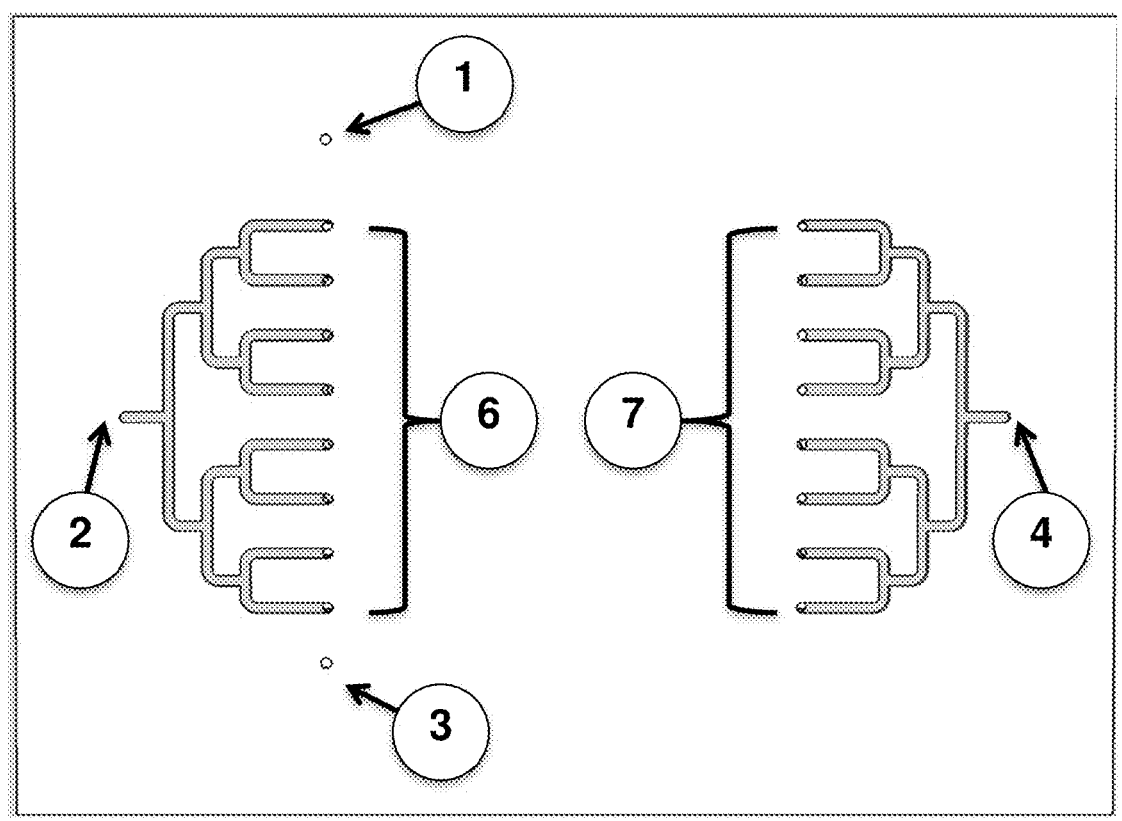
FIG. 3 shows the magnified sketch of the top layer. There are holes in the ends of channels 6 and 7, which connect to the center channels of the bottom layer.

This invention includes technological steps to implement an incubation chamber and a readout chamber as shown in FIG. 1. The microbeads pretreated with different conditions fill the center channels 10 in the bottom layer of the first section A as shown in FIG. 2 via the inlet 2 that leads the microbeads to the entrances 6 of the center channels 10 in the bottom layer. The blood sample fills the outer channel 9 of the first section A via the inlet 1. The microbeads are incubated in the first section and moved to the next section B via the exits 7 that merge to the bridge 4 for washing. The washing solution is introduced to the outer channels to wash the microbeads by either continuous flow or pulsatile flow via the inlet 1 of the section B in the same manner as described for the section A. The blood samples are discarded via the exit 3 of the incubation chamber A. Once washing is finished, the microbeads 11 are moved to the inlet 12 of the readout chambers C where they are captured in the evenly spaced seats 13 for further signal analysis as shown FIGS. 1, 5, and 6. When the seats are evenly spaced, the inventors unexpectedly found that signal interference from overlapping or conglomerated beads is reduced, which is a typical issue of multiplexed readout methodologies. The washing solution is discarded via the outlet 3 of the washing chamber. The modular structure of these chambers allows additional units consisting of A, B, and C to be added for duplicate or triplicate on chip analysis. This allows potentially an unlimited number of allergens or conditions to be tested simultaneously on chip.

The outer channel 9 and the center channel 10 are separated by micro-pillars 8 as shown in FIG. 4, to prevent direct mixing of substances in the two channels but to allow mixing by diffusion. Due to this separation, the red blood cells and microbeads, for example, are not intermingled so that an additional extraction process of microbeads is unnecessary downstream. The microbeads can be either in the center channel 10 or outer channel 9 depending on the device configuration and application.

Figure 5:
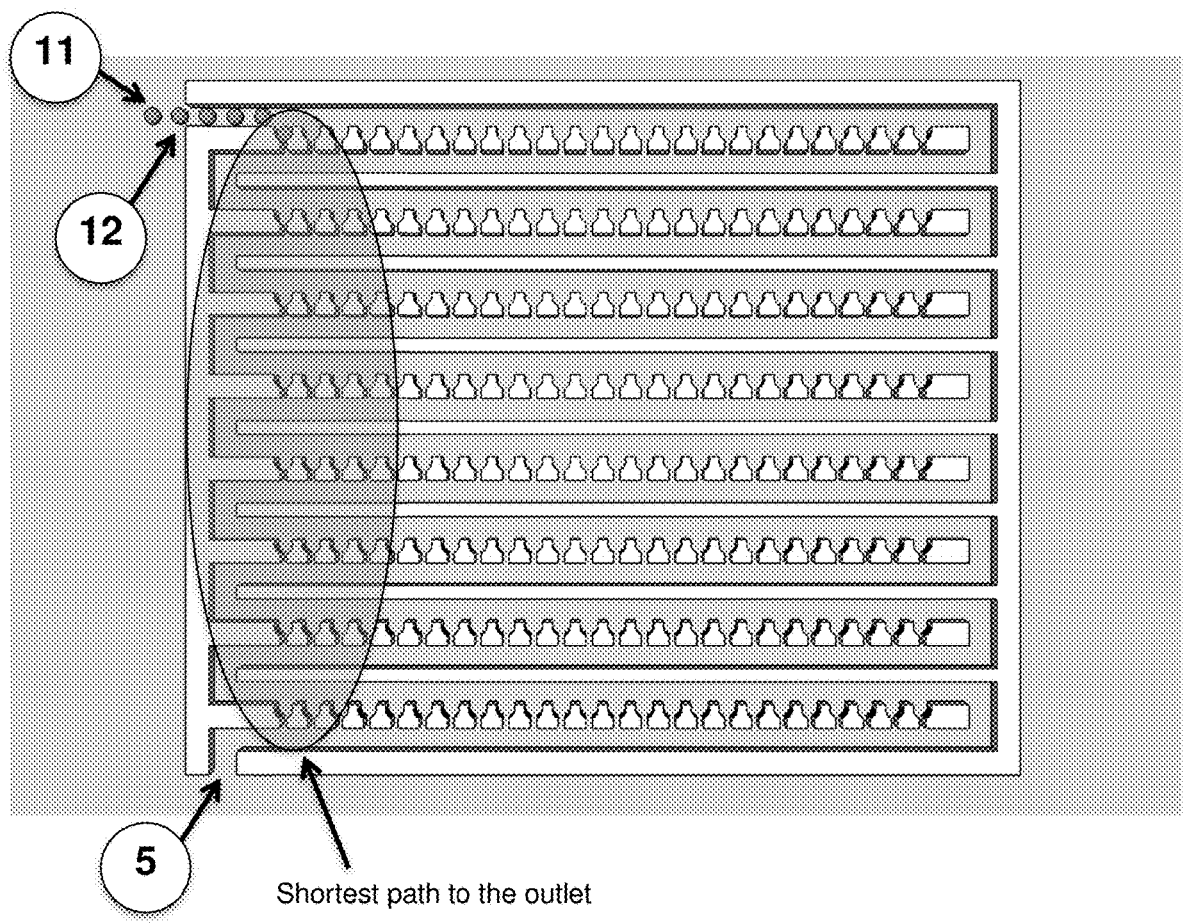
FIG. 5 shows a one-way readout chamber in which individual microbeads 11 are captured in evenly spaced seats.
Figure 7:
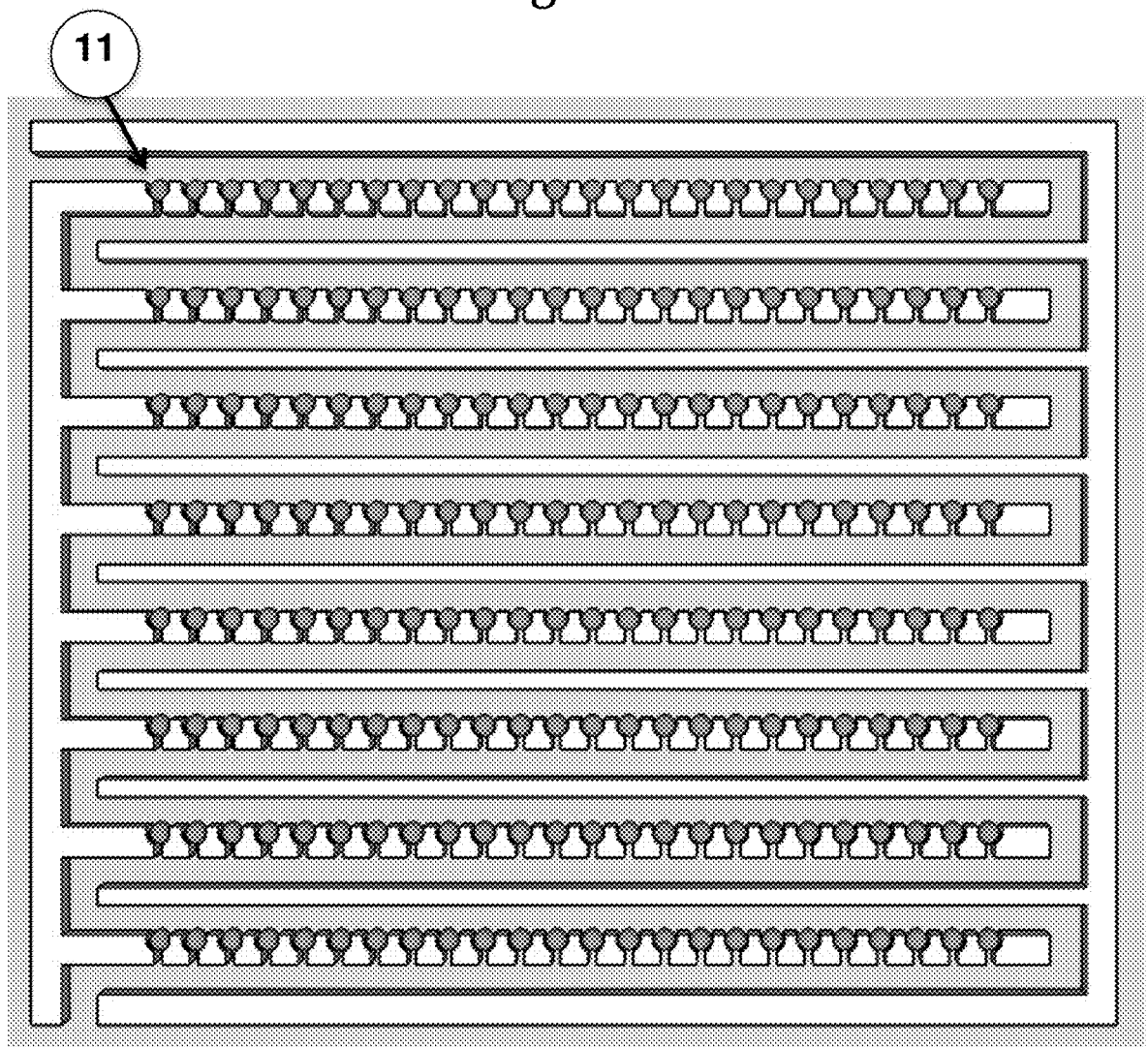
FIG. 7 shows a one-way readout chamber fully filled with microbeads 11.
Figure 8:
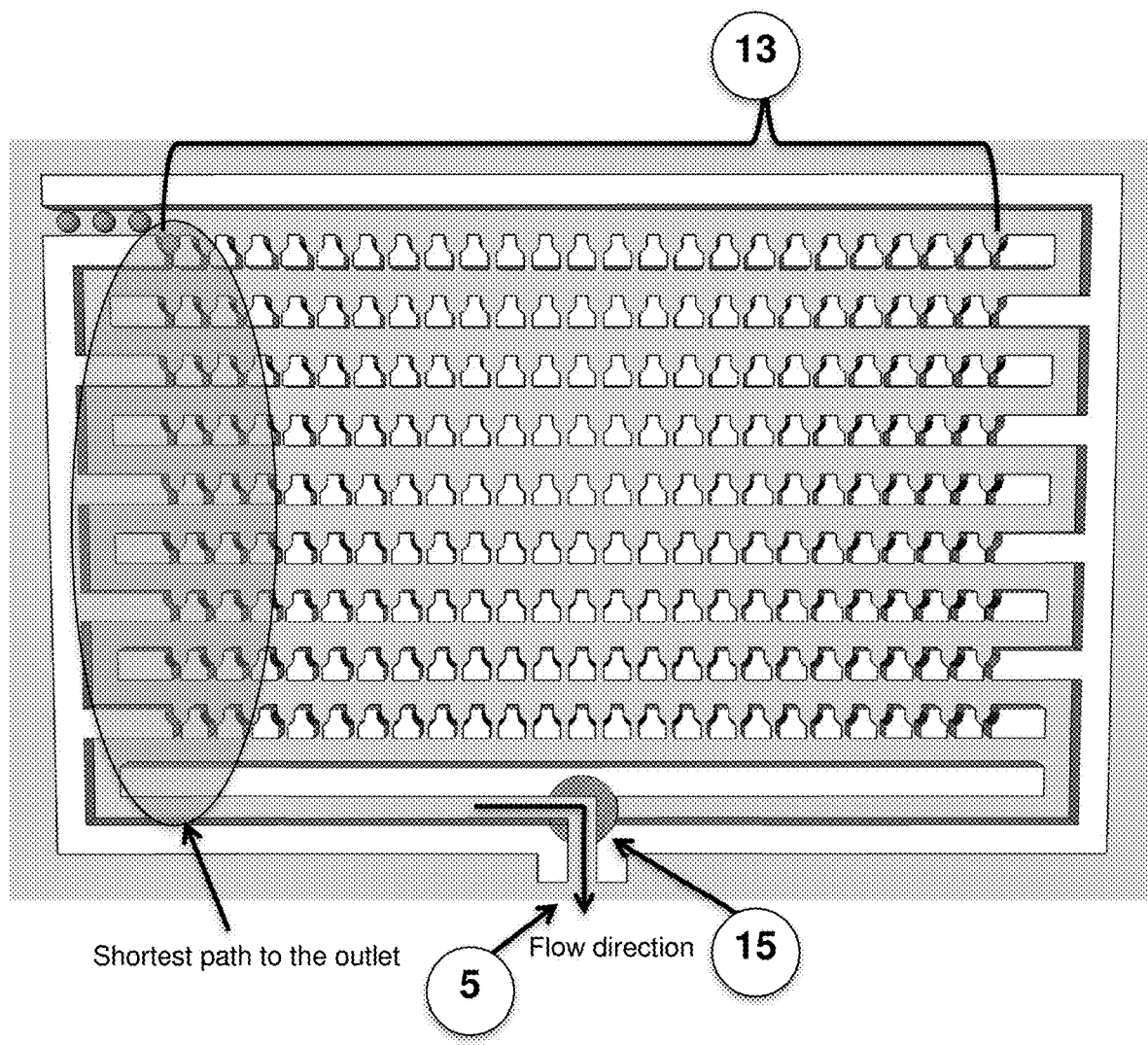
FIG. 8 shows the embodiment of the two-way readout chamber.
Figure 9:
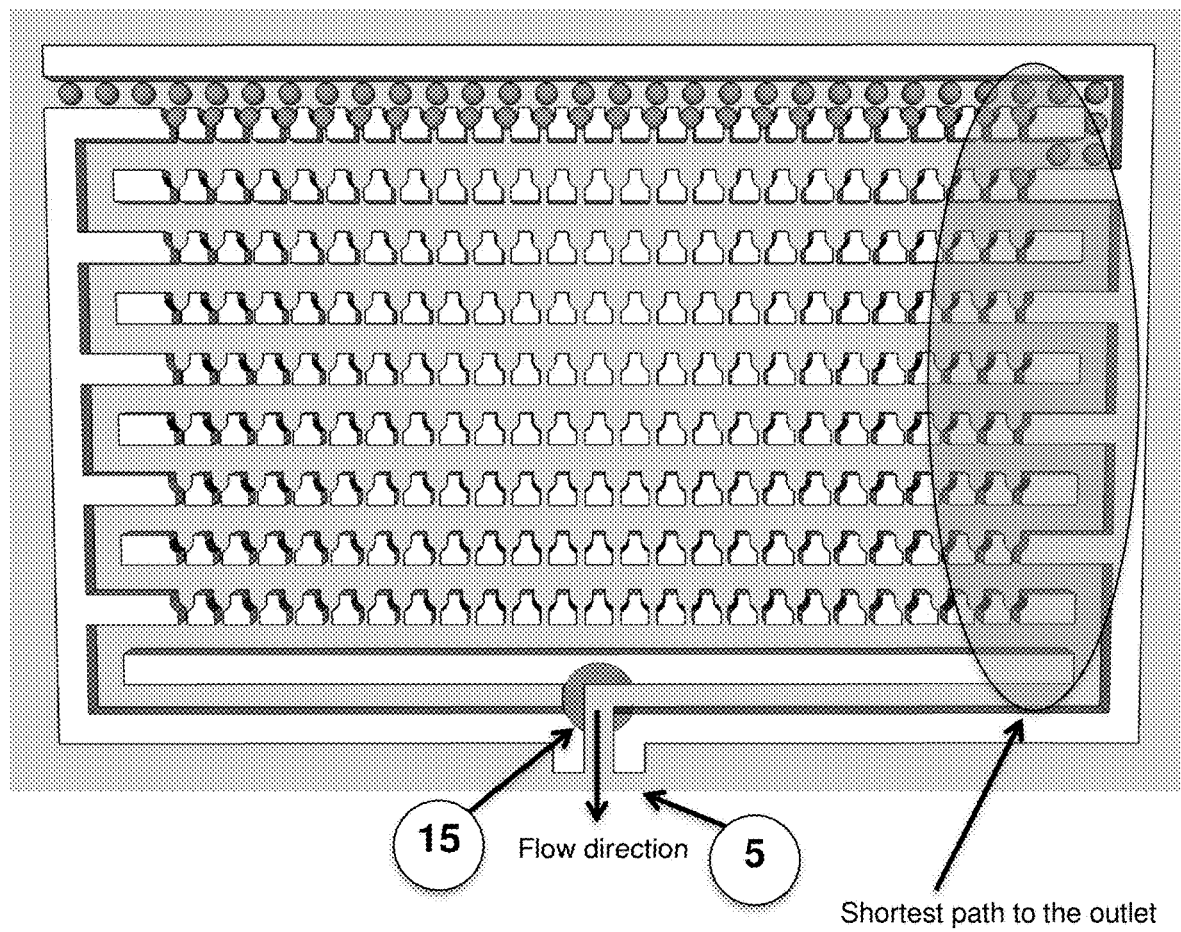
FIG. 9 shows the valve position 15 for filling the even rows of a two-way readout chamber.
Figure 10:
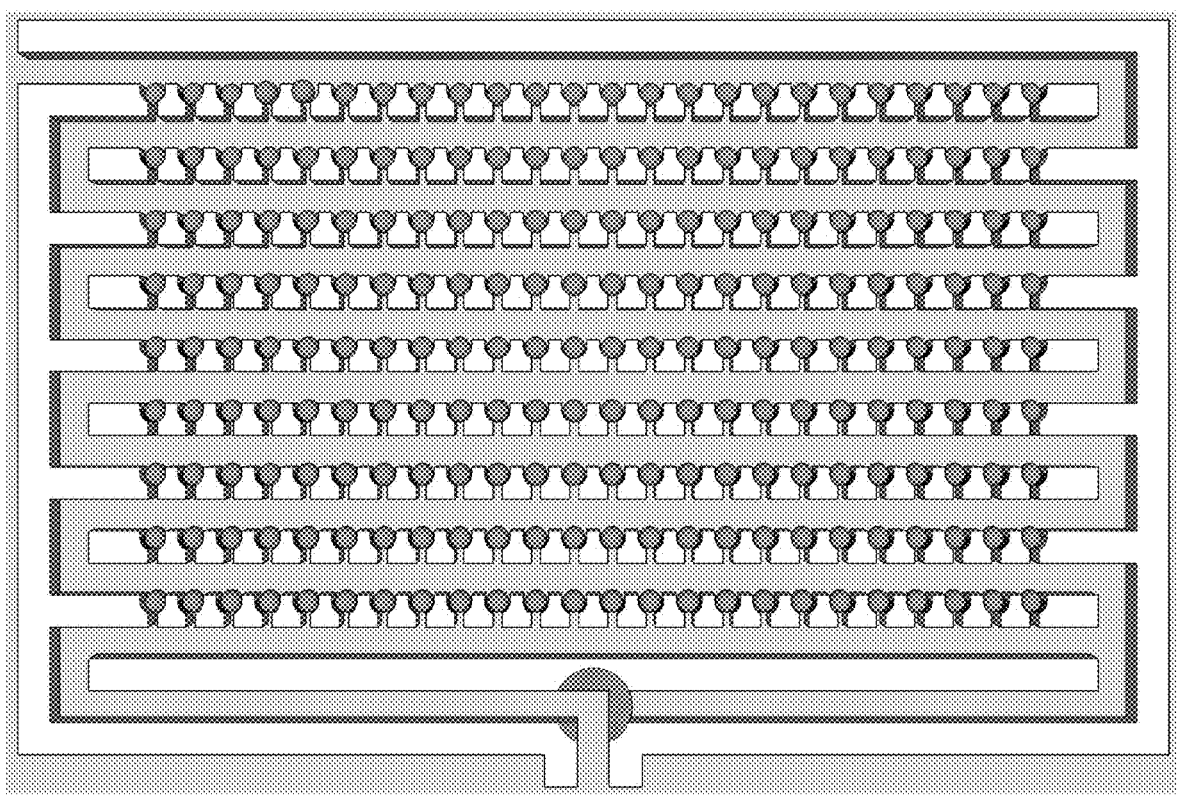
FIG. 10 shows a two-way readout chamber fully filled with microbeads.

The readout chamber can have two different formats such as one-way chamber shown in FIGS. 5, 6, 7 and two-way chamber shown in FIGS. 8, 9, 10.

A one-way readout chamber is composed of evenly spaced seats 13 and flow guides 14. Because the shortest path to the outlet shown in FIG. 5 is dependent on the location of the outlet 5, the path toward left bottom has a smaller hydrodynamic resistance.

The principle of the one-way readout chamber is based on the hydrodynamic relationship between the seats 13. The hydrodynamic resistance through the first empty seat R1 is smaller than the hydrodynamic resistance through the second empty seat R2 due the flow direction determined by the flow guide 14. Thus, the next microbead will sit in the first empty seat. In this way, all empty seats will be taken in sequence automatically without missed microbeads as shown in FIG. 7. The hydrodynamic resistance makes sure the empty seat closest to the inlet will be taken first.

The two-way readout chamber is composed of evenly spaced seats 13 and a microvalve 15 instead of the flow guide. The microvalve 15 changes the flow direction dynamically so that the shortest path to the outlet 5 can be switched accordingly. The hydrodynamic relationship between the seats for the two-way readout chamber is same as that for the one-way readout chamber. Once the odd rows are filled, the microvalve 15 changes the flow direction to fill the even rows as shown in FIG. 9.

The bi-well insert, shown in FIGS. 13, 14, 15, and 16 contains a porous vertical fluidic barrier. The insert maybe placed into a microwell in order to divide the well into two chambers. The fluidic barrier will prevent cells from crossing between the chambers while allowing diffusion of soluble molecules such as proteins. Preferably, the fluidic barrier pore size will be between 0.1 and 6 microns.

EXAMPLES

Example 1. Microfluidic Chip Material

The microfluidic chip will be fabricated from a polymer such as (poly) dimethylsiloxane (PDMS) and glass, although we will consider using COC or PTE film instead of PDMS and glass to reduce the cost of material for mass production. All fluidic channels will be embedded into the PDMS material via common soft lithography manufacturing processes (e.g. according to the previously published protocol (Selimović et al., 2009).

Example 2. Microfluidic Chip Fabrication and Structure

The following description is one of multiple possible chip designs. This description is only included for context, to visualize how the fluids (sample, reagents, and microbeads) will be routed on-chip and how the output (presence or absence of an immunological reaction) will be read out.

The chip will be created by molding it to photoresist patterns on silicon wafers. The device will then be assembled from three adjacent fluidic layers: two fluidic (channel/chamber) layers and one control layer, such that the channel layers guides fluids (blood) to the assay chambers (where reactions of interest take place), and microvalves on the control layer can be activated to close off all chambers from the fluidic channels. (The rough fabrication protocol for such microvalves can be found in Selimović et al., 2009). FIG. 4 shows the magnified view of a part of the chip. For simplicity, the control layer is not shown.

The drawing in FIG. 4 also shows the micro-pillars as part of the incubation chamber, preventing direct mixing of substances in the two channels. The assembled microfluidic chip can be bonded to a sticky PET film or to a glass slide for stability and to avoid drying out of the device, since water that is present in the blood sample can permeate the PDMS layer. Alternatively, the bottom layer in FIG. 1 can also be made of glass. The choice of material for the bottom layer of the device has no bearing on the function and accuracy of the microfluidic chip.

The following description only serves to explain the function and operation of the chip, with the understanding that a variety of channel and assay chamber dimensions on the microscale (below about 1000 micrometers, below about 900 micrometers, below about 800 micrometers, below about 700 micrometers, below about 600 micrometers, below about 500 micrometers, below about 400 micrometers, below about 300 micrometers, below about 200 micrometers, below about 100 micrometers, below about 50 micrometers, below about 10 micrometers, and/or below about 5 micrometers) can be used. The channels will have a low height compared to the width; at such aspect ratios the channels can easily be closed by a microvalve (on the control layer) activated at 20 psi or less.

There is no limit on the maximum chamber size, as long as the following factors are considered: minimizing the reagent volume, minimizing the sample volume (blood), keeping the device confined to a size comparable to a 2"×3" glass slide, so that it can be conveniently held in the hand during the blood collection from a finger prick, and keeping the aspect ratio of all features such that common (soft) lithography techniques can be used. Thus, chamber widths of up to 1000 micrometers can be used.

Example 3. On Chip Treatment of the Microbeads with Antibodies

Instead of using pretreated microbeads, the microbeads can be pretreated on chip by adding a treatment section before the first section A shown in FIG. 1.

Example 4. Adding the Sample onto the Chip

In one embodiment, the chip is delivered to the user with all allergens (food particles, drugs, and/or antibiotics) loaded onto the chip in a dry state and additional reagents will be added in an automated format. Alternatively, the additional reagents may be prepackaged on the chip as well. All incubation chambers will contain the same amount of antibiotic or other allergen at this stage. Assuming that the largest incubation chamber has a volume on the order of 10 nl, the total amount of blood necessary to run a single chip will be on the order of 1 microliter. A finger prick can provide a blood sample on the order of 50 microliters, while several milliliters of blood can be collected by drawing blood with a needle. Thus, both blood collection methods can supply enough blood for a single chip.

When whole blood is utilized, the chip will contain lithium heparin or another anticoagulant that will mix with the patient's blood sample upon collection to prevent the blood from coagulating. Then, the mixed solution can be loaded onto the chip (Inlets for blood 1) either by using a hand-held plastic syringe (or a syringe pump) or via capillary flow of the blood from the finger stick. We envision applying only relatively low flow rates to distribute various fluids throughout the chip, so that only low pressures will be built up inside the microfluidic channels. To fully avoid building up pressure inside the chip, the liquids can be pulled through the chip (by applying negative pressure at any outlets (3, 5) instead of pushing the liquids (e.g. by using a pipette to introduce the blood sample into the chip). As the blood/coagulant solution flows into the microfluidic chip, it will displace any air previously present inside the fluidic channels and incubation chambers. When it reaches the incubation chambers, it will dissolve the dry drug/antibiotic or suspend the food allergens. The flow of the solution will be sufficiently slow to not flush the allergens from the chamber.

The blood can be introduced through the inlet for blood 1 such that it reaches the outer channels 9. After enough incubation time, the solution or microbeads move to the next section and the blood exits through the outlet 3 and can be collected inside attached polyethylene tubing or simply allowed to collect on top of the ports and evaporate there.

Example 5. On-Chip Tests

Preferably, each chip can provide a positive and a negative control, conducted, for example, in triplicate. For example, the chip can enable the simultaneous testing of up to 5 different allergens and 2 controls, each of those by analyzing the presence of at least 5 biomarkers in the blood, and each experiment being repeated in triplicate, the total number of assays conducted on the chip can be 105. Since in this example all incubation chambers are connected with channels only in one direction, the blood or coagulation solution flowing through one particular channel will only reach one particular allergen and only one particular set of antibodies and will not mix with other allergens or have access to other antibodies. In addition, each chip is a preferably single-use device to avoid cross-contamination and will be disposed of appropriately after the test is completed.

In addition to allergy testing, other testing that could be performed on the microchips includes measuring blood counts, blood typing, and blood cross-matching. Blood typing could be performed by mixing the sample with antibodies against various blood groups and monitoring for an agglutination (clumping) reaction. Blood cross-matching could be performed by mixing an individual's blood with blood from one or more individuals to evaluate for agglutination or hemolysis.

Example 6. Analyzing the Sample

Any required washing steps or introduction of additional reagents for enzyme-based assays will rely on injection of those solutions through the inlet of the second section B in FIG. 1.

As part of the reaction between blood components and the allergens, particular biomarkers expressed in the blood will bind to the antibodies on the microbeads or surface of the incubation chamber. Washing steps will remove any unbound biomarkers and the allergen. Additional antibodies that bind to the marker of interest will then be introduced, and detection will be accomplished via fluorescence or colorimetric read-outs (depending on the substance conjugated to the detection antibodies). Hence, the reaction will have to occur in a dark chamber to avoid any potential bleaching effects. Each individual readout chamber can be evaluated under a fluorescence microscope or with a spectrophotometer to detect the presence or absence of bound biomarkers.

Example 7. Result Readout

Figure 11:
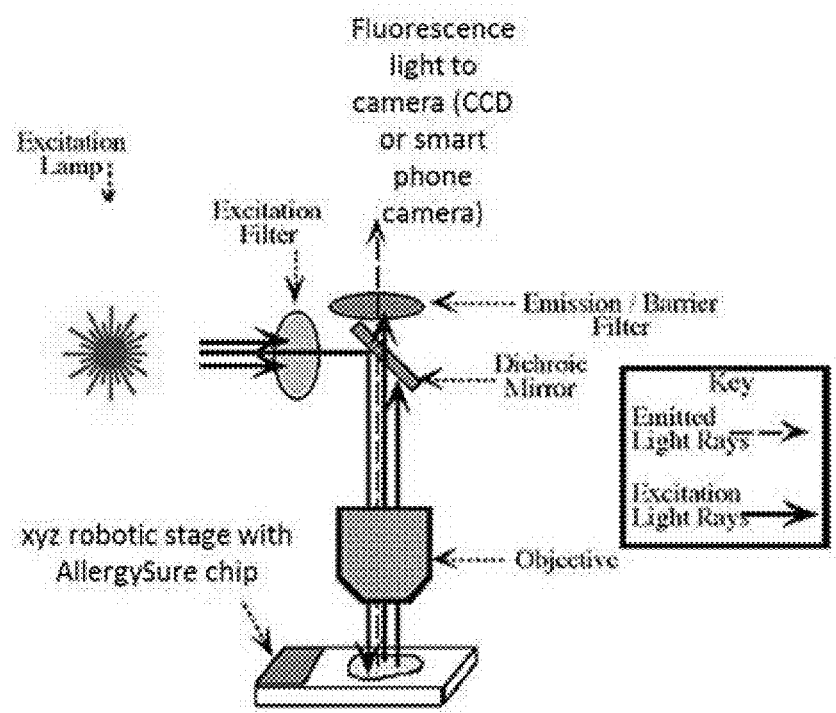
FIG. 11 shows a schematic of an exemplified imaging setup, including the excitation light source (a red or UV light-emitting diode (LED)), the microfluidic chip on the robotic x-y-z stage, and the location of the camera.
Figure 12:
FIG. 12 shows a photograph of an exemplified prototype of the microfluidic chip, made of PDMS (a). Magnified view of the incubation chamber shown in (b) and the readout chamber shown in (c).
Figure 12:
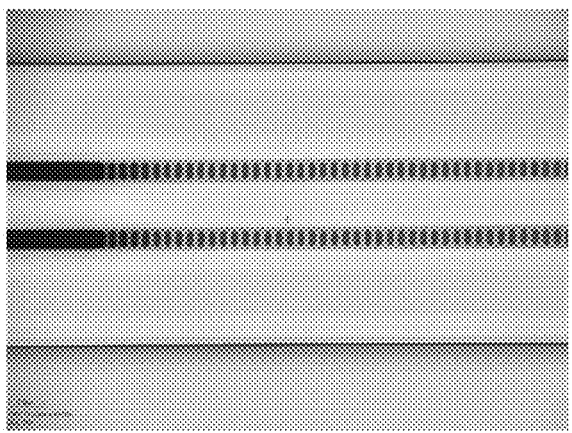
Figure 12:
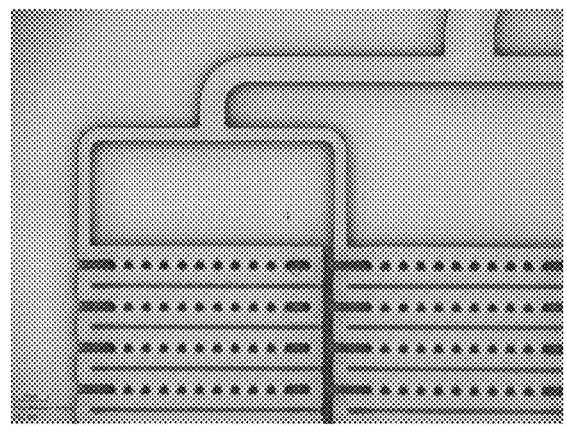

If a fluorescence microscope is used, a light-emitting diode (LED) will be used as an excitation source. We plan to employ UV, red, and other LEDs to excite the fluorophores conjugated to the antibodies (Randers-Eichhorn, Albano, Sipior, Bentley, & Rao, 1997). FIG. 11 details a possible imaging setup with the chip placed on a robotic xyz stage and underneath an objective. The camera can either be a CCD chip camera, or depending on the required resolution, a camera attached to a common smartphone, or a webcamera via an adapter. The camera will record the resulting fluorescence signals and save the data as image files. A proprietary algorithm (loaded as a mobile application onto a smartphone or a computer, for example) will then measure the intensity of the signal in each assay chamber and report those numbers to conclude whether an allergic reaction is present.

An alternative to this optical read-out is presented by Chen et al., 2015. In this case, it is contemplated to pattern gold nanorods on the surface of all assay chambers and conjugate them with antibodies against the various antigens that are being interrogated. Data will be collected using localized surface plasmon resonance and the scattering intensity from the nanorods will be recorded for a sample in which no antigens are present and will be compared to the scattering intensity in our tests. The resulting spectrum shift will be used as a measure of an allergic reaction.

Example 8. Bead-Based Incubation Chamber

The incubation chamber described as the first section of the device (A) can be used for incubation of red blood cells with pretreated microbeads by introducing the red blood cells into the outer channel and the microbeads into the center channel or vice versa.

The incubation chamber described as the first section of the device (A) can also be used for incubation of antibody, allergen, or other substances to treat microbeads by introducing the substance into the outer channel and the microbeads into the center channel or vice versa.

The incubation chamber described as the first section of the device (A) can also be used for incubation of microdrops with other substances by introducing the microdrops into the outer channel and the substances into the center channel or vice versa.

The incubation chamber described as the first section of the device (A) can also be used for incubation of two or more substances by introducing the one substance into the outer channel and the second substance into the center channel or vice versa.

The incubation chamber described as the first section of the device (A) can also be used for incubation of two or more cells by introducing one group of cells into the outer channel and another group of cells into the center channel or vice versa.

The incubation chamber described as the first section of the device (A) can also be used to examine blood viscosity by adjusting the space between the micro-pillars and monitoring pressure profile while applying steady, impulse, pulsatile, or other forms of pressure input.

The incubation chamber described as the first section of the device (A) can also be utilized for blood typing and serologic cross-matching by utilizing agglutination as tracked by image recognition paired with deep learning.

The incubation chamber described as the second section of the device (B) can be used for washing of the treated microbeads by introducing the washing solution into the outer channel and the microbeads into the center channel or vice versa.

Example 9. Bead-Based Readout Chamber

The seats in the readout chamber C separate beads and prevent bead overlap with even spacing. This allows discrete image processing via simple digital processing, and the accuracy of the readout result is greatly increased by avoiding noise and bias caused by bead overlap or close proximity, which is a typical issue of conventional multiplexed readout methodologies.

The readout chamber C can also be used to capture red blood cells for incubation or treatment with antibody, allergen, nutrients, or other substances. Substances secreted by the cells can be continuously collected.

The readout chamber C can also be used to capture microbeads for continuous treatment or reaction with antibody, allergen, or other substances while monitoring the change of signal. Because microbeads are monodispersed with a predetermined distance, quantitative analysis can be done without signal overlap The readout chamber C can also be used to capture microdrops for continuous treatment or reaction with antibody, allergen, or other substances while monitoring the change of signal, size, color, or any other properties.

The readout chamber C can also be used to capture other cell types such as primary cells, cancer cells, or stem cells for applications such as identification of circulating tumor cells and culture, differentiation, or treatment with nutrients, differentiation factors, antibodies, allergens, drugs, or other substances. Changes in cell morphology, cytotoxicity, or levels of secreted substances can be measured.

The readout chamber C can also be used to capture yeast cells for culture, treatment or reaction with nutrients, antibodies, allergens, drugs, or other substances while keeping the first generation cells, monitoring offspring cells, and collecting secreted substances.

The readout chamber C can also be used to capture embryos or cloned embryos for culture, differentiation, treatment or reaction with nutrients, antibodies, allergens, drugs, or other substances while monitoring changes in cell morphology, cytotoxicity, or levels of secreted substances.

The readout chamber C can also be used to capture oocytes for in-vitro fertilization, culture, differentiation, treatment or reaction with sperm, nutrients, antibodies, allergens, drugs, or other substances while monitoring the changes in cell morphology, cytotoxicity, or levels of secreted substances.

The readout chamber C can also be used to capture small animals such as *C-elegans* for stimulation, treatment or reaction with nutrients, stimuli, antibodies, allergens, drugs, or other substances while monitoring for changes in morphology or levels of secreted substances The readout chamber C can also be used to capture two different types of cells, oocytes, embryos, microbeads, droplets, or animals for co-culture, comparison, or other simultaneous study The readout chamber C can also be used to measure cell density by counting the trapped cells.

The readout chamber C can also be used to separate cells based on size and stained color by adjusting the size and shape of the microseats and controlling the flow path.

The readout chamber can be used to capture single white blood cells in metaphase for karyotype analysis after appropriate treatment in the incubation A and wash B chambers.

The readout chamber can be used to capture white blood cell fractions (such as neutrophils, basophils, eosinophils, lymphocytes, and monocytes) to generate an automated differential with the aid of image recognition paired with deep learning.

Example 10. Fabrication and Usage of the Bi-Well Insert

Relying on the same fluid dynamics, the chip can be designed as microwells containing bi-well inserts. In this situation, the bi-well insert can be made of construction materials such as polystyrene, polycarbonate, COC, PTFE, and PDMS using injection molding, 3D printing, and other manufacturing processes. The vertical membrane can be attached to the bi-well insert by gluing or heat press.

In this case, the bi-well insert divides a microwell into two chambers as described above—an "incubation chamber" (FIG. 13, number 17) and a "washing/capture chamber" (FIG. 13, number 18), both chambers having an inlet which also functions as an outlet.

Once the bi-well insert is in place, microbeads are introduced in the microwell via the inlet of 18 into the washing/ capture chamber and whole blood is filled into the incubation chamber via the inlet of 17. After a suitable incubation period the bi-well insert is removed and microbeads remaining in the microwell get washed.

Microbeads will be transferred to the bead-based readout chamber described in example 9 or to a commercially-available multiplex bead analyzer.

What is claimed:

1. A microfluidic chip comprising:
   (a) an incubation chamber comprising
       an incubation inlet,
       an incubation outlet connected to a wash inlet, and a vertical fluidic barrier, wherein said fluidic barrier blocks the diffusion of particles in a solution of 0.1-20 microns in size;
   (b) a wash chamber comprising the wash inlet connected to the incubation outlet and a wash outlet connected to a readout inlet; and
   (c) a readout chamber comprising the readout inlet, a readout channel, and a readout outlet connected to the wash outlet and a readout outlet connected to a readout channel, wherein said readout channel comprises a series of sequentially ordered seats having a concave shape with an opening and a separation between the base of the seats, and
   wherein said readout chamber is configured to allow for a dual flow of the solution through the readout chamber, wherein said dual flow comprises:
       an unblocked main flow of the solution from the readout inlet to the readout outlet; and
       a shunt flow of the solution through the opening and separation at the base of the seats, and
   wherein the shunt flow of the solution through the readout chamber exhibits a hydrodynamic resistance ratio between the hydrodynamic resistance of the shunt flow direction through the first empty seat (R1) and the hydrodynamic resistance of the shunt flow direction through the next empty seat (R2) is from 1 to 3, wherein R1 is smaller than R2, wherein the hydrodynamic resistance is calculated using the solution for Poiseuille flow in a rectangular channel.

2. The microfluidic chip of claim 1, wherein:
   a) the solution is selected from a biological solution, a wash solution, a nutrient solution, and/or a solution of beads;
   b) the biological solution of a) is a blood sample, a serum sample, a plasma sample, a urine sample, a fecal sample, a saliva sample, a cerebrospinal fluid (CSF) sample, a bone marrow aspirate sample, and/or a vitreous sample;
   c) the particles in the solution are processed to detect antigen, detect antibody, capture DNA, capture RNA, capture any protein of interest, and/or capture any particles of interest in the target solution;
   d) the fluidic barrier blocks the diffusion of particles of a size selected from: 0.5 to 20 microns;
   e) the fluidic barrier is a micro-pillar, a porous wall, a porous membrane, a hydrogel, micro/nano-grid, or a PVDF-PZT composite; and/or
   f) the incubation chamber further comprises an incubation channel.

3. The microfluidic chip of claim 2, wherein the incubation channel further comprises:
   a) an outer channel separated from a center channel by the fluidic barrier;
   b) the center channel of a) positioned in between at least two outer channels;

c) the center channel of a) or b) is surrounded by outer channels;
d) the incubation channel is a concentric channel;
e) a width of the incubation channel is between 1-500 microns in size; and/or
f) a height of the incubation channel is between 1-500 microns in size.

4. The microfluidic chip of claim 1, wherein the incubation chamber comprises multiple incubation channels.

5. The microfluidic chip of claim 4, wherein the multiple incubation channels further comprise:
a) at least 3 channels;
b) at least two incubation channels connected to one another;
c) all of the incubation channels are connected to one another;
d) multiple incubation inlets and/or incubation outlets;
e) the addition of multiple solutions thru the multiple incubation inlets of d);
f) the addition of different solutions in e);
g) incubation channels positioned radially, semi-radially, or parallel to one another;
h) incubation channels connected to one another which process particles in the solution differently; and/or
i) at least two of the incubation channels comprise fluidic barriers that block the diffusion of different sized particles.

6. The microfluidic chip of claim 5, wherein the fluidic barrier is a porous membrane, porous wall, hydrogel, micro/nano-grid, or PVDF-PZT composite.

7. The microfluidic chip of claim 1, wherein:
a) the seats in the readout chamber are evenly distributed;
b) the readout chamber comprises multiple rows of sequentially ordered seats;
c) the multiple rows of b) are separated by a flow guide structure;
and/or
d) the readout chamber comprises between 2-400 seats.

8. The microfluidic chip of claim 1, wherein the incubation chamber further comprises an antigen.

9. The microfluidic chip of claim 1, wherein the microfluidic chip comprises more than one incubation chamber and each incubation chamber comprises a different antigen.

10. The microfluidic chip of claim 8, wherein:
a) the antigen is selected from Table 1;
b) at least 2 different antigens are selected from Table 1;
c) the same antigen is included in three or four different incubation chambers;
d) the antigen is bound to a microbead;
e) at least one incubation chamber comprises a marker used to detect pregnancy;
f) at least one incubation chamber comprises a marker used to type blood;
g) at least one incubation chamber comprising a marker to measure:
  1. CBC measurements;
    i. White Blood Cell fractions;
    ii. Hemoglobin levels; and/or
    iii. Platelet levels;
  2. Human chorionic gonadotropin (hCG);
  3. Blood serum or plasma viscosity;
  4. Blood typing;
  5. Serologic cross-matching;
  6. Yeast;
  7. A primary cell;
  8. A cancer cell;
  9. A stem cell;
  10. A differentiation factor;
  11. An antibody;
  12. An allergen;
  13. A drug;
  14. A substance used to monitor the change of signal, morphology, cytotoxicity or collecting secreting substance;
  15. Static droplet arrays; and/or
  16. Cell free tumor or viral DNA.

11. The microfluidic chip of claim 1, wherein the microfluidic chip comprises a polymer, glass, silicon, metal or combination thereof.

12. The microfluidic chip of claim 11, wherein the polymer is selected from: (poly) dimethylsiloxane (PDMS), cyclic olefin copolymer (COC), polyethylene, Polytetrafluoroethylene (PTFE), polyethylene terephthalate (PET), biaxially-oriented polyethylene terephthalate, or other polymer, hydrogel, glass, or metal.

13. The microfluidic chip of claim 1, wherein the microchip further comprises a valve capable of controlling the solution's flow direction.

14. The microfluidic chip of claim 13, wherein the valve dynamically changes the flow direction.

15. The microfluidic chip of claim 13, wherein the valve intermittently switches the flow direction of R2.

16. The microfluidic chip of claim 13, wherein the valve is switched when the solution reaches a row's last sequentially ordered seat.

17. The microfluidic chip of claim 13, wherein the valve is switched when the sample reaches the chamber's last sequentially ordered seat of all odd or even rows.

18. A kit comprising the microfluidic chip of claim 1 and a detecting agent.

19. The kit of claim 18, wherein the kit further comprises:
a) a solution comprising an antibody capable of detecting an immune response;
b) a solution comprising an antibody capable of binding to a protein selected from: IgGs, IgEs, histamine, IL-2, IL-4, IL-13, tryptase, or LTC4;
c) a solution capable of detecting a substance in the biological sample; and/or
d) the substance of c) selected from:
  1) A WBC; a platelet; a primary cell; a cancer cell; a stem cell;
  2) Hgb, a differentiation factor, an antibody, an allergen, a drug, human chorionic gonadotropin (hCG), IgGs, IgEs, histamine, IL-2, IL-4, IL-13, tryptase, or LTC4, or a substance used to monitor the change of signal, morphology, cytotoxicity, or levels of a secreted substance;
  3) A microorganism; and/or
  4) A droplet containing various physio-chemical and/or biological substances.

20. A method of detecting a particle in a solution comprising:
a) placing the solution thought to comprise a particle in the incubation inlet of the microfluidic chip of claim 1;
b) adding a second solution capable of detecting the particle;
c) processing the solution through a readout chamber to detect the presence of the particle in the solution.

21. The method of claim 20, wherein:
a) the solution comprises a biological sample obtained from a patient, and the biological sample is placed on the microfluidic chip wherein the biological sample comes in contact with an antigen; and the presence or absence an immune response is measured;

b) the second solution comprises an antibody capable of detecting an immune response;
c) the antibody of (b) capable of binding to a protein selected from: IgGs, IgEs, histamine, IL-2, IL-4, IL-13, tryptase, or LTC4;
d) the immune response is measured by a fluorescence microscope, surface plasmon resonance, bead-based solid phase detection methodologies, or colorimetric absorbance methodologies; and/or
e) a greater than 95%, 96%, 97%, 98%, 99% sensitivity and/or specificity is obtained.

22. The method of claim 20, wherein the following particles are detected in the solution:
1) A WBC; a platelet; a primary cell; a cancer cell; a stem cell;
2) Hgb, a differentiation factor, an antibody, an allergen, a drug, human chorionic gonadotropin (hCG), IgGs, IgEs, histamine, IL-2, IL-4, IL-13, tryptase, or LTC4, or a substance used to monitor the change of signal, morphology, cytotoxicity, or levels of a secreted substance; and/or
3) A microorganism.

* * * * *